(12) United States Patent
Cella et al.

(10) Patent No.: US 11,488,590 B2
(45) Date of Patent: Nov. 1, 2022

(54) METHODS AND SYSTEMS FOR PROCESSING, STORING, AND PUBLISHING DATA COLLECTED BY AN IN-EAR DEVICE

(71) Applicant: Staton Techiya LLC, Delray Beach, FL (US)

(72) Inventors: Charles Cella, Pembroke, MA (US); John Keady, Fairfax Station, VA (US)

(73) Assignee: Staton Techiya LLC, Delray Beach, FL (US)

( * ) Notice: Subject to any disclaimer, the term of this patent is extended or adjusted under 35 U.S.C. 154(b) by 116 days.

(21) Appl. No.: 16/408,371

(22) Filed: May 9, 2019

(65) Prior Publication Data

US 2019/0348041 A1     Nov. 14, 2019

Related U.S. Application Data

(60) Provisional application No. 62/669,299, filed on May 9, 2018.

(51) Int. Cl.
*G10L 15/22* (2006.01)
*G10L 15/16* (2006.01)
(Continued)

(52) U.S. Cl.
CPC ............ *G10L 15/22* (2013.01); *G06F 40/284* (2020.01); *G10L 15/02* (2013.01); *G10L 15/16* (2013.01);
(Continued)

(58) Field of Classification Search
CPC ......... G10L 15/22; G10L 15/02; G10L 15/16; G10L 15/18; G10L 15/30; G10L 25/48; G10L 15/26; G06F 40/284; H04R 1/1016
See application file for complete search history.

(56) References Cited

U.S. PATENT DOCUMENTS 3,876,843 A    4/1975   Moen
4,054,749 A    10/1977  Suzuki et al.
(Continued)

FOREIGN PATENT DOCUMENTS

EP    1519625 A2      3/2005
WO    2006037156 A1   4/2006

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Daniel C Washburn
*Assistant Examiner* — Athar N Pasha
(74) *Attorney, Agent, or Firm* — Akerman LLP; Peter A. Chiabotti

(57) ABSTRACT

According to some embodiments of the disclosure, a method is disclosed. The method includes receiving, by a processing device of an in-ear device, an audio signal from one or more microphones of the in-ear device. The method further includes extracting, by the processing device, one or more features of the audio signal and generating, by the processing device, an in-ear data object based on the one or more features. The method also includes publishing, by the processing device, the in-ear data object to an external system via a network.

8 Claims, 20 Drawing Sheets

(51) Int. Cl.
*G10L 15/30* (2013.01)
*G10L 15/18* (2013.01)
*G10L 25/48* (2013.01)
*H04R 1/10* (2006.01)
*G10L 15/02* (2006.01)
*G06F 40/284* (2020.01)

(52) U.S. Cl.
CPC .............. *G10L 15/18* (2013.01); *G10L 15/30* (2013.01); *G10L 25/48* (2013.01); *H04R 1/1016* (2013.01)

(56) References Cited

U.S. PATENT DOCUMENTS

| | | | |
|---|---|---|---|
| 4,088,849 A | 5/1978 | Usami et al. | |
| 4,947,440 A | 8/1990 | Bateman et al. | |
| 5,208,867 A | 5/1993 | Stites, III | |
| 5,267,321 A | 11/1993 | Langberg | |
| 5,524,056 A | 6/1996 | Killion et al. | |
| 5,903,868 A | 5/1999 | Yuen et al. | |
| 6,021,207 A | 2/2000 | Puthuff et al. | |
| 6,021,325 A | 2/2000 | Hall | |
| 6,163,338 A | 12/2000 | Johnson et al. | |
| 6,163,508 A | 12/2000 | Kim et al. | |
| 6,226,389 B1 | 5/2001 | Lemelson et al. | |
| 6,298,323 B1 | 10/2001 | Kaemmerer | |
| 6,359,993 B2 | 3/2002 | Brimhall | |
| 6,400,652 B1 | 6/2002 | Goldberg et al. | |
| 6,415,034 B1 | 7/2002 | Hietanen | |
| 6,567,524 B1 | 5/2003 | Svean et al. | |
| RE38,351 E | 12/2003 | Iseberg et al. | |
| 6,661,901 B1 | 12/2003 | Svean et al. | |
| 6,728,385 B2 | 4/2004 | Kvaloy et al. | |
| 6,748,238 B1 | 6/2004 | Lau | |
| 6,754,359 B1 | 6/2004 | Svean et al. | |
| 6,804,638 B2 | 10/2004 | Fiedler | |
| 6,804,643 B1 | 10/2004 | Kiss | |
| RE38,649 E * | 11/2004 | Setlur ...................... G10L 15/22 704/231 | |
| 7,072,482 B2 | 7/2006 | Van Doorn et al. | |
| 7,107,109 B1 | 9/2006 | Nathan et al. | |
| 7,209,569 B2 | 4/2007 | Boesen | |
| 7,430,299 B2 | 9/2008 | Armstrong et al. | |
| 7,433,714 B2 | 10/2008 | Howard et al. | |
| 7,450,730 B2 | 11/2008 | Bertg et al. | |
| 7,477,756 B2 | 1/2009 | Wickstrom et al. | |
| 7,562,020 B2 | 6/2009 | Le et al. | |
| 7,756,285 B2 | 7/2010 | Sjursen et al. | |
| 7,778,434 B2 | 8/2010 | Juneau et al. | |
| 7,920,557 B2 | 4/2011 | Moote | |
| 8,014,553 B2 | 9/2011 | Radivojevic et al. | |
| 8,493,204 B2 | 7/2013 | Wong et al. | |
| 8,750,295 B2 | 6/2014 | Liron | |
| 9,037,458 B2 | 5/2015 | Park et al. | |
| 9,123,343 B2 | 9/2015 | Kurki-Suonio | |
| 9,135,797 B2 | 9/2015 | Couper et al. | |
| 10,034,029 B1 | 7/2018 | Barua et al. | |
| 10,354,307 B2 | 7/2019 | Ye et al. | |
| 10,621,442 B2 | 4/2020 | Matsuoka et al. | |
| 10,692,489 B1 * | 6/2020 | Grizzel .................... G10L 15/18 | |
| 2001/0046304 A1 | 11/2001 | Rast | |
| 2002/0106091 A1 | 8/2002 | Furst et al. | |
| 2002/0118798 A1 | 8/2002 | Langhart et al. | |
| 2003/0161097 A1 | 8/2003 | Le et al. | |
| 2003/0165246 A1 | 9/2003 | Kvaloy et al. | |
| 2004/0042103 A1 | 3/2004 | Mayer | |
| 2004/0109668 A1 | 6/2004 | Stuckman | |
| 2004/0125965 A1 | 7/2004 | Alberth, Jr. et al. | |
| 2004/0190737 A1 | 9/2004 | Kuhnel et al. | |
| 2004/0196992 A1 | 10/2004 | Ryan | |
| 2004/0203351 A1 | 10/2004 | Shearer et al. | |
| 2005/0078838 A1 | 4/2005 | Simon | |
| 2005/0123146 A1 | 6/2005 | Voix et al. | |
| 2005/0288057 A1 | 12/2005 | Lai et al. | |
| 2006/0067551 A1 | 3/2006 | Cartwright et al. | |
| 2006/0083395 A1 | 4/2006 | Allen et al. | |
| 2006/0092043 A1 | 5/2006 | Lagassey | |
| 2006/0195322 A1 | 8/2006 | Broussard et al. | |
| 2006/0204014 A1 | 9/2006 | Isenberg et al. | |
| 2007/0043563 A1 | 2/2007 | Comerford et al. | |
| 2007/0086600 A1 | 4/2007 | Boesen | |
| 2007/0189544 A1 | 8/2007 | Rosenberg | |
| 2007/0291953 A1 | 12/2007 | Ngia et al. | |
| 2008/0031475 A1 * | 2/2008 | Goldstein ............... H04W 4/80 381/151 | |
| 2008/0037801 A1 | 2/2008 | Alves et al. | |
| 2008/0165988 A1 | 7/2008 | Terlizzi et al. | |
| 2008/0240458 A1 * | 10/2008 | Goldstein ............ H04R 1/1083 381/72 | |
| 2009/0010456 A1 | 1/2009 | Goldstein et al. | |
| 2009/0024234 A1 | 1/2009 | Archibald | |
| 2010/0061564 A1 | 3/2010 | Clemow et al. | |
| 2010/0142715 A1 * | 6/2010 | Goldstein ............. G06F 16/683 381/56 | |
| 2010/0296668 A1 | 11/2010 | Lee et al. | |
| 2011/0096939 A1 | 4/2011 | Ichimura | |
| 2011/0264447 A1 | 10/2011 | Visser et al. | |
| 2011/0293103 A1 | 12/2011 | Park et al. | |
| 2016/0007111 A1 * | 1/2016 | Honeycutt ............. H04R 1/028 381/71.6 | |
| 2016/0104452 A1 | 4/2016 | Guan et al. | |
| 2017/0215011 A1 * | 7/2017 | Goldstein ............ H04R 25/305 | |
| 2018/0011682 A1 * | 1/2018 | Milevski .................. G06F 3/165 | |
| 2018/0113673 A1 * | 4/2018 | Sheynblat ............ H04R 1/1016 | |
| 2020/0175977 A1 | 6/2020 | LaBosco | |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

* cited by examiner

METHODS AND SYSTEMS FOR PROCESSING, STORING, AND PUBLISHING DATA COLLECTED BY AN IN-EAR DEVICE

CROSS REFERENCE TO RELATED APPLICATIONS AND PRIORITY

The present application claims priority to and the benefit of U.S. Provisional Patent Application No. 62/669,299, filed May 9, 2018, the entirety of which is hereby incorporated by reference.

FIELD OF THE APPLICATION

This disclosure relates to an in-ear device, and in particular to techniques for optimizing storage, processing and publishing of data collected by the in-ear device to enable a range of capabilities.

BACKGROUND

Wearable devices are becoming increasingly popular. Users wear smart watches or other devices on their wrists or ankles to track their biometric signals. These types of wearable devices, however, are insufficient when collecting data of the user because the devices are typically worn on the extremities of the user. As such, these wearable devices are not particularly suited to capture certain kinds of information, such as sounds heard or made by the user and/or to capture accurate biometric data. A need exists for devices, methods and systems to capture, process, and publish data in or at the ear of an individual.

SUMMARY

Methods and systems are provided herein for the collection, processing and publishing of data that is captured at or in the ear of the user, such as in the ear canal, such as by one or more processing units that is associated with a sound processing element, such as a microphone, receiver, speaker, or the like. Among other things, such methods and systems may facilitate capture of ambient sound, including sound that contains recognizable sound signatures (including ones that are machine-recognizable, such as by one or more pattern recognition systems, including machine learning and/or artificial intelligence systems), sound that includes human speech (such as words spoken by user of an in-ear device, words spoken by others to such a user, or words overheard by a user in an environment), sounds that correspond to content elements (such as music content, audio content from television, video, and film, sound from reading of electronic books, and the like). In embodiments, the methods and systems may capture, parse, filter, tag and further process sound to form one or more databases of captured sound, which may include time and location information for sounds heard at or in the ear of a user. The one or more databases may in turn may be queried, such as to identify where and when words are spoken by or to a particular user, to a category of user, or the like, to identify where and when other sounds are heard (such as noises, sirens, warning signals, and the like), to identify where and when content has been heard, and for many other purposes. The one or more databases may include publishing features, such as an application programming interface by which one or more applications may access the one or more databases, or a streaming or publishing capability by which the database may publish configured content to one or more applications, devices, systems or individuals. In embodiments, an in-ear device that captures and processes sound may be associated with another user device (such as a smart phone, or a wearable device, such as a watch, wrist band, arm band or glasses) or external system (such as a cloud-based system). Data may be stored and managed by an intelligent agent, such as according to a storage plan that optimizes storage based on various factors, including storage capacity, battery utilization, input/output latency, usefulness of the stored data, and the like. Data may be stored and associated with an individual, such as for personalization of features of an in-ear device or other device or application for a user, and/or data may be aggregated for a population of individuals, such as according to various demographic, psychographic, location, role-based, or other characteristics.

According to some embodiments of the present disclosure, a method is disclosed. The method may include receiving, by a processing device of an in-ear device, an audio signal from one or more microphones of the in-ear device. The method includes further include extracting, by the processing device, one or more features of the audio signal and generating, by the processing device, an in-ear data object based on the one or more features. The method further includes publishing, by the processing device, the in-ear data object to an external system via a network.

In some embodiments, extracting the one or more features of the audio signal includes identifying a plurality of tokens based on a speech portion of the audio signal. Each token of the one or more tokens represents an utterance identified in the speech portion. Note that various definitions of utterance exists and the discussion herein is not intended to be restrictive. For example phonetically an utterance can be defined as a unit of speech bounded by silence (background noise levels). Utterance can also generally refer to a unit of speech, for example an utterance can be a single word, group of words, a clause or a complete sentence.

In some embodiments, the method further includes generating the in-ear data object includes adding the plurality of tokens to the in-ear data object.

In some embodiments, the in-ear data object consists of the plurality of tokens separate from the audio signal.

In some embodiments the in-ear data object includes at least one metric representing a count of a set of words in utterances identified in the speech portion.

In some embodiments, generating the in-ear data object includes generating one or more feature vectors based on the audio signal. In some embodiments, the one or more feature vectors are used to generate the one or more tokens. In some embodiments, the in-ear data object further includes location data indicating a geolocation of the in-ear device. In some embodiments, the in-ear data object further includes heartrate data indicating a heartrate of a user of the in-ear device. In some embodiments, the in-ear data object further includes motion data that is indicative of a motion of a head of the user, where the motion data is collected from one or more motion sensors of the in-ear device.

In some embodiments, generating the in-ear data object further includes: labeling at least a subset of the tokens with respective labels, identifying one or more relationships between two or more tokens of the plurality of tokens, generating an annotation object based on the labels and the one or more relationships, including the annotation object in the in-ear data object.

In some embodiments, the external system is a data analytics system that utilizes the output object to train a machine-learned model.

In some embodiments, the external system is a user device associated with a user of the in-ear device, and wherein the user device utilizes the annotation object to train a machine-learned model that is personalized for the user.

In some embodiments, the user device is a mobile device of the user of the in-ear device, and wherein the personalized machine-learned model is used to personalize an application on the mobile device based on the accumulation of the annotation objects.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, and a processing device that executes computer-readable instructions. The computer-readable instructions cause the processing device to receive an audio signal from the one or more microphones, extract one or more features of the audio signal, generate an in-ear data object based on the one or more features, and publish the in-ear data object to an external system via a network.

In some embodiments, extracting the one or more features of the audio signal includes identifying a plurality of tokens based on a speech portion of the audio signal. Each token of the one or more tokens represents an utterance identified in the speech portion.

In some embodiments, the computer-readable instructions cause the processing device to generate the in-ear data object includes adding the plurality of tokens to the in-ear data object.

In some embodiments, the in-ear data object consists of the plurality of tokens separate from the audio signal.

In some embodiments the in-ear data object includes at least one metric representing a count of a set of words in utterances identified in the speech portion.

In some embodiments, generating the in-ear data object includes generating one or more feature vectors based on the audio signal. In some embodiments, the one or more feature vectors are used to generate the one or more tokens. In some embodiments, the in-ear data object further includes location data indicating a geolocation of the in-ear device. In some embodiments, the in-ear data object further includes heartrate data indicating a heartrate of a user of the in-ear device. In some embodiments, the in-ear data object further includes motion data that is indicative of a motion of a head of the user, where the motion data is collected from one or more motion sensors of the in-ear device.

In some embodiments, generating the in-ear data object further includes: labeling at least a subset of the tokens with respective labels, identifying one or more relationships between two or more tokens of the plurality of tokens, generating an annotation object based on the labels and the one or more relationships, including the annotation object in the in-ear data object.

In some embodiments, the external system is a data analytics system that utilizes the output object to train a machine-learned model.

In some embodiments, the external system is a user device associated with a user of the in-ear device, and wherein the user device utilizes the annotation object to train a machine-learned model that is personalized for the user.

In some embodiments, the user device is a mobile device of the user of the in-ear device, and wherein the personalized machine-learned model is used to personalize an application on the mobile device based on the accumulation of the annotation objects.

According to some embodiments of the present disclosure, a method is disclosed. The method includes receiving, by a processing device of an in-ear device, an audio signal from one or more microphones of the in-ear device. The method further includes determining, by the processing device, a plurality of tokens based on a speech portion of the audio signal, a text corpus, and a speech recognition model and generating, by the processing device, an annotation object based on the plurality of tokens and a natural language processor. The annotation object is indicative of at least one possible meaning of the speech portion of the audio signal. The method further includes determining, by the processing device, whether to store the annotation object on a storage device of the in-ear device or at an external device based on a decision model. The method further includes at least one of: in response to determining that the annotation object is to be stored on the storage device of the in-ear device, storing, by the processing device, the annotation object on the storage device; and in response to determining that the annotation object is to be stored at an external device, transmitting the annotation object to the external device.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, the external device is a data publishing system that publishes speech related data to other devices. According to some embodiments, the external device is a user device associated with a user of the in-ear system and paired with the in-ear system, and wherein the user device utilizes the annotation object to train a machine-learned model that is personalized for the user.

In some embodiments, the speech recognition model is a Hidden Markov Model.

According to some embodiments, the method further includes receiving, by the processing device, sensor data from a sensor of one or more sensors of the in-ear device. According to some embodiments, generating the annotation object includes: inputting the plurality of tokens to the natural language processor and inputting the sensor data to the natural language processor. The natural language processor outputs the annotation object based on the plurality of tokens and the sensor data. According to some embodiments, the method further includes generating, by the processing device, metadata based on the sensor data and associating, by the processing device, the metadata with the annotation object corresponding to the spoken portion, wherein the metadata is stored with the annotation object. In some embodiments, the sensor is an accelerometer. In some embodiments, the sensor is a heartrate monitor. In some embodiments, the sensor is a body temperature sensor. In some embodiments, the sensor is a heat flux sensor. In some embodiments, the sensor is a galvanic skin response sensor. In some embodiments, the sensor is a pressure sensor. In some embodiments, the sensor is a vibration sensor. In some embodiments, the sensor is an optical sensor. In some embodiments, the sensor is a blood flow sensor. In some embodiments, the sensor is a chemical sensor. According to some embodiments, the decision model is a machine-learned model trained to determine whether the speech portion contains private information, and in response to determining that the speech portion likely contains private information, the machine-learned decision model determines that the annotation object is to be stored in the storage device of the in-ear device.

According to some embodiments, the decision model is a machine-learned decision model trained to determine whether or not the speech portion contains private information, and in response to determining that the speech portion contains non-private information, the machine-learned decision model determines that the annotation object may be transmitted for storage on the external device.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, a storage device, and a processing device that executes computer-readable instructions. The computer-readable instructions cause the processing device to receive an audio signal from the one or more microphones, determine a plurality of tokens based on a speech portion of the audio signal, a text corpus, and a speech recognition model, and generate an annotation object based on the plurality of tokens and a natural language processor. The annotation object being indicative of at least one possible meaning of the speech portion of the audio signal. The computer-readable instructions further cause the processing device to determine whether to store the annotation object on the storage device of the in-ear device or at an external device based on a decision model and at least one of: in response to determining that the annotation object is to be stored on the storage device of the in-ear device, store the annotation object on the storage device; and in response to determining that the annotation object is to be stored at an external device, transmit the annotation object to the external device.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, the external device is a data publishing system that publishes speech related data to other devices. According to some embodiments, the external device is a user device associated with a user of the in-ear system and paired with the in-ear system, and wherein the user device utilizes the annotation object to train a machine-learned model that is personalized for the user.

In some embodiments, the speech recognition model is a Hidden Markov Model.

According to some embodiments, the computer-readable instructions further cause the processing device to receive sensor data from a sensor of one or more sensors of the in-ear device. According to some embodiments, generating the annotation object includes: inputting the plurality of tokens to the natural language processor and inputting the sensor data to the natural language processor. The natural language processor outputs the annotation object based on the plurality of tokens and the sensor data. According to some embodiments, the computer-readable instructions further cause the processing device to generate metadata based on the sensor data and associating, by the processing device, the metadata with the annotation object corresponding to the spoken portion, wherein the metadata is stored with the annotation object. In some embodiments, the sensor is an accelerometer. In some embodiments, the sensor is a heart-rate monitor. In some embodiments, the sensor is a body temperature sensor. In some embodiments, the sensor is a heat flux sensor. In some embodiments, the sensor is a galvanic skin response sensor. In some embodiments, the sensor is a pressure sensor. In some embodiments, the sensor is a vibration sensor. In some embodiments, the sensor is an optical sensor. In some embodiments, the sensor is a blood flow sensor. In some embodiments, the sensor is a chemical sensor. According to some embodiments, the decision model is a machine-learned model trained to determine whether the speech portion contains private information, and in response to determining that the speech portion likely contains private information, the machine-learned decision model determines that the annotation object is to be stored in the storage device of the in-ear device.

According to some embodiments, the decision model is a machine-learned decision model trained to determine whether or not the speech portion contains private information, and in response to determining that the speech portion contains non-private information, the machine-learned decision model determines that the annotation object may be transmitted for storage on the external device.

According to some embodiments of the present disclosure, a method is disclosed. The method includes receiving, by a processing device of an in-ear device, an audio signal from one or more microphones of the in-ear device, extracting, by the processing device, one or more features of the audio signal, and generating, by the processing device, an in-ear data object based on the one or more features. The method further includes determining, by the processing device, a storage plan based on the one or more features of the audio signal and a decision model that is configured to output storage location recommendations based on a set of input features, wherein each storage location recommendation corresponds to a different storage location of a plurality of possible storage locations. The method also includes storing, by the processing device, the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data object includes adding the plurality of tokens to the in-ear data object. In some embodiments, generating the in-ear data object consists of including the plurality of tokens separate from the audio signal. In some embodiments, generating the in-ear data object includes identifying a sound portion of the audio signal, generating a sound signature of the audio signal based on the audio signal, and including the sound signature in the in-ear data object. In some embodiments, the method further includes storing a time stamp for the time at which the sound portion of the audio signal was received at the microphone. According to some embodiments, generating the in-ear data object includes: identifying a sound portion of the audio signal, generating a sound signature of the audio signal based on the audio signal, identifying the sound signature, and storing a token representing the identity of the sound signature in the in-ear data object. In some embodiments, the method further includes storing a time stamp for the time at which the sound portion of the audio signal was received at the microphone.

According to some embodiments, the plurality of possible storage locations includes a storage device of the in-ear device, a user device associated with a user of the in-ear device, and one or more external systems.

According to some embodiments, the decision model outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the method further includes obtaining, by the processing device, sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, a storage device, and a processing device that executes computer-readable instructions. The computer-readable instructions cause the processing device to receive an audio signal from one or more microphones of the in-ear device, extract one or more features of the audio signal, generate an in-ear data object based on the one or more features, and determine a storage plan based on the one or more features of the audio signal and a decision model that is configured to output storage location recommendations based on a set of input features. Each storage location recommendation corresponds to a different storage location of a plurality of possible storage locations. The computer-readable instructions further cause the processing device to store the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data object includes adding the plurality of tokens to the in-ear data object. In some embodiments, generating the in-ear data object consists of including the plurality of tokens separate from the audio signal. In some embodiments, generating the in-ear data object includes identifying a sound portion of the audio signal, generating a sound signature of the audio signal based on the audio signal, and including the sound signature in the in-ear data object. In some embodiments, the computer-readable instructions further cause the processing device to store a time stamp for the time at which the sound portion of the audio signal was received at the microphone. According to some embodiments, generating the in-ear data object includes identifying a sound portion of the audio signal, generating a sound signature of the audio signal based on the audio signal, identifying the sound signature, and storing a token representing the identity of the sound signature in the in-ear data object. In some embodiments, the computer-readable instructions further cause the processing device to store a time stamp for the time at which the sound portion of the audio signal was received at the microphone.

According to some embodiments, the plurality of possible storage locations includes a storage device of the in-ear device, a user device associated with a user of the in-ear device, and one or more external systems.

According to some embodiments, the decision model outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the computer-readable instructions further cause the processing device to obtain sensor data from one or more sensors of the in-ear device during the receiving of the audio signal, determine one or more biometric features of a user of the in-ear device based on the sensor data, and include the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments of the present disclosure, a method is disclosed. The method includes receiving, by a processing device of an in-ear device, an audio signal from one or more microphones of the in-ear device, extracting, by the processing device, one or more features of the audio signal, and generating, by the processing device, an in-ear data object based on the one or more features. The method further includes determining, by the processing device, a storage plan based on the one or more features of the audio signal and a decision model that is trained to output storage location recommendations based on a set of input features. Each storage location recommendation corresponds to a different storage location of a plurality of possible storage locations. The method further includes obtaining, by the processing device, user feedback regarding one or more of the plurality of possible storage locations from a user of the in-ear device, updating, by the processing device, based on the user feedback, and storing, by the processing device, the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, obtaining user feedback regarding the one or more of the plurality of possible storage locations includes outputting a prompt for user feedback asking the user whether the in-ear device has permission to store the in-ear data object at a possible storage location of the possible storage locations, receiving a feedback signal from the user, and processing the feedback signal to determine whether the user grants or denies permission to store the in-ear data object at the possible storage location. In some embodiments, the feedback signal from the user is received as an audio signal via the one or more microphones. In some embodiments, the feedback signal from the user is received on a user device of the user that is in communication with the in-ear device. In some embodiments, the feedback signal relates to a category of in-ear data objects, such that permission for a plurality of instances in the category is determined by feedback with respect to a particular instance. In some embodiments, the feedback signal relates to a specific instance of an in-ear data object, such that permission to store each in-ear data object is granted on an object-by-object basis.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data object includes adding the plurality of tokens to the in-ear data object. In some embodiments, generating the in-ear data object consists of including the plurality of tokens separate from the audio signal. In some embodiments, generating the in-ear data object includes at least one metric representing a count of a set of words in utterances identified in the speech portion. According to some embodiments, generating the in-ear data object includes identifying a sound portion of the audio signal, generating a sound signature of the audio signal based on the audio signal, and including the sound signature in the in-ear data object. In some embodiments, the method further includes storing a time stamp for the time at which the sound portion of the audio signal was received at the microphone.

According to some embodiments, generating the in-ear data object includes identifying a sound portion of the audio signal, generating a sound signature of the audio signal based on the audio signal, identifying the sound signature, and storing a token representing the identity of the sound signature in the in-ear data object. In some embodiments, the method further includes storing a time stamp for the time at which the sound portion of the audio signal was received at the microphone.

According to some embodiments, the plurality of possible storage locations includes a storage device of the in-ear device, a user device associated with a user of the in-ear device, and one or more external systems.

According to some embodiments, the decision model is a machine-learned decision model that outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the method further comprises obtaining, by the processing device, sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, a storage device, and a processing device that executes computer-readable instructions. The computer-readable instructions cause the processing device to receive an audio signal from the one or more microphones of the in-ear device, extract one or more features of the audio signal, generate an in-ear data object based on the one or more features, determine a storage plan based on the one or more features of the audio signal and a decision model that is trained to output storage location recommendations based on a set of input features. Each storage location recommendation corresponds to a different storage location of a plurality of possible storage locations. The computer-readable-instructions further cause the processing device to obtain user feedback regarding one or more of the plurality of possible storage locations from a user of the in-ear device, update based on the user feedback, and store the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, obtaining user feedback regarding the one or more of the plurality of possible storage locations includes outputting a prompt for user feedback asking the user whether the in-ear device has permission to store the in-ear data object at a possible storage location of the possible storage locations, receiving a feedback signal from the user, and processing the feedback signal to determine whether the user grants or denies permission to store the in-ear data object at the possible storage location. In some embodiments, the feedback signal from the user is received as an audio signal via the one or more microphones. In some embodiments, the feedback signal from the user is received on a user device of the user that is in communication with the in-ear device. In some embodiments, the feedback signal relates to a category of in-ear data objects, such that permission for a plurality of instances in the category is determined by feedback with respect to a particular instance. In some embodiments, the feedback signal relates to a specific instance of an in-ear data object, such that permission to store each in-ear data object is granted on an object-by-object basis.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data object includes adding the plurality of tokens to the in-ear data object. In some embodiments, generating the in-ear data object consists of including the plurality of tokens separate from the audio signal. In some embodiments, generating the in-ear data object includes at least one metric representing a count of a set of words in utterances identified in the speech portion. According to some embodiments, generating the in-ear data object includes identifying a sound portion of the audio signal, generating a sound signature of the audio signal based on the audio signal, and including the sound signature in the in-ear data object. In some embodiments, the computer-readable instructions further cause the processing device to store a time stamp for the time at which the sound portion of the audio signal was received at the microphone.

According to some embodiments, generating the in-ear data object includes identifying a sound portion of the audio signal, generating a sound signature of the audio signal based on the audio signal, identifying the sound signature, and storing a token representing the identity of the sound signature in the in-ear data object. In some embodiments, the computer-readable instructions further cause the processing device to store a time stamp for the time at which the sound portion of the audio signal was received at the microphone.

According to some embodiments, the plurality of possible storage locations includes a storage device of the in-ear device, a user device associated with a user of the in-ear device, and one or more external systems.

According to some embodiments, the decision model is a machine-learned decision model that outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the computer-readable instructions further cause the processing device to obtain sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments of the present disclosure, a method is disclosed. The method includes receiving, by a processing device of an in-ear device, an audio signal from one or more microphones of the in-ear device, identifying, by the processing device, a speech portion of the audio signal that contains speech of a user of the in-ear device, and determining, by the processing device, a plurality of tokens based on the speech portion of the audio signal that contains the speech of the user, a text corpus, and a speech recognition model, and generating, by the processing device, an annotation object based on the plurality of tokens and a natural language processor. The annotation object is indicative of a possible meaning of the speech of the user. The method further includes generating, by the processing device, an in-ear data object based on the annotation object and determining, by the processing device, a storage plan based on one or more features of the annotation object and a decision model that is trained to output storage location recommendations based on a set of input features. Each storage location recommendation corresponds to a different storage location of a plurality of possible storage locations. The plurality of possible storage locations include a storage device of the in-ear device, a user device associated with a user of the in-ear device, and one or more external systems. The method further includes storing, by the processing device, the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

In some embodiments, the one or more external systems include a data publishing system that publishes speech related data to other systems. In some embodiments, the method further includes receiving, by the processing device, sensor data from a sensor of the in-ear device. According to some embodiments, generating the annotation object includes inputting the plurality of tokens to the natural language processor and inputting the sensor data to the natural language processor. The natural language processor outputs the annotation object based on the plurality of tokens and the sensor data.

In some embodiments, the method further includes generating, by the processing device, metadata corresponding to the speech portion of the audio signal based on the sensor data and associating, by the processing device, the metadata with the annotation object to which the spoken portion corresponds, wherein the metadata is stored with the annotation object. In some embodiments, the method further includes storing a time stamp for the time at which the speech portion of the audio signal was received at the one or more microphones.

In some embodiments, the sensor is an accelerometer embedded in the in-ear device and the sensor data includes motion data that is indicative of a motion of a head of the user. In some embodiments, the sensor is a heartrate monitor and the sensor data includes heartrate data indicating a heartrate of a user of the in-ear device. In some embodiments, the sensor is a body temperature sensor and the sensor data includes temperature data indicating a body temperature of the user measured in the ear canal of the user. In some embodiments, the sensor is indicative of motion of the body of the user. In some embodiments, the sensor provides heat flux data from the ear canal of the user. In some embodiments, the sensor provides galvanic skin response data from the ear canal of the user.

According to some embodiments, the decision model is trained to determine whether the speech portion contains private information, and in response to determining that the speech portion likely contains private information, the decision model determines that the annotation object is to be stored in the storage device of the in-ear device.

According to some embodiments, the decision model is a machine-learned decision model that outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, a storage device, and a processing device that executes computer-readable instructions. The computer-readable instructions cause the processing device to receive an audio signal from the one or more microphones of the in-ear device, identify a speech portion of the audio signal that contains speech of a user of the in-ear device, determine a plurality of tokens based on the speech portion of the audio signal that contains the speech of the user, a text corpus, and a speech recognition model, and generate an annotation object based on the plurality of tokens and a natural language processor. The annotation object is indicative of a possible meaning of the speech of the user. The computer-readable instructions further cause the processing device to generate an in-ear data object based on the annotation object and determine a storage plan based on one or more features of the annotation object and a decision model that is trained to output storage location recommendations based on a set of input features. Each storage location recommendation corresponds to a different storage location of a plurality of possible storage locations, and the plurality of possible storage locations include a storage device of the in-ear device, a user device associated with a user of the in-ear device, and one or more external systems. The computer-readable instructions further cause the processing device to store the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

In some embodiments, the one or more external systems include a data publishing system that publishes speech related data to other systems. In some embodiments, the computer-readable instructions further cause the processing device to receive sensor data from a sensor of the in-ear device. According to some embodiments, generating the annotation object includes inputting the plurality of tokens to the natural language processor and inputting the sensor data to the natural language processor. The natural language processor outputs the annotation object based on the plurality of tokens and the sensor data.

In some embodiments, the computer-readable instructions further cause the processing device to generate metadata corresponding to the speech portion of the audio signal based on the sensor data and associating, by the processing device, the metadata with the annotation object to which the spoken portion corresponds, wherein the metadata is stored with the annotation object. In some embodiments, the computer-readable instructions further cause the processing device to store a time stamp for the time at which the speech portion of the audio signal was received at the one or more microphones.

In some embodiments, the sensor is an accelerometer embedded in the in-ear device and the sensor data includes motion data that is indicative of a motion of a head of the user. In some embodiments, the sensor is a heartrate monitor and the sensor data includes heartrate data indicating a heartrate of a user of the in-ear device. In some embodiments, the sensor is a body temperature sensor and the sensor data includes temperature data indicating a body temperature of the user measured in the ear canal of the user. In some embodiments, the sensor is indicative of motion of the body of the user. In some embodiments, the sensor provides heat flux data from the ear canal of the user. In some embodiments, the sensor provides galvanic skin response data from the ear canal of the user.

According to some embodiments, the decision model is trained to determine whether the speech portion contains private information, and in response to determining that the speech portion likely contains private information, the decision model determines that the annotation object is to be stored in the storage device of the in-ear device.

According to some embodiments, the decision model is a machine-learned decision model that outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments of the present disclosure, a method is disclosed. The method includes receiving, by a processing device of an in-ear device, an audio signal from one or more microphones of the in-ear device, identifying, by the processing device, a speech portion of the audio signal that contains speech of a user of the in-ear device, determining, by the processing device, a plurality of tokens based on the speech portion of the audio signal that contains the speech of the user, a text corpus, and a speech recognition model, and generating, by the processing device, an annotation object based on the plurality of tokens and a natural language processor. The annotation object is indicative of a possible meaning of the speech of the user. The method further includes generating, by the processing device, an in-ear data object based on the annotation object and publishing, by the processing device, the in-ear data object to one or more external systems via a communication network.

According to some embodiments, the one or more external systems include a data publishing system that publishes speech related data to other systems. In some embodiments, the one or more external systems include an analytics system that receives speech related data and trains at least one machine-learning model based on the speech related data. In some embodiments, the one or more external systems include an analytics system that receives in-ear data objects from a plurality of in-ear devices and trains at least one machine-learning model based on the speech related data. In some embodiments, the one or more external systems include an analytics system that receives in-ear data objects from a plurality of in-ear devices and performs speech-related analytics on the in-ear data objects. In some embodiments, the one or more external systems include an entertainment system that receives in-ear data objects from a plurality of in-ear devices and trains at least one model configured to determine media content recommendations based on the in-ear data objects. In some embodiments, the external system is a cloud-based processing system. In some embodiments, the external system is a machine learning system that learns based on the in-ear data objects. In some embodiments, the external system is a content management system that manages content for the user, wherein at least one content management decision is based on at least one of the published in-ear data objects. In some embodiments, the content management system selects an audio content item to be played for the user in the in-ear device based on the published in-ear data objects. In some embodiments, the content management system selects a content item to be played for the user on a user device other than the in-ear device based on the published in-ear data objects. In some embodiments, the user device is a mobile device of the user of the in-ear device.

According to some embodiments, the method further includes obtaining, by the processing device, sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments, identifying the speech portion of the audio signal that contains the speech of the user includes analyzing a plurality of composite audio signals to determine a direction of an audio source present in the audio signal with respect to the in-ear device and determining that the audio signal contains the speech of the user when the direction of the audio source indicates that the audio source is inside a head of the user. The plurality of composite audio signals make up the audio signal.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, and a processing device that executes computer-readable instructions. The computer-readable instructions cause the processing device to receive an audio signal from the one or more microphones, identify a speech portion of the audio signal that contains speech of a user of the in-ear device, and determine a plurality of tokens based on the speech portion of the audio signal that contains the speech of the user, a text corpus, and a speech recognition model. The computer-readable instructions further cause the processing device to generate an annotation object based on the plurality of tokens and a natural language processor, the annotation object being indicative of a possible meaning of the speech of the user. The computer-readable instructions further cause the processing device to generate an in-ear data object based on the annotation object and publish the in-ear data object to one or more external systems via a communication network.

According to some embodiments, the one or more external systems include a data publishing system that publishes speech related data to other systems. In some embodiments, the one or more external systems include an analytics system that receives speech related data and trains at least one machine-learning model based on the speech related data. In some embodiments, the one or more external systems include an analytics system that receives in-ear data objects from a plurality of in-ear devices and trains at least one machine-learning model based on the speech related data. In some embodiments, the one or more external systems include an analytics system that receives in-ear data objects from a plurality of in-ear devices and performs speech-related analytics on the in-ear data objects. In some embodiments, the one or more external systems include an entertainment system that receives in-ear data objects from a plurality of in-ear devices and trains at least one model configured to determine media content recommendations based on the in-ear data objects. In some embodiments, the external system is a cloud-based processing system. In some embodiments, the external system is a machine learning system that learns based on the in-ear data objects. In some embodiments, the external system is a content management system that manages content for the user, wherein at least one content management decision is based on at least one of the published in-ear data objects. In some embodiments, the content management system selects an audio content item to be played for the user in the in-ear device based on the published in-ear data objects. In some embodiments, the content management system selects a content item to be played for the user on a user device other than the in-ear device based on the published in-ear data objects. In some embodiments, the user device is a mobile device of the user of the in-ear device.

According to some embodiments, the method further includes obtaining, by the processing device, sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user. In some embodiments, the one or more biometric features include motion data that is indicative of motion of the body of the user. In some embodiments, the one or more biometric features include heat flux data from the ear canal of the user. In some embodiments, the one or more biometric features include galvanic skin response data from the ear canal of the user.

According to some embodiments, identifying the speech portion of the audio signal that contains the speech of the user includes analyzing a plurality of composite audio signals to determine a direction of an audio source present in the audio signal with respect to the in-ear device and determining that the audio signal contains the speech of the user when the direction of the audio source indicates that the audio source is inside a head of the user. The plurality of composite audio signals make up the audio signal.

According to some embodiments of the present disclosure, a method is disclosed. The method includes receiving, by a processing device of an in-ear device, an audio signal from one or more microphones of the in-ear device, identifying, by the processing device, a speech portion of the audio signal that contains speech of a user of the in-ear device, determining, by the processing device, a plurality of tokens based on the speech portion of the audio signal that contains the speech of the user, a text corpus, and a speech recognition model, and generating, by the processing device, an annotation object based on the plurality of tokens and a natural language processor, the annotation object being indicative of a possible meaning of the speech of the user. The method also includes generating, by the processing device, an in-ear data object based on the annotation object. The method also includes determining, by the processing device, a storage plan based on one or more features of the annotation object and a decision model that is configured to output storage location recommendations based on a set of input features. Each storage location recommendation corresponds to a different storage location of a plurality of possible storage locations, and wherein the plurality of possible storage locations include a storage device of the in-ear device, a user device associated with a user of the in-ear device, and one or more external systems. The method further includes obtaining, by the processing device, user feedback regarding one or more of the plurality of possible storage locations from a user of the in-ear device, updating, by the processing device, based on the user feedback, and storing, by the processing device, the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, obtaining user feedback regarding the one or more of the plurality of possible storage locations includes outputting a prompt for user feedback asking the user whether the in-ear device has permission to store the in-ear data object at a possible storage location of the possible storage locations, receiving a user feedback signal, and processing the feedback audio signal to determine whether the user grants or denies permission to store the in-ear data object at the possible storage location. In some embodiments, the feedback signal from the user is received as an audio signal via the one or more microphones. In some embodiments, the feedback signal from the user is received on a user device of the user that is in communication with the in-ear device. According to some embodiments, the feedback signal relates to a category of in-ear data objects, such that permission for a plurality of instances in the category is determined by feedback with respect to a particular instance. According to some embodiments, the feedback signal relates to a specific instance of an in-ear data object, such that permission to store each in-ear data object is granted on an object-by-object basis.

According to some embodiments, generating the in-ear data object includes adding the plurality of tokens to the in-ear data object. According to some embodiments, generating the in-ear data object includes adding the plurality of tokens to an in-ear data object apart from the audio signal.

According to some embodiments, generating the in-ear data object includes identifying a sound portion of the audio signal, generating a sound signature of the audio signal based on the audio signal, and including the sound signature in the in-ear data object.

According to some embodiments, generating the in-ear data object includes identifying a sound portion of the audio signal, generating a sound signature of the audio signal based on the audio signal, identifying the sound signature, generating a token for the identity of the sound signature, including the token identifying the sound signature in the in-ear data object.

According to some embodiments, the plurality of possible storage locations includes a storage device of the in-ear device, a user device associated with a user of the in-ear device, and one or more external systems. In some embodiments, the decision model outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the computer-readable instructions further cause the processing device to obtain sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user.

In some embodiments, the one or more biometric features include motion data that is indicative of motion of the body of the user. In some embodiments, the one or more biometric features includes heat flux data from the ear canal of the user. In some embodiments, the one or more biometric features includes galvanic skin response data from the ear canal of the user.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, a storage device, and a processing device that executes computer-readable instructions. The computer-readable instructions cause the processing device to receive an audio signal from the one or more microphones of the in-ear device, identify a speech portion of the audio signal that contains speech of a user of the in-ear device, determine a plurality of tokens based on the speech portion of the audio signal that contains the speech of the user, a text corpus, and a speech recognition model, and generate an annotation object based on the plurality of tokens and a natural language processor. The annotation object is indicative of a possible meaning of the speech of the user. The computer-readable instructions further cause the processing device to generate an in-ear data object based on the annotation object and determine a storage plan based on one or more features of the annotation object and a decision model that is configured to output storage location recommendations based on a set of input features. Each storage location recommendation corresponds to a different storage location of a plurality of possible storage locations, and the plurality of possible storage locations include a storage device of the in-ear device, a user device associated with a user of the in-ear device, and one or more external systems. The computer-readable instructions further cause the processing device to obtain user feedback regarding one or more of the plurality of possible storage locations from a user of the in-ear device, update based on the user feedback, and store the in-ear data object according to the storage plan.

According to some embodiments, the decision model is a machine-learned decision model. In some embodiments, the machine-learned decision model is trained using a data set of decisions by one or more human operators. In some embodiments, the machine-learned decision model is trained based on a feedback metric that relates to the utilization of a plurality of stored in-ear data objects.

According to some embodiments, obtaining user feedback regarding the one or more of the plurality of possible storage locations includes outputting a prompt for user feedback asking the user whether the in-ear device has permission to store the in-ear data object at a possible storage location of the possible storage locations, receiving a user feedback signal, and processing the feedback audio signal to determine whether the user grants or denies permission to store the in-ear data object at the possible storage location. In some embodiments, the feedback signal from the user is received as an audio signal via the one or more microphones. In some embodiments, the feedback signal from the user is received on a user device of the user that is in communication with the in-ear device. According to some embodiments, the feedback signal relates to a category of in-ear data objects, such that permission for a plurality of instances in the category is determined by feedback with respect to a particular instance. According to some embodiments, the feedback signal relates to a specific instance of an in-ear data object, such that permission to store each in-ear data object is granted on an object-by-object basis.

According to some embodiments, generating the in-ear data object includes adding the plurality of tokens to the in-ear data object. According to some embodiments, generating the in-ear data object includes adding the plurality of tokens to an in-ear data object apart from the audio signal.

According to some embodiments, generating the in-ear data object includes identifying a sound portion of the audio signal, generating a sound signature of the audio signal based on the audio signal, and including the sound signature in the in-ear data object.

According to some embodiments, generating the in-ear data object includes identifying a sound portion of the audio signal, generating a sound signature of the audio signal based on the audio signal, identifying the sound signature, generating a token for the identity of the sound signature, including the token identifying the sound signature in the in-ear data object.

According to some embodiments, the plurality of possible storage locations includes a storage device of the in-ear device, a user device associated with a user of the in-ear device, and one or more external systems. In some embodiments, the decision model outputs, for each potential storage location, a respective confidence score corresponding to the potential storage location that indicates whether the in-ear data object is to be stored at the potential location. In some embodiments, determining the storage plan includes including each potential storage location having a respective confidence score that is greater than a threshold as a storage recommendation.

According to some embodiments, the computer-readable instructions further cause the processing device to obtain sensor data from one or more sensors of the in-ear device during the receiving of the audio signal, determining, by the processing device, one or more biometric features of a user of the in-ear device based on the sensor data, and including, by the processing device, the one or more biometric features in the in-ear data object. In some embodiments, the one or more biometric features include heartrate data indicating a heartrate of a user of the in-ear device. In some embodiments, the one or more biometric features include motion data that is indicative of a motion of a head of the user, where the motion data is collected from one or more motion sensors of the in-ear device. In some embodiments, the one or more biometric features include temperature data indicating a body temperature of the user measured in the ear canal of the user.

In some embodiments, the one or more biometric features include motion data that is indicative of motion of the body of the user. In some embodiments, the one or more biometric features includes heat flux data from the ear canal of the user. In some embodiments, the one or more biometric features includes galvanic skin response data from the ear canal of the user.

According to some embodiments of the present disclosure, a method is disclosed. The method includes receiving, by a processing device of an in-ear device, an audio signal from one or more microphones of the in-ear device, extracting, by the processing device, one or more features of the audio signal, generating, by the processing device, an in-ear data record based on the one or more features, and storing, by the processing device, the in-ear data record in a database stored on the in-ear device. The database indexes in-ear data records in one or more indexes according to a plurality of different feature types and the feature types include at least one of speech-related feature types and sound-related feature types. The method further includes receiving, by the processing device, a data request from an external system, the data request being used to define one or more characteristics corresponding to one or more respective feature types. The method further includes responding to the data request with a response that is based on at least one of the indexed in-ear data records.

According to some embodiments, the method further includes determining, by the processing device, whether the external system is a white-listed external system and in response to determining that the external system is a white-listed external system: retrieving, by the processing device, one or more responsive in-ear data records from the database based on the data request and the one or more indexes, the one or more responsive in-ear data records having the one or more characteristics defined in the data request; and transmitting, by the processing device, respective contents of the one or more responsive in-ear data records to the external system.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data record includes adding the plurality of tokens to the in-ear data record. In some embodiments, generating the in-ear data object includes adding the plurality of tokens to an in-ear data object apart from the audio signal. In some embodiments, generating the in-ear data record further includes labeling at least a subset of the tokens with respective labels, identifying one or more relationships between two or more tokens of the plurality of tokens, generating an annotation object based on the labels and the one or more relationships, including the annotation object in the in-ear data record.

According to some embodiments, generating the in-ear data record includes generating one or more feature vectors based on the audio signal. In some embodiments, the one or more in-ear data records further includes location data indicating a geolocation of the in-ear device. In some embodiments, the one or more in-ear data records further include time stamp information based on the timing of the audio signal. In some embodiments, at least one of the one or more in-ear data records further includes heartrate data indicating a heartrate of a user of the in-ear device. In some embodiments, at least one of the one or more in-ear data records further includes motion data that is indicative of a motion of a head of the user, where the motion data is collected from one or more motion sensors of the in-ear device. In some embodiments, at least one of the one or more in-ear data records further includes galvanic skin response data from the ear canal of the user. In some embodiments, at least one of the one or more in-ear data records further includes heat flux data from the ear canal of the user. In some embodiments, at least one of the one or more in-ear data records further includes motion data that is indicative of motion the user.

In some embodiments, the external system is a data analytics system that utilizes the output object to train a machine-learned model. In some embodiments, the external system is a data publishing system that aggregates in-ear data from a plurality of different in-ear devices.

According to some embodiments of the present disclosure, an in-ear device is disclosed. The in-ear device includes a housing configured and dimensioned to fit in an ear canal of a user, one or more sensors, one or more microphones, a communication unit configured to communicate via a network, and a storage device that stores a database that indexes in-ear data records in one or more indexes according to a plurality of different feature types. The feature types include at least one of speech-related feature types and sound-related feature types. The in-ear device further includes a processing device that executes computer-readable instructions. The computer-readable instructions cause the processing device to receive an audio signal from the one or more microphones of the in-ear device, extract one or more features of the audio signal, generate an in-ear data record based on the one or more features, and store the in-ear data record in the database. The computer-readable instructions further cause the processing device to receive a data request from an external system, the data request being used to define one or more characteristics corresponding to one or more respective feature types and respond to the data request with a response that is based on at least one of the indexed in-ear data records.

According to some embodiments, the computer-readable instructions further cause the processing device to determine whether the external system is a white-listed external system and in response to determining that the external system is a white-listed external system: retrieve one or more responsive in-ear data records from the database based on the data request and the one or more indexes, the one or more responsive in-ear data records having the one or more characteristics defined in the data request; and transmit respective contents of the one or more responsive in-ear data records to the external system.

According to some embodiments, extracting the one or more features of the audio signal includes identifying a plurality of tokens based on a speech portion of the audio signal, wherein each token of the one or more tokens represents an utterance identified in the speech portion. In some embodiments, generating the in-ear data record includes adding the plurality of tokens to the in-ear data record. In some embodiments, generating the in-ear data object includes adding the plurality of tokens to an in-ear data object apart from the audio signal. In some embodiments, generating the in-ear data record further includes labeling at least a subset of the tokens with respective labels, identifying one or more relationships between two or more tokens of the plurality of tokens, generating an annotation object based on the labels and the one or more relationships, including the annotation object in the in-ear data record.

According to some embodiments, generating the in-ear data record includes generating one or more feature vectors based on the audio signal. In some embodiments, the one or more in-ear data records further includes location data indicating a geolocation of the in-ear device. In some embodiments, the one or more in-ear data records further include time stamp information based on the timing of the audio signal. In some embodiments, at least one of the one or more in-ear data records further includes heartrate data indicating a heartrate of a user of the in-ear device. In some embodiments, at least one of the one or more in-ear data records further includes motion data that is indicative of a motion of a head of the user, where the motion data is collected from one or more motion sensors of the in-ear device. In some embodiments, at least one of the one or more in-ear data records further includes galvanic skin response data from the ear canal of the user. In some embodiments, at least one of the one or more in-ear data records further includes heat flux data from the ear canal of the user. In some embodiments, at least one of the one or more in-ear data records further includes motion data that is indicative of motion the user.

In some embodiments, the external system is a data analytics system that utilizes the output object to train a machine-learned model. In some embodiments, the external system is a data publishing system that aggregates in-ear data from a plurality of different in-ear devices.

According to some embodiments of the present disclosure, a method is disclosed. The method includes receiving, by a processing system of a data publication system, a request from an external system for in-ear data records, the data request being used by the processing system to define one or more characteristics corresponding to one or more respective feature types. The method further includes retrieving, by the processing system, one or more data records from a database based on the one or more characteristics. The database stores a plurality of audio records, each audio record including processed audio data that corresponds to an audio signal captured from an in-ear device of a plurality of in-ear devices, biometric data corresponding to a user of the in-ear device sensed by a sensor of the in-ear device, and metadata relating to the captured audio signal. The method also includes transmitting, by the processing system, contents of the one or more data records to the external system.

According to some embodiments, at least one of the audio records is time stamped based on the timing of the audio signals used to generate the audio record. According to some embodiments, the plurality of audio records are speech records that each include features of a processed speech portion of a respective audio signal. In some embodiments, the features of the processed speech portion of the respective audio signal include one or more tokens corresponding to recognized utterances captured in the speech portion of the audio signal. In some embodiments, the features of the processed speech portion of the respective audio signal include an annotation object indicating a meaning of the speech portion of the audio signal.

According to some embodiments, the plurality of audio records are sound records that each include features of a processed sound portion of a respective audio signal. In some embodiments, the features of the processed sound portion of the respective audio signal include a classification of a sound recognized in the sound portion of the respective audio signal. In some embodiments, the features of the processed speech portion of the respective audio signal include a sound signature of the sound portion of the respective audio signal.

According to some embodiments, each audio record of the plurality of the audio records includes biometric data that indicates a heartrate of a respective user that was measured from an ear canal of the respective user at a time the respective audio record was captured.

According to some embodiments, each audio record of the plurality of the audio records includes biometric data that indicates a temperature of a respective user that was measured from an ear canal of the respective user at a time the respective audio record was captured.

According to some embodiments, each audio record of the plurality of the audio records includes biometric data that indicates an acceleration of a head of a respective user that was measured from an accelerometer positioned in an ear canal of the respective user at a time the respective audio record was captured.

According to some embodiments, each audio record of the plurality of the audio records includes biometric data that indicates a motion of the user of the in-ear device.

According to some embodiments, each audio record of the plurality of the audio records includes biometric data that indicates heat flux information from the ear canal of the user of the in-ear device.

According to some embodiments, each audio record of the plurality of the audio records includes biometric data that indicates galvanic skin response data from the ear canal of the user of the in-ear device.

According to some embodiments, each audio record of the plurality of the audio records includes metadata that indicates location data corresponding to a respective user at a time the respective audio record was captured.

According to some embodiments, each audio record of the plurality of the audio records includes metadata that indicates timing data corresponding to a respective user at a time the respective audio record was captured.

According to some embodiments, each audio record of the plurality of the audio records includes metadata that indicates a time at which the respective audio record was captured.

According to some implementations of the present disclosure, a data publishing system is disclosed. The data publishing system includes a communication unit configured to communicate via a network and a storage system that stores a database. The database stores a plurality of audio records, each audio record including processed audio data that corresponds to an audio signal captured from an in-ear device of a plurality of in-ear devices, biometric data corresponding to a user of the in-ear device sensed by a sensor of the in-ear device, and metadata relating to the captured audio signal. The data publishing system further includes a processing system that executes computer-readable instructions that cause the processing system to receive a request from an external system for in-ear data records, the data request being used by the processing system to define one or more characteristics corresponding to one or more respective feature types. The computer-readable instructions further cause the processing device to retrieve one or more data records from the database based on the one or more characteristics and transmit contents of the one or more data records to the external system.

According to some embodiments, at least one of the audio records is time stamped based on the timing of the audio signals used to generate the audio record. According to some embodiments, the plurality of audio records are speech records that each include features of a processed speech portion of a respective audio signal. In some embodiments, the features of the processed speech portion of the respective audio signal include one or more tokens corresponding to recognized utterances captured in the speech portion of the audio signal. In some embodiments, the features of the processed speech portion of the respective audio signal include an annotation object indicating a meaning of the speech portion of the audio signal.

According to some embodiments, the plurality of audio records are sound records that each include features of a processed sound portion of a respective audio signal. In some embodiments, the features of the processed sound portion of the respective audio signal include a classification of a sound recognized in the sound portion of the respective audio signal. In some embodiments, the features of the processed speech portion of the respective audio signal include a sound signature of the sound portion of the respective audio signal.

According to some embodiments, each audio record of the plurality of the audio records includes biometric data that indicates a heartrate of a respective user that was measured from an ear canal of the respective user at a time the respective audio record was captured.

According to some embodiments, each audio record of the plurality of the audio records includes biometric data that indicates a temperature of a respective user that was measured from an ear canal of the respective user at a time the respective audio record was captured.

According to some embodiments, each audio record of the plurality of the audio records includes biometric data that indicates an acceleration of a head of a respective user that was measured from an accelerometer positioned in an ear canal of the respective user at a time the respective audio record was captured.

According to some embodiments, each audio record of the plurality of the audio records includes biometric data that indicates a motion of the user of the in-ear device.

According to some embodiments, each audio record of the plurality of the audio records includes biometric data that indicates heat flux information from the ear canal of the user of the in-ear device.

According to some embodiments, each audio record of the plurality of the audio records includes biometric data that indicates galvanic skin response data from the ear canal of the user of the in-ear device.

According to some embodiments, each audio record of the plurality of the audio records includes metadata that indicates location data corresponding to a respective user at a time the respective audio record was captured.

According to some embodiments, each audio record of the plurality of the audio records includes metadata that indicates timing data corresponding to a respective user at a time the respective audio record was captured.

According to some embodiments, each audio record of the plurality of the audio records includes metadata that indicates a time at which the respective audio record was captured.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

The embodiment and the following detailed description of certain embodiments thereof may be understood by reference to the following figures.

Like reference symbols in the various drawings indicate like elements.

DETAILED DESCRIPTION OF THE INVENTION

Figure 1A:
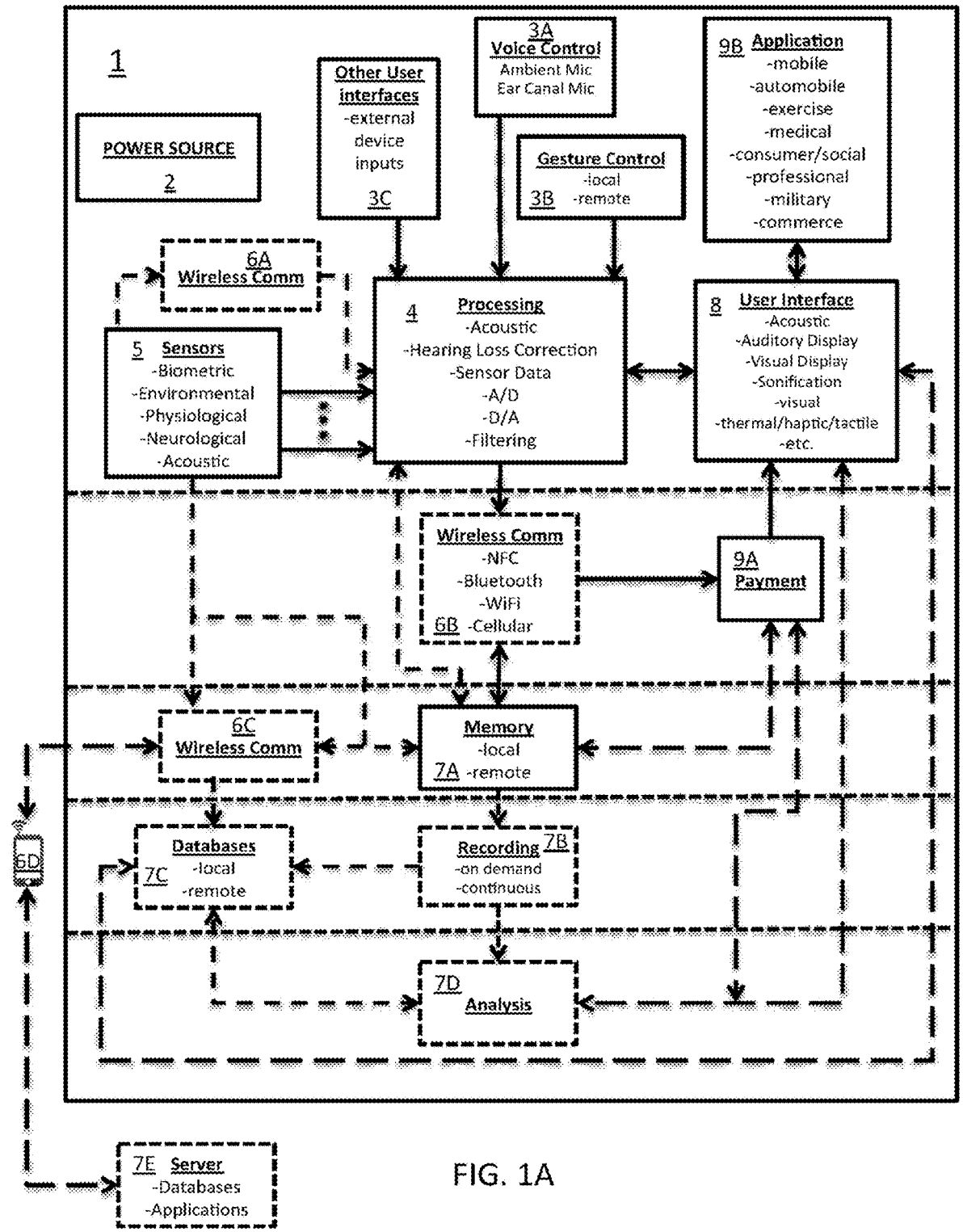
FIG. 1A and FIG. 1B are block diagrams of a telemetric in-ear device for physiological and/or environmental monitoring and personal communication, according to some embodiments herein.
Figure 1B:
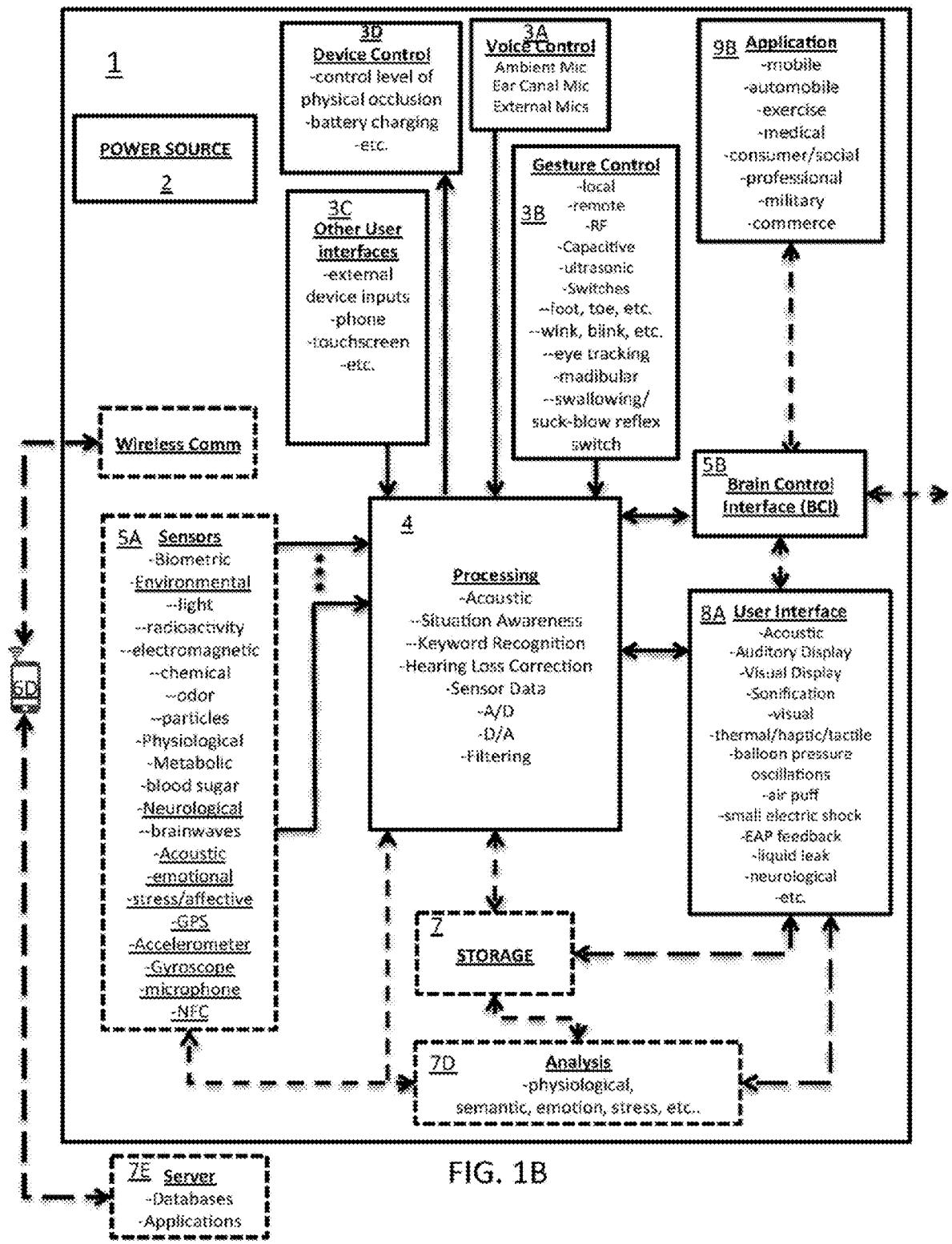
Figure 2A:
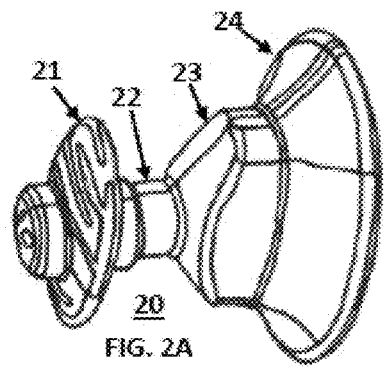
FIGS. 2A-J are various perspective, front, rear, top, bottom, and side views of a portable telemetric in-ear device, such as the device represented in FIG. 1A or 1B, according to some embodiments herein.
Figure 2D:
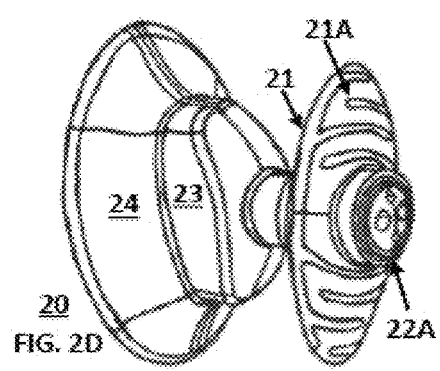
Figure 2G:
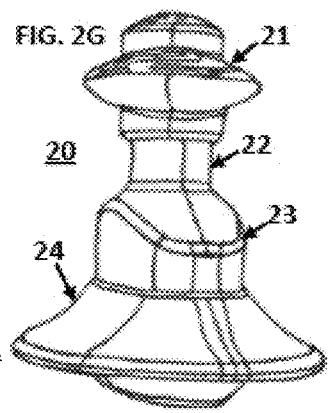
Figure 2B:
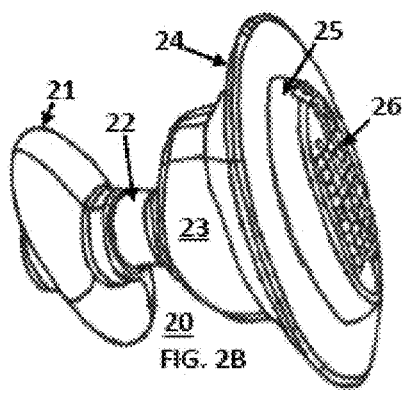
Figure 2E:
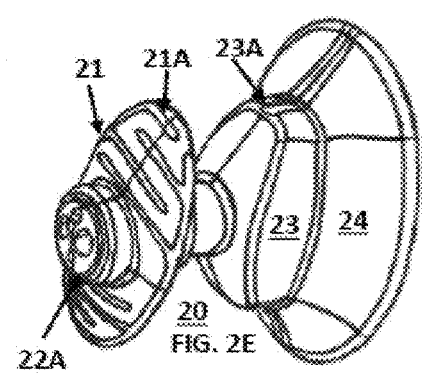
Figure 2H:
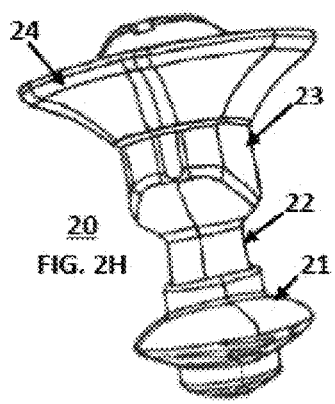
Figure 2C:
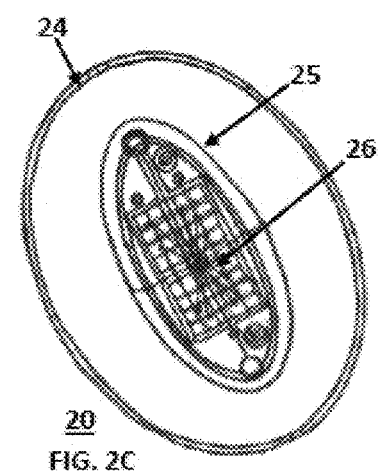
Figure 2F:
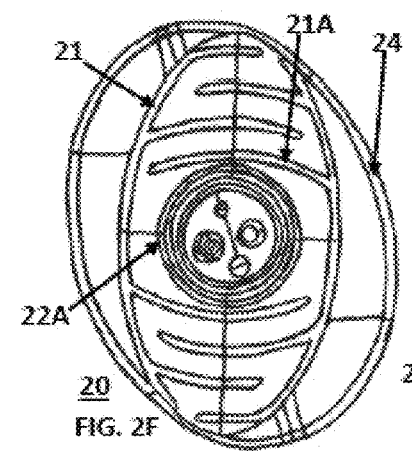
Figure 2I:
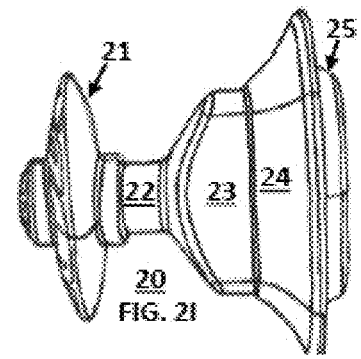
Figure 2J:
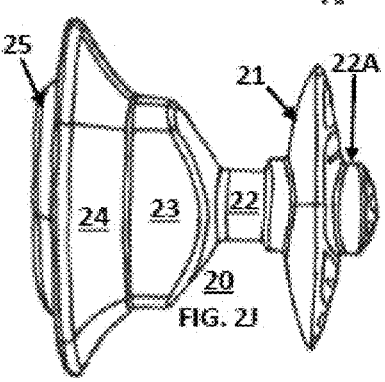

The block diagrams of FIGS. 1A, 1B, and the earpieces of FIGS. 2A-2J depict various form factors, shapes, and configurations for an in-ear device 20 (also referred to as a "wearable monitoring device" or "monitoring device"), according to some embodiments disclosed herein. An in-ear device 20 should be understood to encompass, except where context indicates otherwise, any device that is worn in or at the ear of a user in order to filter, attenuate, cancel, process, relay or provide sound, including devices that are configured to be placed fully in the ear canal of the user (such as ones that include a balloon to encapsulate a sound processing package) and ones placed at the entry of the ear canal (such as ones that use one or more tips, such as made of foam or a polymer) to secure the in-ear device at the entry of the canal. By way of example, an in-ear device 20 is shown in FIGS. 2A-J in various angles to emphasize various external features. FIG. 2A illustrates a left front perspective, FIG. 2B illustrates a left rear perspective, and FIG. 2C illustrates a rear plan view. FIG. 2D illustrates a right front perspective, FIG. 2E illustrates another left front perspective, and FIG. 2F illustrates a front plan view with the balloon 21 facing out towards the page. FIGS. 2G and 2H illustrate two different top perspective views. FIG. 2I illustrates a left side view and FIG. 2J represents a right-side view. In figures that depict an in-ear device with a balloon 21, note that the balloon 21 may be rotated about 20% off-center in comparison to the main housing 23 or flange 24. Further note that the balloon/ stretched membrane 21 may be ovular or have an ellipsoid shape. The angle of rotation as measured from the vertical axis of the orifice, and the shape may be configured to enable the balloon 21 to guide the device easily into the ear canal and lock into place within the external ear canal (EAC) of the user. The anatomy of the human EAC has two natural bends and lends to the rotational insertion of a balloon with the aforementioned form factor and off-center rotation. The device 20 including the balloon can be short enough to be suitably be placed within the first bend of the EAC. Again, reference should be made to U.S. Provisional Patent Application No. 62/090,136 entitled "MEMBRANE AND BALLOON SYSTEMS AND DESIGNS FOR CONDUITS" filed on Dec. 10, 2014, incorporated herein by reference in its entirety for at least its discussion of size, shape, and placement of the balloon within an EAC of a user.

The illustrated in-ear device 20 includes one or more of the following: a sensor 5A in the form of one or more physiological sensors and/or one or more environmental sensors (which can include an acoustical sensor, a motion sensor, a temperature sensor, a galvanic skin response sensor, a heat flux sensor, a chemical sensor, a pressure sensor, or other sensor) (and in some instances can also be referred to as an external energy sensor, or a sensor set herein, where "set" as used herein should be understood to encompass a set that has a single member or a plurality of members) housed on or within a housing of the device 20 (and optionally or additionally houses external thereto), at least one signal processor 4, at least one transmitter/receiver 6A, 6B, or 6C, at least one power source 2, at least one body attachment component 21 which can be an inflation element or balloon, a foam tip, a polymer-based housing, or the like, and which can include one or more of the other elements of the in-ear device 20, and at least the housing. The housing can include the main body housing 23 and a stent or extension 22 as well as a flange 24 and can further include the inflation element or balloon 21. The housing can further include an end cap 25 which can further carry or incorporate a capacitive or resistive sensor 26 or optical sensor as shown in FIGS. 2B and 2C. The main housing portion 23 can also include a venting port 23A to enable additional venting between the flange 24 and the balloon 21 when the device 20 is inserted within EAC. The sensor 26 can be used to detect gestures in ad hoc or predetermined patterns or in yet another embodiment the sensor 26 can alternatively be a fingerprint type of sensor. The inflation element or balloon 21, or other enclosure (such as a foam tip, polymer-based tip, or other flexible enclosure) can include, incorporate, carry or embed one or more sensors. In embodiments, a sensor may include a surface acoustic wave or SAW sensor 21A that can be used for measuring blood pressure. In one embodiment, a balloon having conductive traces on the surface of the balloon to serve as the surface acoustic wave sensor can be used for measuring blood pressure. In embodiments, a sensor may include an optical sensor for measuring one or more characteristics of the blood of a user, such as blood glucose levels.

Further note that in embodiments the stent or extension 22 protrudes or extends through the balloon 21 and terminates at an end 22A of the extension 22A. In other embodiments the extension 22 may protrude or extent through another type of non-balloon enclosure that secure the in-ear device at the external ear canal, such as a foam or latex tip, a polymer-based enclosure, or the like. The end 22A is the portion of the device 20 that would be inserted in the direction to the user's tympanic membrane and can include one or more sensors such as an ear canal microphone and/or thermometer. The end 22A can include acoustic ports for an ear canal microphone and ambient microphone(s) as well as ports for accommodating additional sensors such as thermometers as will be further shown in later illustrations. Though the health and environmental sensor functionality can be obtained without the communication transceivers (6A, 6B, or 6C), having these additional module(s) may promote use of the in-ear device 20 by users. The illustrated in-ear device 20 is intended primarily for human use; however, the in-ear device 20 may also be configured for use with animals. In one preferred embodiment, the in-ear device 20 is an earpiece module attached to the ear or for insertion within an ear canal of the human ear. In another preferred embodiment, the in-ear device 20 is an earpiece module attached in to the ear canal of a cow, horse, or dog. In some embodiments, the in-ear device 20 is inserted in the external auditory canal (EAC) and fixed to the EAC using the expandable element or balloon. The expandable element or balloon can occlude or substantially occlude the EAC to provide an environment that is substantially free of ambient noise.

A physiological sensor (5A) can be any compact sensor for monitoring the physiological functioning of the body, such as, but not limited to, sensors for monitoring: heart rate, pulse rate, breathing rate, blood flow, heartbeat signatures, cardio-pulmonary health, organ health, metabolism, electrolyte type and concentration, physical activity, caloric intake, caloric metabolism, metabolomics, physical and psychological stress levels and stress level indicators, physiological and psychological response to therapy, drug dosage and activity (drug dosimetry), physiological drug reactions, drug chemistry in the body, biochemistry, position & balance, body strain, neurological functioning, brain activity, brain waves, blood pressure, cranial pressure, hydration level, auscultatory information, auscultatory signals associated with pregnancy, physiological response to infection, skin and core body temperature, eye muscle movement, blood volume, inhaled and exhaled breath volume, physical exertion, exhaled breath physical and chemical composition, the presence, identity, and concentration of viruses & bacteria, foreign matter in the body, internal toxins, heavy metals in the body, anxiety, fertility, ovulation, sex hormones, psychological mood, sleep patterns, hunger & thirst, hormone type and concentration, cholesterol, lipids, blood panel, bone density, body fat density, muscle density, organ and body weight, reflex response, sexual arousal, mental and physical alertness, sleepiness, auscultatory information, response to external stimuli, swallowing volume, swallowing rate, sickness, voice characteristics, tone, pitch, and volume of the voice, vital signs, head tilt, allergic reactions, inflammation response, auto-immune response, mutagenic response, DNA, proteins, protein levels in the blood, body hydration, water content of the blood, pheromones, internal body sounds, digestive system functioning, cellular regeneration response, healing response, stem cell regeneration response, and the like. Vital signs can include pulse rate, breathing rate, blood pressure, pulse signature, body temperature, hydration level, skin temperature, and the like. A physiological sensor may include an impedance plethysmograph for measuring changes in volume within an organ or body (usually resulting from fluctuations in the amount of blood or air it contains). For example, the in-ear device 20 may include an impedance plethysmograph to monitor blood pressure in real-time. Note that one or more of these physiological sensors can be incorporated within or on the expandable element or balloon.

An external energy sensor (5A), serving primarily as an environmental sensor, can be any compact sensor for monitoring the external environment in the vicinity of the body, such as, but not limited to, sensors for monitoring: climate, humidity, temperature, pressure, barometric pressure, pollution, automobile exhaust, soot density, airborne particle density, airborne particle size, airborne particle shape, airborne particle identity, volatile organic chemicals (VOCs), hydrocarbons, polycyclic aromatic hydrocarbons (PAHs), carcinogens, toxins, electromagnetic energy (optical radiation, X-rays, gamma rays, microwave radiation, terahertz radiation, ultraviolet radiation, infrared radiation, radio waves, and the like), EMF energy, atomic energy (alpha particles, beta-particles, gamma rays, and the like), gravity, light properties (such as intensity, frequency, flicker, and phase), ozone, carbon monoxide, greenhouse gases, $CO_2$, nitrous oxide, sulfides, airborne pollution, foreign material in the air, biological particles (viruses, bacteria, and toxins), signatures from chemical weapons, wind, air turbulence, sound and acoustical energy (both human audible and inaudible), ambient noise, ultrasonic energy, noise pollution, human voices, animal sounds, diseases expelled from others, the exhaled breath and breath constituents of others, toxins from others, bacteria & viruses from others, pheromones from others, industrial and transportation sounds, allergens, animal hair, pollen, exhaust from engines, vapors & fumes, fuel, signatures for mineral deposits or oil deposits, snow, rain, thermal energy, hot surfaces, hot gases, solar energy, hail, ice, vibrations, traffic, the number of people in a vicinity of the user, the number of people encountered throughout the day, other earpiece module users in the vicinity of the earpiece module user, coughing and sneezing sounds from people in the vicinity of the user, loudness and pitch from those speaking in the vicinity of the user, and the like.

In some embodiments, a physiological sensor and/or an environmental sensor may be configured to identify a person, such as biometric identification of a person, to whom the in-ear device 20 is attached (or may be configured to identify other persons in the vicinity of the person wearing the in-ear device 20). In some embodiments, the in-ear device 10 can be used for multimodal voice authentication or for voice identification such that multiple sensors (acoustic, heart signature, fingerprint, etc.) can provide a more robust or secure authentication or identification. Voice identification may be done among a group of known existing voice identities or profiles.

In some embodiments, a physiological sensor and/or an environmental sensor may be configured to monitor physical aging rate (relative to an actual age) of a person or subject. Aging rate can be assessed from an analysis of any of a number of parameters including, but not limited to cell density, heart signature, voice acoustics, lung function, a level of mobility, blood pressure, body composition, blood pressure, and other information that can be obtained from a user profile. The signal processor 4 may be configured to process information from a physiological sensor and/or an environmental sensor or other sensors to assess aging rate. Physiological sensors configured to assess aging rate may include pulse rate sensors, blood pressure sensors, activity sensors, and psychosocial stress sensors. Environmental sensors configured to assess aging rate may include UV sensors and pollution sensors.

In some embodiments, a physiological sensor 11 can be configured to receive brain wave activity and in some embodiments a balloon or other enclosure can be used to receive, attenuate and/or filter such brain wave activity and to optionally transmit to the brain, as the in-ear device may be enclosed in the ear canal and thereby has an efficient path for wave propagation. More particularly, the device can reside at or in close proximity to the skull in a soft tissue area.

In some embodiments, the balloon or other enclosure can use or include an EMI managing fluid (referred to as an EMI fluid) to shield against stray emissions entering into the canal that can compromise the desired or intended brain wave signal. In some embodiments the entire balloon can be filled with EMI fluid and in yet other embodiments on a portion of a balloon or compound balloon can include the EMI fluid. In some embodiments, a balloon or other enclosure can be produced to include a "pocket" (or separate chamber) which can be filled with a EMI fluid. In the case of reducing stray EMI from entering in to the ear canal, the pocket would be on the superior or proximal end of the balloon (the area closest to the orifice and exterior), as the distal end (or area closest to the tympanic membrane or skull) of the balloon would be used for wave propagation in to the EAC and any EMI characteristics could preclude efficient acquisition and or transmission of brain wave propagation. Thus, in one embodiment, the balloon portion placed nearest the tympanic membrane or skull would not include the EMI fluid and the balloon portion (or pocket) closest to the orifice would include the EMI fluid. In some embodiments where acquisition or transmission of brainwaves is not an issue or concern, then a single balloon with EMI fluid can be used.

In some embodiments, a physiological sensor and/or an environmental sensor may be configured to be regenerated through a physical and/or chemical change. For example, it is anticipated that an in-ear device 20, or other device incorporating physiological and/or environmental sensors according to embodiments of the present invention, may be coupled to an apparatus that is configured to "recharge" or regenerate one or more environmental and/or physiological sensors via a physical process or a chemical process, etc. For example, a recharging module for recharging electric power to the in-ear device 20 may also user electrical energy to reverse a chemical or physical change in one of the sensors. One example of such a sensor would be a sensor that requires the absorption or desorption of water vapor for resetting to baseline operation. Another example is a sensor that is reset (recharged) through oxidation or reduction in order to change the surface properties for monitoring vapors, such as some metal oxide sensors.

Because the in-ear device 20 is capable of measuring and transmitting sensor information in real-time over a duration of time, the physiological and environmental sensors (5A) can be used to sense the aforementioned parameters over time, enabling a time-dependent analysis of the user's health and environment as well as enabling a comparison between the user's health and environment. Combined with proximity or location detection, this allows an analysis for pinpointing the location where environmental stress and physical strain took place.

Proximity detection can be accomplished through GPS type devices integrated into the in-ear device 20 or a personal communication device (cell phone) or other GPS device (such as a GPS wristwatch) in communication with the in-ear device 20. Proximity detection can also be accomplished through triangulation of wireless signals; if a cellular phone is used as the personal communication device, proximity can be identified through existing cellular infrastructure for identifying the time and location of a phone call. Proximity can also be determined through beacon IDs for registered local wireless base stations such as local WiFi base stations at known locations.

The signal processor 4 provides a means of converting the digital or analog signals from the sensors into data that can be transmitted wirelessly by the transmitter 6A-C. The signal processor 4 may be composed of, for example, signal conditioners, amplifiers, filters, digital-to-analog and analog-to-digital converters, digital encoders, modulators, mixers, multiplexers, transistors, various switches, microprocessors, or the like. For personal communication, the signal processor 4 processes signals received by a wireless communication receiver into signals that can be heard or viewed by the user. The received signals may also contain protocol information for linking various telemetric modules together, and this protocol information can also be processed by the signal processor 4 or alternatively by a remote processor or server (not shown).

The signal processor 4 may utilize one or more compression/decompression algorithms (CODECs) used in digital media for processing data. The communication modules (6A-C) can be comprised of one or transmitters that can be a variety of compact electromagnetic transmitters. A standard compact antenna can be used in the standard Bluetooth® headset protocol, but any kind of electromagnetic antenna suitable for transmitting at human-safe electromagnetic frequencies may be utilized. The communication modules (6A-C) can also include a communication receiver that can also include an antenna. In some embodiments, the receiving antenna and the transmitting antenna are physically the same. The receiver/transmitter can be, for example, a non-line-of-sight (NLOS) optical scatter transmission system. These systems typically use short-wave (blue or UV) optical radiation or "solar blind" (deep-UV) radiation in order to promote optical scatter, but IR wavelengths can also be used.

Additionally, a sonic or ultrasonic transmitter can be used as the receiver/transmitter of the in-ear device 20, but preferably using sounds that are higher or lower than the human hearing range. A variety of sonic and ultrasonic receivers and transmitters are available in the marketplace and may be utilized in accordance with embodiments. If a telecommunication device receiving wireless data signals from the in-ear device 20 is in close proximity to the in-ear device 20, and the wearable module is an earpiece module, a variety of transmission schemes can be used. For communicating audible conversational information directly to the earpiece user, encoded telemetric conversational data received by the receiver can be decoded by the signal processing module 4 to generate an electrical signal that can be converted into audible sound.

In some embodiments, the transmitter/receiver (6A-C) is configured to transmit signals from the signal processor 4 to a remote terminal following a predetermined time interval. For example, the transmitter may delay transmission until a certain amount of detection time has elapsed, until a certain amount of processing time has elapsed, etc. In some cases, the transmitter/receiver is configured to transmit signals to the remote terminal dependent on information sensed by the sensors (5A). For example, if an unstable pulse rate is sensed, a warning message may be sent to a remote terminal to communicate a need for help at a particular location as determined by a GPS device operatively coupled to the device 20.

The power source can be any portable power source 2 capable of fitting inside the housing 23. According to some embodiments, the power source 2 is a portable rechargeable lithium-polymer or zinc-air battery. Additionally, portable energy-harvesting power sources can be integrated into the in-ear device 20 and can serve as a primary or secondary power source. For example, a solar cell module (as will be further detailed) can be integrated into the in-ear device 20 for collecting and storing solar energy. Additionally, piezoelectric devices or microelectromechanical systems (MEMS) can be used to collect and store energy from body movements, electromagnetic energy, and other forms of energy in the environment or from the user himself. A thermoelectric or thermovoltaic device can be used to supply some degree of power from thermal energy or temperature gradients. In some embodiments, a cranking or winding mechanism can be used to store mechanical energy for electrical conversion or to convert mechanical energy into electrical energy that can be used immediately or stored for later. Further note that the power source 2 can be incorporated or be part of the inflatable element or balloon 21. Biocompatible battery chemistry can be used within the balloon for biological applications and other battery chemistries can be used when non-biological applications are considered.

Figure 2K:
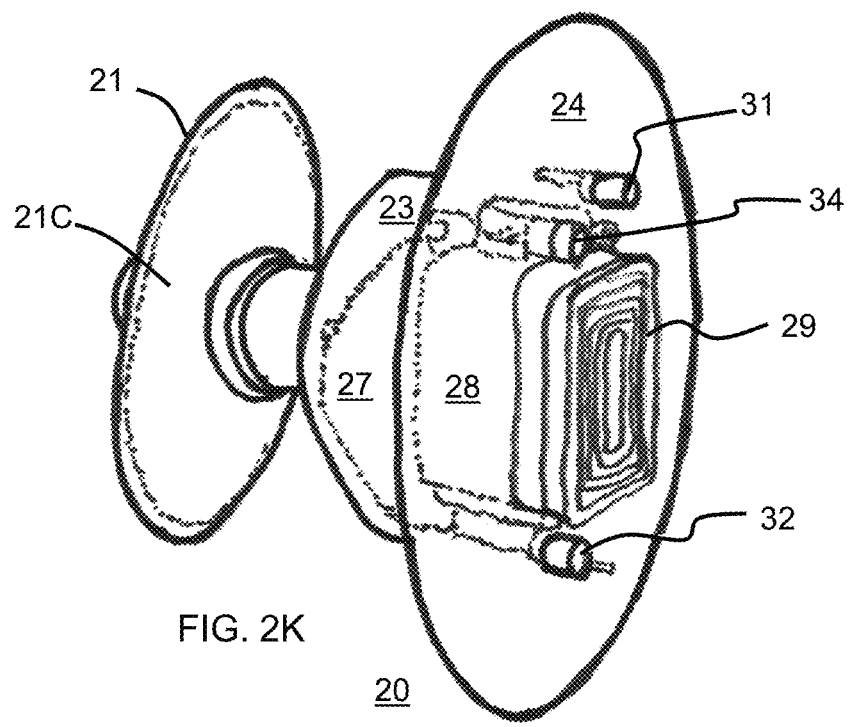
FIG. 2K is a left rear perspective view of the device of FIGS. 2A-J shown without an end cap in accordance with some embodiments herein.
Figure 2L:
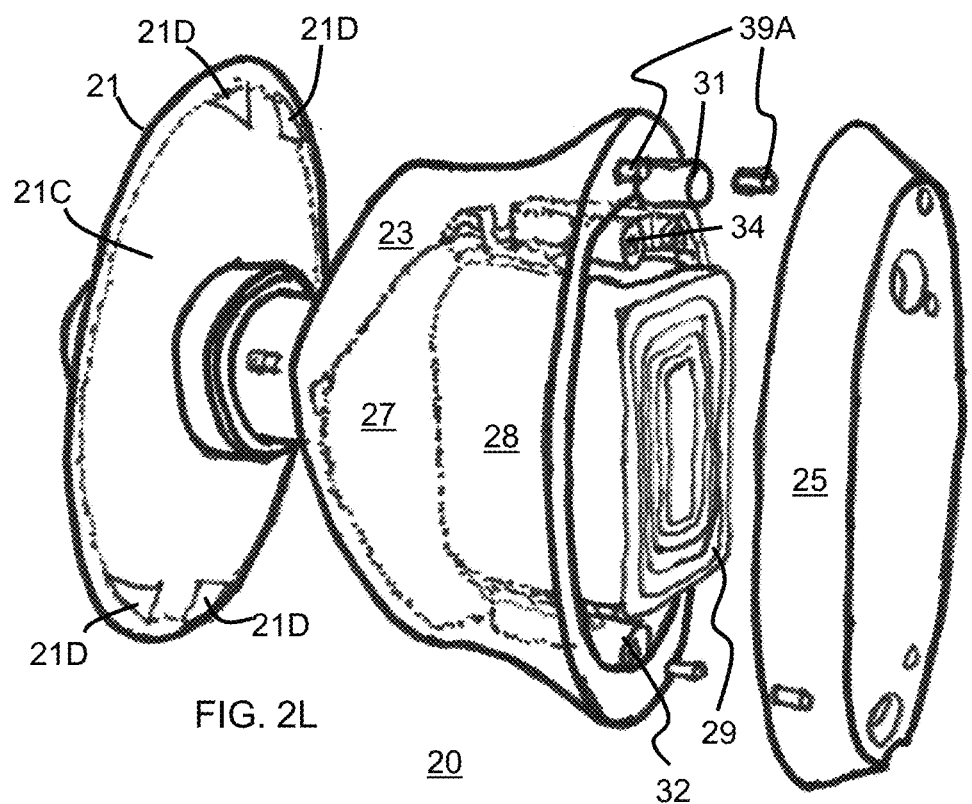
FIG. 2L is a left rear perspective exploded view of the device of FIG. 2K without a flange shown but with an end cap shown instead in accordance with some embodiments herein.

Referring to FIGS. 2K and 2L, an in-ear device 20 with further details of components are shown. FIG. 2K illustrates an in-ear device 20 (referred to in some cases as an earpiece 20) without an endcap (25) as shown in FIG. 2L. The earpiece 20 includes the balloon 21, fluid 21C that fills the balloon, a main housing portion 23 that housing a speaker 27, a battery 28, a first ambient microphone 32, a second ambient microphone 34, a valve 31 for controlling the flow of fluid in and out of the balloon 21, and a recharging coil 29 using for inductively recharging the battery 28. The microphones 32 and 34, and valve 31 are set in place and mated with respective openings within the end cap 25 as shown in FIG. 2L. The end cap 25 also covers the recharging coil 29. The end cap 25 can also include a capacitive sensor (not shown in FIG. 2L, but see FIGS. 2B, 2C, 6E, and 8C). The cap 25 can include magnets 39A to attach to magnets 39A in housing portion 23.

The various components described above are configured to fit within a housing of the in-ear device 20 and/or be attached thereto. In the case where the in-ear device 20 is an earpiece module, the housing may be formed from any safe and comfortable solid material such as metal, rubber, wood, polymers, ceramic, organic materials, or various forms of plastic. In some embodiments, the housing can be made of a flexible and pliable medical grade of silicone that can conform or bend as the earpiece traverses the orifice and EAC of the user during insertion and removal of the device 20. Further note that in some embodiments the electronics can be housed separately such that the body attachment component, such as a balloon 21, a foam or latex tip, a polymer-based attachment element, or the like can be separated from active or electronic components of the device 20. In other words, the device 20 can be made in a manner that enables the balloon 21 or other attachment component to be replaceable. Alternatively, the active component portion can also be viewed as being replaceable. For example the AirTip technology in U.S. Pat. App. No. 62/666,026 and 62/640,967.

The body attachment component or balloon 21 is attached to the remaining housing and is designed to fit within the EAC and alternatively around or near the ear in other embodiments. In some embodiments, the body attachment component (or balloon 21) can contain physiological and environmental sensors, and the main housing components may be detachable. In some embodiments, different modules having different sensors as part of the balloon or as part of the main housing can be attached to the remaining components in a modular fashion. In many instances, the processor can be within the main housing and the balloon 21 can have various alternative sensor configurations for use with the active components resident in the main housing. As noted above, the earpiece attachment can simply be an inflatable element or balloon.

The communication module may be used for, but not limited to: processing or generating an audible sound from information received via the receiver (from a cell phone, computer, network, database, or the like) and/or processing or generating an electrical signal from an audible sound from the user such that the electrical signal can be transmitted telemetrically via the transmitter. For example, in standard Bluetooth® protocol, communication electronics are used to convert an audible conversation into an electrical signal for telemetric conversation; communication electronics are also used to convert a digitized telemetric conversation into an audible conversation for the earpiece user. Additionally, the communication module can be used to store, process, or play analog or digital information from music, radio shows, videos, or other audible entertainment and to communicate this information to an earpiece user. In many cases, this information includes information received by the receiver. In many cases, the analog or digital information is not stored in the communication module 17 but, rather, is stored in a portable telecommunication device such as a cell phone. In such case, the communication module is used for converting the analog or digital information into audible sound for the earpiece user. The communication module may contain at least one microphone, speaker, signal processor, and digital memory. In some embodiments, the communication module may apply at least one CODEC for encoding or decoding information. The communication module may utilize non-audible forms of communication with the user, such as visual, physical, or mental (i.e., brainwaves or neural stimulation) communication with the user.

In some embodiments, an audible communicator is provided that is configured to communicate therapeutic sounds (e.g., music therapy, etc.) to a person in response to physiological or psychosocial stress. The audible communicator may be embodied in the communication module or may be a separate speaker. In some embodiments, light therapy may be provided to a person in response to physiological or psychosocial stress. In some embodiments, the communication module may be configured to communicate a treatment, therapy, and/or plan of action to the person upon detection of physiological and/or environmental concerns. For example, if it is detected that the person is being exposed to unhealthy doses of UV radiation, the communication module may audibly instruct the person to move away from the person's current location (e.g., move indoors, etc.). Mechanical vibrational therapy and electrical stimulation therapy are also examples of automated therapies that may be invoked by programs inside the in-ear device 20 in response to sensor readings from health and/or environmental sensors.

Like the other components of the in-ear device 20 shown in FIG. 1, the components of the communication module are not necessarily located in the same physical vicinity. The microphone and speaker of the communication module, for example, may be located closer to the mouth and ear respectively. Furthermore, the signal processor 4 can be composed of several components located throughout the earpiece. It should be understood that the word "module" does not necessarily imply a unified physical location. Rather, "module" is used to imply a unified function.

Bluetooth® devices conventionally contain a communication module, such as communication module, for converting digital or analog information into audible sounds for the user. However, when combined with the health and environmental monitoring properties of an in-ear device 20 according to embodiments, the communication module can provide additional functionality. In embodiments, the in-ear device 20 can serve as a biofeedback device. As a non-limiting example, if a user is in a polluted environment, such as air filled with VOCs, the communication module may notify the user to move to a new environment. As another example, if one or more of the physiological and environmental sensors (5A) of the in-ear device 20 pick up a high particulate density in the environment, with an elevation in core body temperature, and a change in voice pitch occurring simultaneously (or near-simultaneously) within a common timeframe, the communication module may alert the user that he/she may be having an allergic response. As a further example, the user can use the communication module to execute biofeedback for willfully controlling blood pressure, breathing rate, body temperature, pulse rate, and the like. The communication module may utilize audible or visible alerts if the user is meeting their physiological targets or exceeding safe physiological limits. Alerting a user by physical or electrical force, such as the sense of touch or tingling from an electric pulse or vibration, can also be utilized. Thus, although communication by audible means is often utilized, the communication module can alert, signify, or communicate with the user through sound, light, electrical actuation, and physical actuation.

As a second example of this biofeedback method, basic vital signs collected by the physiological sensors 5A and processed by the signal processor 4 can be presented to the in-ear device user audibly, through the communication module. For example, the user may be able to listen to his/her breathing rate, pulse rate, and the like. Additionally, an entertaining or aggravating sound or song can be used to alert the user to favorable or unfavorable personal health and environmental factors occurring in real-time. This technique may be applied towards education, such as positive or negative feedback for educational games, learning games, or games of deception (e.g., poker, etc.).

In some embodiments, the in-ear device 20 may be configured to deliver and/or monitor drugs, as in a dosimeter. For example, a transdermal drug delivery system may be provided that is controlled by in-ear device 20 electronics. Physiological sensors can monitor the drug dosage and the physiological effects of the drug in real-time. Similarly, sound pressure level (SPL) monitoring using microphones and a processor can monitor the SPL dosage or exposure to an individual wearing the device 20.

Figure 2M:
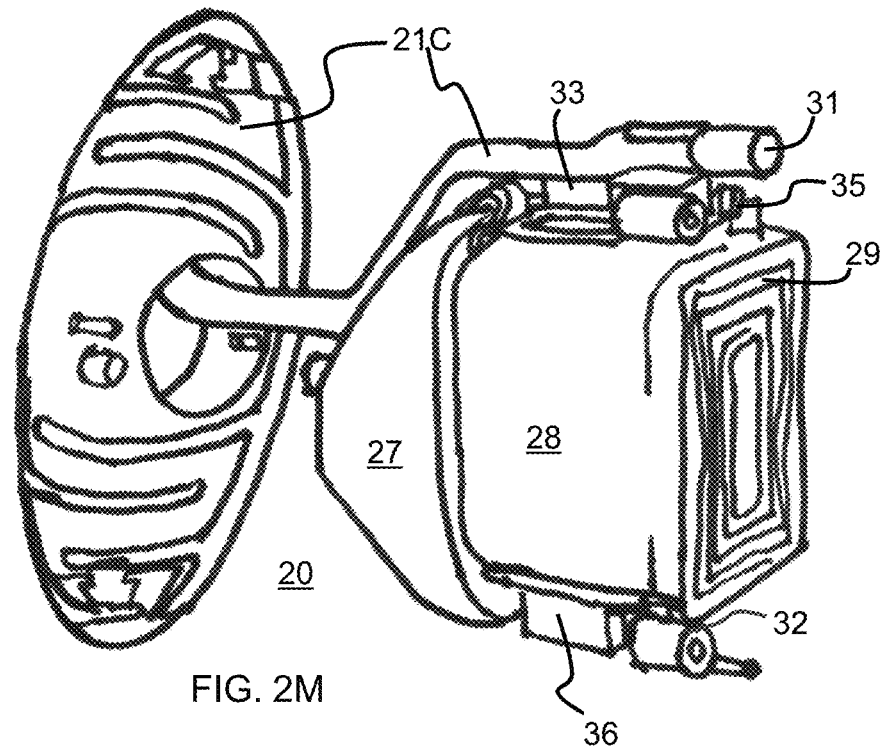
FIGS. 2M and 2N are respectively a left rear perspective view and a right front perspective view of some of the internal components of the device of FIGS. 2A-K.
Figure 2N:
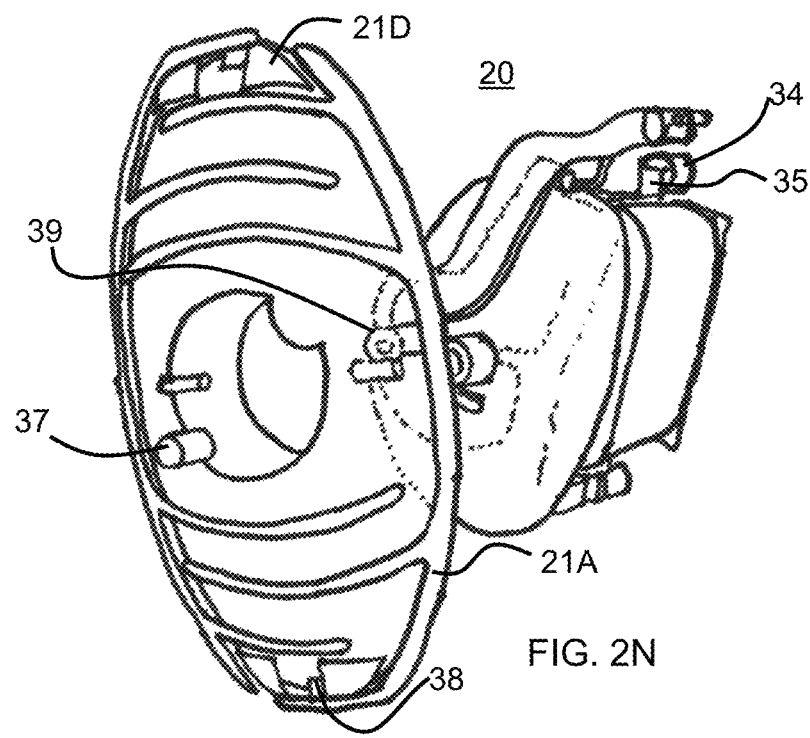

A health and environmental monitoring system according to embodiments that may incorporate in-ear devices 20 of FIG. 1 is illustrated in part in FIGS. 2M and 2N for example. Other types of in-ear devices may also be utilized in the health and environmental monitoring system. The in-ear device 20 is utilized as a specific in-ear device of the monitoring system, though other modules located at various other parts of the body can be used in conjunction with the in-ear device 20. The terms "wearable monitoring device" and "sensor module" are used interchangeably herein in accordance with various embodiments. The health and environmental monitoring system is composed of at least one sensor module (e.g., in-ear device 20) at least one portable telecommunication module that can be part of the in-ear device or be part of a communications device operatively coupled to the device 20 such as a cell phone, at least one transmission system such as a Bluetooth module, at least one user interface, at least one personal database, and at least one anonymous database.

Internally, the device 20 in some embodiments can include a balloon filled with fluid 21C that traverses a channel and controlled or filled through a valve 31. The balloon can be pre-filled to a predetermined pressure level. The device 20 can further include a memory 33 for storing user profiles, sensor data, communication data, sound data, control data, or algorithms and applications used in the extraction and analysis of sensor data or other aforementioned information. A flex circuit 35 can be utilized to provide the appropriate electrical connections between the various components and sensors in the device 20. The device further includes a processor such as a digital signal processor 36 that can perform a number of functions including, but not limited to acoustic processing, hearing loss correction, receiving or extracting sensor data, analog to digital conversion, digital to analog conversion, and filtering of signals. The device can further include one or more ambient microphones 32 and 34, a speaker 27, an ear canal microphone 39, and a battery 28. An inductive coil 29 can be mounted or coupled to the battery housing to enable inductive charging of the battery 28. The device 20 can further include several non-acoustic sensors such as capacitive pads 21D used for ECG monitoring, a thermometer 37 for measuring temperature at or near the user's skull, and a SAW sensor 21A used for blood pressure sensing. The device can also include one or more LEDs 38 used for blood oximetry.

Figure 2P:
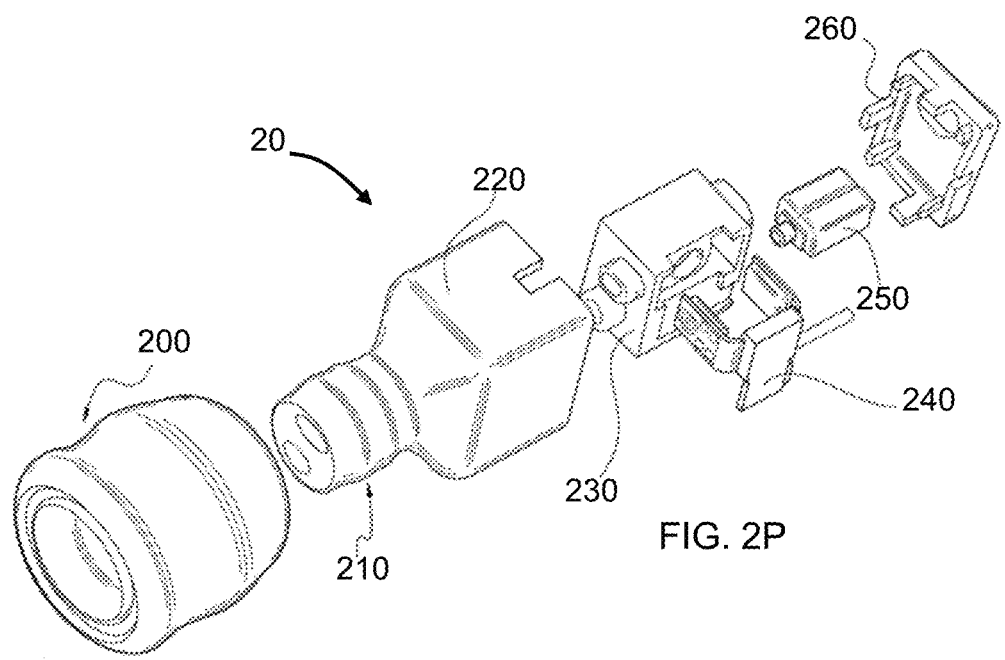
FIG. 2P is a left perspective exploded view of an in-ear device having an ear tip according to some embodiments of the present disclosure.
Figure 2Q:
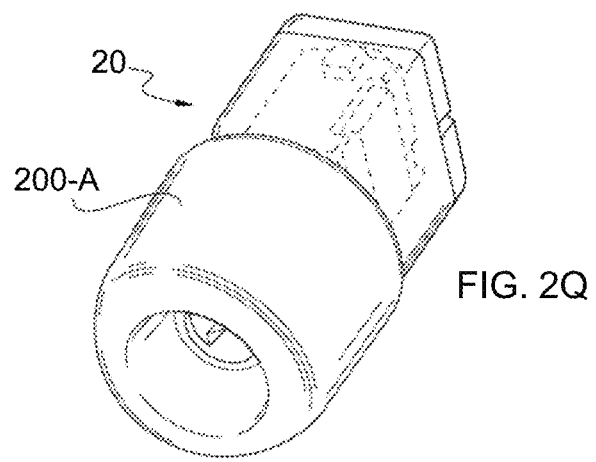
FIG. 2Q is a left-front perspective view of an in-ear device having a foam ear tip according to some embodiments of the present disclosure.
Figure 2R:
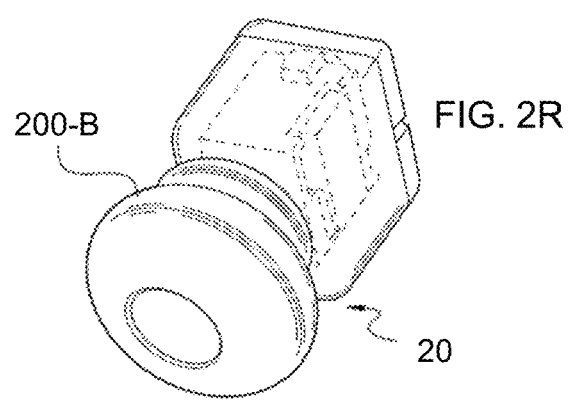
FIG. 2R is a left-front perspective view of an in-ear device having a formed ear tip according to some embodiments of the present disclosure.

FIGS. 2P-2R illustrate an example in-ear device 20 according to some embodiments of the present disclosure. In the illustrated embodiment, the in-ear device 20 includes a resilient ear tip that is integral with, coupled to, or receiving of at least a portion of an outer housing of in-ear device 20. In embodiments, an in-ear device 20 may be incorporate a ear tip 200 made from a soft resilient material. The ear tip 200 may be formed from materials such as silicone, Elastosil™ 30A, 70A Moldmaking Plastic by Alumite™ (Strength 1, 2, 3), flexible 3D printing material, rubber, urethane, or any other suitable materials. In these embodiments, one or more of the sensors discussed throughout the application may be integrated into the ear tip 200. The ear tip 200 may be configured and dimensioned to fit snugly into the ear canal of a user. In embodiments, the ear tip 200 may receive a male member 210 of the outer housing 220. The outer housing 220 may house a circuit board 230 having a processing device (not shown), one or more microphones 240, speakers 250, and any suitable sensors coupled thereto. The in-ear device 210 may further include an end cap 260 that attaches, or otherwise, connects to or forms with the outer housing 220. The ear tip 200 may be suitably configured and dimensioned to fit at least partially in the ear canal of the user or to sit adjacent to the ear canal in the outer ear area of the user. In the example of FIG. 2Q, an ear tip 200-A may be a substantially conical shape and may be made of foam. In the example of FIG. 2R, an ear tip 200-B may be ergonomically formed from a suitable material (e.g., silicon or rubber). In the example of FIG. 2R, the ear tip 200-B may formed in a shape that is more conducive to fitting in the user's ear. Examples of in-ear devices 310 having ear tips 210 are further discussed in U.S. Provisional Application 62/631,473 filed Feb. 15, 2018, U.S. Provisional Application 62/640,967 filed Mar. 9, 2018, and U.S. Provisional Application 62/643,287, filed Mar. 15, 2018, the contents of each are hereby incorporated by reference.

Figure 3:
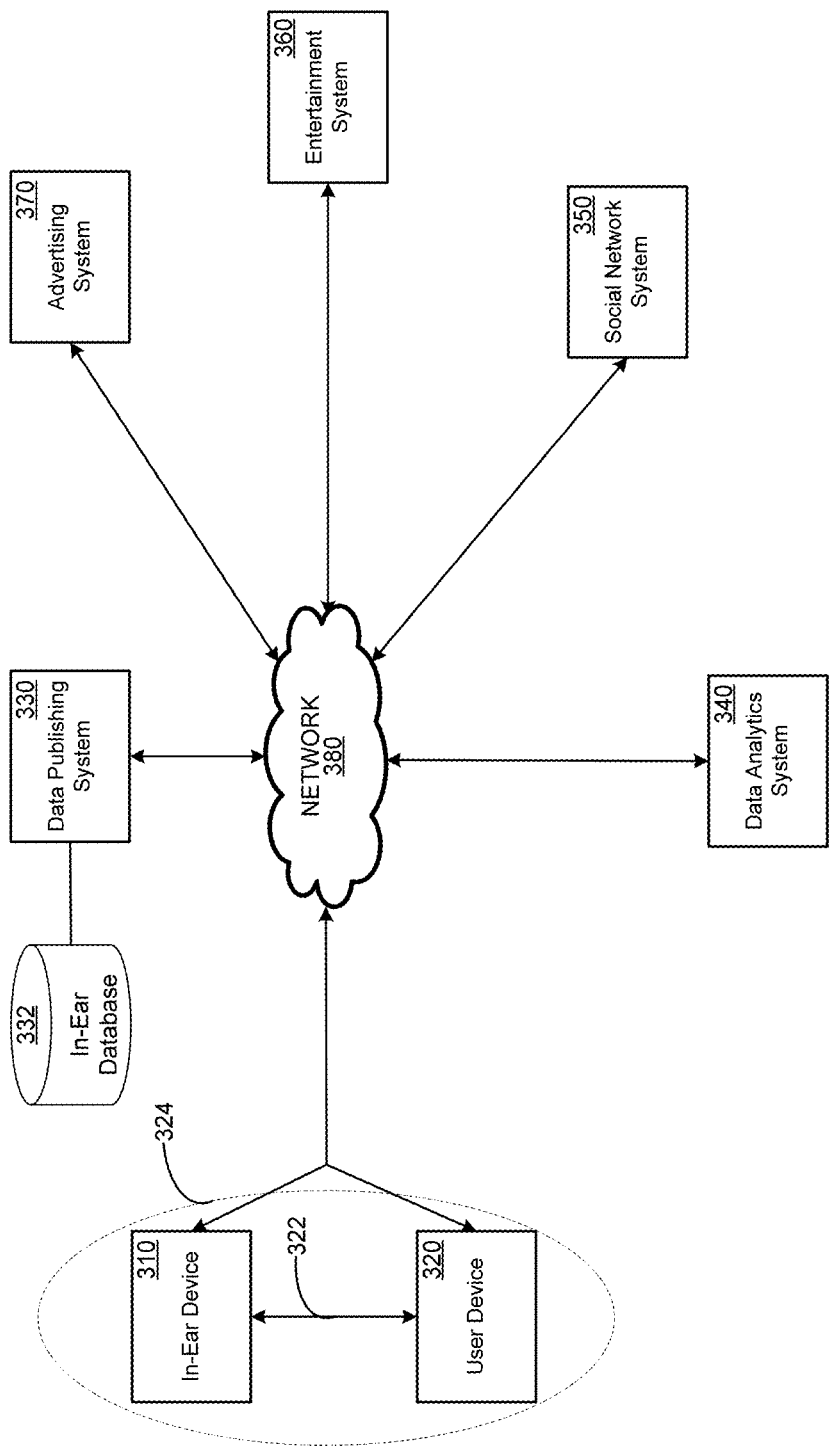
FIG. 3 is a schematic illustrating an example environment of an in-ear device according to some embodiments of the present disclosure.

FIG. 3 illustrates an example environment 300 of an in-ear device 310. The in-ear device 310 may be any suitable configuration of an in-ear device 310, including, but not limited to, the configurations presented in FIGS. 1A, 1B, 2A-2N, and/or 4A. In embodiments, the in-ear device 310 is configured to capture audio signals via one or more microphones. In embodiments, the in-ear device 310 processes the audio signals. The in-ear device 310 may process the audio signals in any suitable manner. In embodiments, the in-ear device 310 is configured to extract one or more features of the audio signal. In embodiments, the in-ear device 310 is configured to isolate speech portions of the audio signal. In embodiments, the in-ear device is configured to isolate sound portions of the audio signal (e.g., non-speech audio captured in the audio signals). In embodiments, the in-ear device 310 is configured to identify certain sound signatures (e.g., emergency signals, hazardous conditions, directional signals, and the like). In embodiments, the in-ear device 310 is configured to identify sound signatures of indexed media content (e.g., songs and/or dialogue). In embodiments, the in-ear device 310 is configured to perform natural language processing (NLP) on the speech portions of the audio signal. In embodiments, NLP can include natural language understanding (NLU) of the audio signal (e.g., extracting meaning of the speech portion of the audio signal). In embodiments, NLP can include natural language generation (NLG) in response to the audio signal or another prompt (e.g., generating human-understandable speech given the context of a situation). In embodiments, the in-ear device 310 can obtain user feedback on the accuracy of the NLU using NLG. In embodiments, NLP can include identifying different speakers in the speech portion. Thus, in some embodiments, the in-ear device 310 may be configured to generate transcripts of conversations that are captured by the audio signals. The in-ear device 310 may be configured to process the audio signal in other suitable manners as well.

In embodiments, the in-ear device 310 can collect sensor data from one or more sensors. As was described with respect to FIGS. 1A, 1B, and 2A-2N, the in-ear device 310 may include one or more different sensors. Examples of sensors can include, but are not limited to heartrate sensors, temperature sensors, galvanic skin response sensors, accelerometers, gyroscopes, pressure sensors, vibration sensors, and the like. In embodiments, the in-ear device 310 may utilize the sensor data 310 to improve the accuracy of the NLP. For example, if the in-ear device 310 detects a speaker asking the user a question and an accelerometer signal received from an accelerometer indicates that the user has nodded (e.g., a motion profile of the accelerometer signal is consistent with a nodding motion) and uttered something that is inaudible, the NLP may determine that the user has answered in the affirmative, despite not being able to cleanly process the speech of the user.

In embodiments, the in-ear device 310 may utilize the sensor data to determine the effect of audio signal on the user. For example, the in-ear device 310 may receive an audio signal in which the user is having a conversation with another person. During the conversation, the user may become flustered. In this situation, a heartbeat measurement from a heartbeat monitor and/or a body temperature measurement from a temperature sensor may indicate that the user's heartbeat is increasing and/or the user's temperature is rising. In this example, the in-ear device 310 may record this sensor data with the speech portion. Additionally, or alternatively, the in-ear device 310 may draw an inference that the conversation has angered or otherwise excited the user.

In embodiments, the in-ear device 310 may communicate with a user device 320 (e.g., smartphone, tablet computer, gaming device, laptop computer, personal computer, and the like) via a communication link 322. For example, the in-ear device 310 and the user device 320 may communicate via a Bluetooth, WiFi, Zigbee, near-field communication, or any suitable communication wireless or wired communication protocol. In these embodiments, a user of the in-ear device 310 and the user device 320 may connect the in-ear device 310 and the user device 320 via a personal-area communication network (PAN) 324.

In embodiments, the in-ear device 310 is configured to communicate with a data publishing system 330. A data publishing system 330 may be a networked computing system that is configured to collect in-ear data from a collection of in-ear devices 310. The term "in-ear data" may refer to any data that is collected, extracted, and/or derived by the in-ear device 310. Data that is collected by the in-ear device 310 may include audio signals corresponding to sound waves entering the ear canal of the user and/or sensor readings from one or more sensors that are a part of and/or associated with the in-ear device 310. In-ear data may additionally or alternatively include, but is not limited to, sound signatures that are extracted from an audio signal, a sound portion of the audio signal (e.g., non-speech sound), a speech portion of the audio signal, feature vectors that include features extracted from the audio signal, words that are recognized in a speech portion of the audio signal, transcripts of the speech portion of the audio signal, annotation objects that include the results of NLP performed on the audio signal, and/or any metadata relating to the captured audio signal. Metadata that may relate to the audio signal may include a geolocation of an in-ear device 310 when the audio signal was captured, a geographical region of the in-ear device 310 when the audio signal was captured, biometric data relating to a user at the time the audio signal was captured (e.g., heart rate, body temp), a user characterization of the user wearing the in-ear device 310 that captured the audio signal, a user demographic of the user wearing the in-ear device 310 that captured the audio signal, motion data relating to user at the time the audio signal was collected (e.g., accelerometer data), a term frequency score (e.g., TF-IDF) of one or more words or groups of words that were detected in the audio signal, identification of content in the audio signal (such as music, video, electronic book and other content that is heard by the user that has embedded metadata tags and/or is recognized by machine pattern recognition) and the like. In some implementations, the data publishing system 330 may structure the in-ear data in respective audio records, where each audio record corresponds to an audio signal captured by an in-ear device 310.

In embodiments, the data publishing system 330 includes an in-ear data database 332. The in-ear database 332 may store and index in-ear data collected from a collection of users. In embodiments, the data publishing system 330 may publish the contents of the in-ear database 332 to one or more external systems.

The data publishing system 330 may implement one or more APIs. For example, the data publishing system 330 may implement a first API that allows in-ear devices 310 (or user devices 320 connected thereto) to provide in-ear data to the publishing system 330. The data publishing system 330 may implement a second API that allows external systems to utilize the in-ear data collected from a collection of in-ear devices 310.

In embodiments, the in-ear device 310 and/or the data publishing system 330 are configured to communicate with external systems. Examples of external systems may include, but are not limited to, a data analytics system 340, a social network system 350, an entertainment system 360, and an advertising system 370. It is noted that any combination of two or more of the external systems may be implemented as a single system. For example, a single system may incorporate data publishing, data analytics, entertainment systems, advertising systems, and/or location-based services. The in-ear device 310 and/or the data publishing system 330 may communicate with an external system via a communication network 380 (e.g., a local area network, a wireless local area network, a cellular network, and/or the Internet).

As the in-ear device 310 is configured to collect vast and varied amounts of data (e.g., audio data and/or sensor data) as well as to derive vast amounts of data (e.g., feature vectors, transcripts, NLP results, annotations, summaries, inferences, conclusions, and/or diagnoses), the in-ear device 310 may be utilized as a very powerful data collection tool for a number of different applications. One issue that arises, however, is that storage space is limited in the in-ear device 310, as the physical size of the in-ear device 310 limits the amount of space available for physical storage devices. Another issue that may arise is the limitations of processing power available to the in-ear device 310. Even as processing technology improves, the physical limitations of the in-ear device 310 limits the amount of audio processing that the in-ear device 310 may perform. Another issue that may arise is that some of the data collected and/or derived by the in-ear device 310 may be sensitive data that raises a number of privacy concerns. To mitigate one or more of the issues described above, the in-ear device 310 may be configured to intelligently publish data and/or route, copy or transfer in-ear data to different storage locations.

In embodiments, the in-ear device 310 includes an interface that allows the in-ear device 300 to publish in-ear data to an external system (e.g., a user device 320, a data publishing system 330, a data analytics system 340, a social network system 350, an entertainment system 360, and an advertising system 370). For example, the in-ear device 310 may implement an API that allows the in-ear device 310 to publish the in-ear data to white-listed systems.

In embodiments, the in-ear device 310 is configured to utilize machine-learning to optimize storage of in-ear data based on the results of NLP. For example, the in-ear device 310 may implement a decision model (e.g., a neural network) that receives the results of NLP and that determines where the in-ear data associated with the NLP results should be stored. In this way, the in-ear device 310 may conserve valuable on-device storage space for in-ear data that is more likely to be utilized by the in-ear device 310. Such a neural network may be trained, such as on an initial training data set where one or human operators have determined where particular types of NLP results should be stored, where the neural network adapts based on feedback, such as feedback on what NLP results are used at the in-ear device or by another user device or external system, feedback on storage capacity, feedback on power availability, feedback on input/output latency, and the like.

In embodiments, the in-ear device 310 is configured to utilize machine learning to optimize use of the in-ear data storage device based on the collection of incoming audio signals and a feedback function regarding use of the data stored on the storage of the in-ear device 310. For example, the in-ear device 310 may implement a decision model (e.g., a neural network) that receives features of an audio signal or a sound portion of the audio signal as well as feedback of the user (explicit, sensed, and/or inferred) to determine where to store the audio signal, the sound portion of the audio signal, and/or the features thereof. For example, if the in-ear device 310 captures the sound of a telephone ringing and then receives feedback from the user that the sound was in fact the telephone's ringer (e.g., the user picked up the telephone call), the decision model may determine that this instance of in-ear data (e.g., the audio of the ringer and/or the features thereof) should be stored on the storage of the in-ear device 310. Conversely, if the in-ear devices captures sound of a telephone ringer and then receives confirmation that the captured sound portion was not the user's telephone ringer, the decision model may determine that this instance of the in-ear data (the audio of someone else's ringer and/or the features thereof) should not be stored on the storage of the in-ear device 310 but should be published to an external system.

In embodiments, the in-ear device 310 includes an interface to the in-ear data storage devices that allows in-ear data corresponding to spoken sound detected in the ear canal of a speaker to be published to an external system. In embodiments, the in-ear device 310 may be configured to identify and/or isolate a speech portion of an audio signal. The in-ear device 310 may publish the identified and/or isolated speech portion of the audio signal to an external system. For example, a data analytics system 330 may receive the speech portion of the audio signal, features of the speech portion, NLP results of the speech portion, and/or metadata relating to the speech portion and may use the received data to train speech recognition models or to perform another task.

In embodiments, the in-ear device 310 is configured to utilize machine-learning to optimize storage of speech portions of audio signals corresponding to speech of the user based on the results of NLP. In these embodiments, the in-ear device 310 may be configured to identify and/or isolate a sound portion of a received audio signal that is attributable to the user of the in-ear device 310. This may be accomplished by one or more pattern recognizers, such as using a neural network or other machine learning systems. A pattern recognizer may use labeled training data (such as by capturing the voice of the user through a series of prompts that are designed to provide the training data) for supervised learning of the user's speech or by deep learning in the absence of training data, such as by recognizing a speech signal as the user's during time periods where other factors suggest that the user is in fact speaking (such as where the user's external device, like a smart phone, is engaged in a call, and the in-ear device receives a coherent pattern that appears to be that of single speaker). The in-ear device 310 may then perform NLP to determine a likely meaning of the utterances contained in the speech portion of the audio signal. The in-ear device 310 may then utilize machine-learning techniques to determine where to store the spoken portion of the audio signal, the features of the spoken portion, the determined meaning of the spoken portion, and/or metadata relating to the spoken portion. For example, the in-ear device 310 may implement a decision model (e.g., a neural network) that receives the results of NLP and that determines where the spoken portion of the audio signal (and/or any related data) should be stored. In this way, the in-ear device 310 may conserve valuable on-device storage space for in-ear data that is more likely to be utilized by the in-ear device 310.

In embodiments, the in-ear device 310 is configured to utilize machine-learning to optimize use of the in-ear data storage based on speech portions of audio signals captured in the in-ear canal of the speaker and a feedback function regarding use of the data stored on the in-ear storage. In these embodiments, the in-ear device 310 may isolate the speech portion of an audio signal corresponding to the user of the in-ear device 310. The in-ear device 310 may then determine a storage plan for the speech portion of the audio signal corresponding to the speaker based on the features thereof and/or other data collected by the in-ear device 310.

In embodiments, the in-ear device 310 may include or may be associated with a database that indexes, or otherwise stores, natural-language processed words that are collected/identified by the in-ear device 310. The database may be stored on the in-ear device 310 and/or on a storage device of a connected user device 320. In embodiments, the data stored in the database may be used to improve machine-learned models that are personalized for the user. Additionally, or alternatively, the database may be queried by external systems to perform various analytics and/or machine-learning tasks.

In embodiments, a data publishing system 330 may include a database of natural language processed words that are collected/identified by in-ear devices 310 of a collection of users. The database may include processed words, features of the processed words, the audio signal from which the processed words were identified, and/or metadata relating to the processed words. The metadata may include a geolocation at which the audio signal was captured, a region (e.g., city, state, or country) where the audio signal was captured, a time of day that the audio signal was captured, a demographic of the user whose in-ear device 310 captured the audio signal, characteristics of the user, a term-frequency score of the processed word(s), and the like. The external system may utilize this database to improve, for example, recommendations and/or advertisements to users. In embodiments, an external system may query the data publishing system 330 to determine whether certain words are trending in a region relative to other regions. The external system may utilize a list of trending words to improve advertisement relevancy to devices in the region where the certain words are trending.

In embodiments, the data publishing system 330 may include an API for a database of in-ear data collected from the ear canals of a population of individuals. The API may allow external systems to query the database and obtain sound signature information and/or spoken word information.

In embodiments, the data publishing system 330 may include a database of in-ear data collected from a collection of in-ear devices 310. The data publishing system 330 may publish sound signature information and/or spoken word information to an external system. For example, the data publishing system 330 may publish sound signatures to an entertainment system 360, an advertising system 370, a data analytics system 340, and/or a social network system 350.

In embodiments, the data publishing system 330 may include a database of in-ear data that includes biometric data that is collected by sensors of respective in-ear devices 310. For example, the data publishing system 330 may include ear drum reactions of users, galvanic skin responses of users, body temperatures of users, heart rates of users, motion data of users, and the like. In some of these embodiments, the in-ear data may be used to train machine-learned models using combinations of biometric data and various different types of processed sound data (e.g., audio signals, sound signatures, annotation objects, feature vectors of audio signals, and the like).

In embodiments, the data publishing system 330 may include a database of in-ear data collected from the in-ear devices 310 of users to train machine-learned models that are used by an entertainment system 360. For example, the data publishing system 330 may include biometric data that may be indicative of a user state (e.g., alert, bored, upset, happy) and the types of media content consumed by users in certain states to train machine-learned scoring models. In this way, these models may be used to recommend media content given a user's state.

In embodiments, the data publishing system 330 may include a database of in-ear data collected from the in-ear devices 310 of users to train machine-learned models that are used by a social networking system 350. For example, the data publishing system 330 may include biometric data that may be indicative of a user state (e.g., alert, bored, upset, happy) and the types of social media content consumed by users in certain states to train machine-learned scoring models. In this way, these models may be used by a social networking system 350 to deliver more relevant social media content given a user's state.

In embodiments, the data publishing system 330 may include a database of in-ear data collected from the in-ear devices 310 of users to train machine-learned models that are used for location-based services. For example, the data publishing system 330 may include location data (e.g., geolocations or geographic regions) corresponding to users as well as the in-ear data that was captured, extracted, or derived from audio signals captured by in-ear devices 310 of the users when at locations indicated by the location data. In embodiments, the combination of location data and the in-ear data may be used to train models that are tuned to recognize trends that are location based. For example, the combination of location data and in-ear data may be used to train speech recognition models that are geographically specific. These types of machine-learned models may be better at recognizing newly termed regional slang. In another example, machine-learned models trained using location data and in-ear data can be utilized to improve advertisement placement and recommending content to users in specific regions.

In embodiments, the data publishing system 330 may include a database of in-ear data collected from the in-ear devices 310 of users to train machine-learned models that are used to improve the effectiveness of an emergency response system. For example, the data publishing system 330 may include biometric data that may be indicative of a user response to certain audible emergency or safety sounds (e.g., ambulance or police sirens, emergency broadcast signals, Amber alerts, and the like). For example, the biometric data may include motion data that indicates whether a user reacts or does not react to different types of audible emergency or safety sounds. The combination of the in-ear data and the biometric data can be used to train models that will predict whether a user will react or ignore an audible emergency sound. Such a machine-learned model may be uploaded to an in-ear device 310. In this way, the in-ear device 310 may be configured to detect that a user is unlikely to respond to an audible emergency sound and to alert the user in alternative means (e.g., a verbal cue).

Figure 4A:
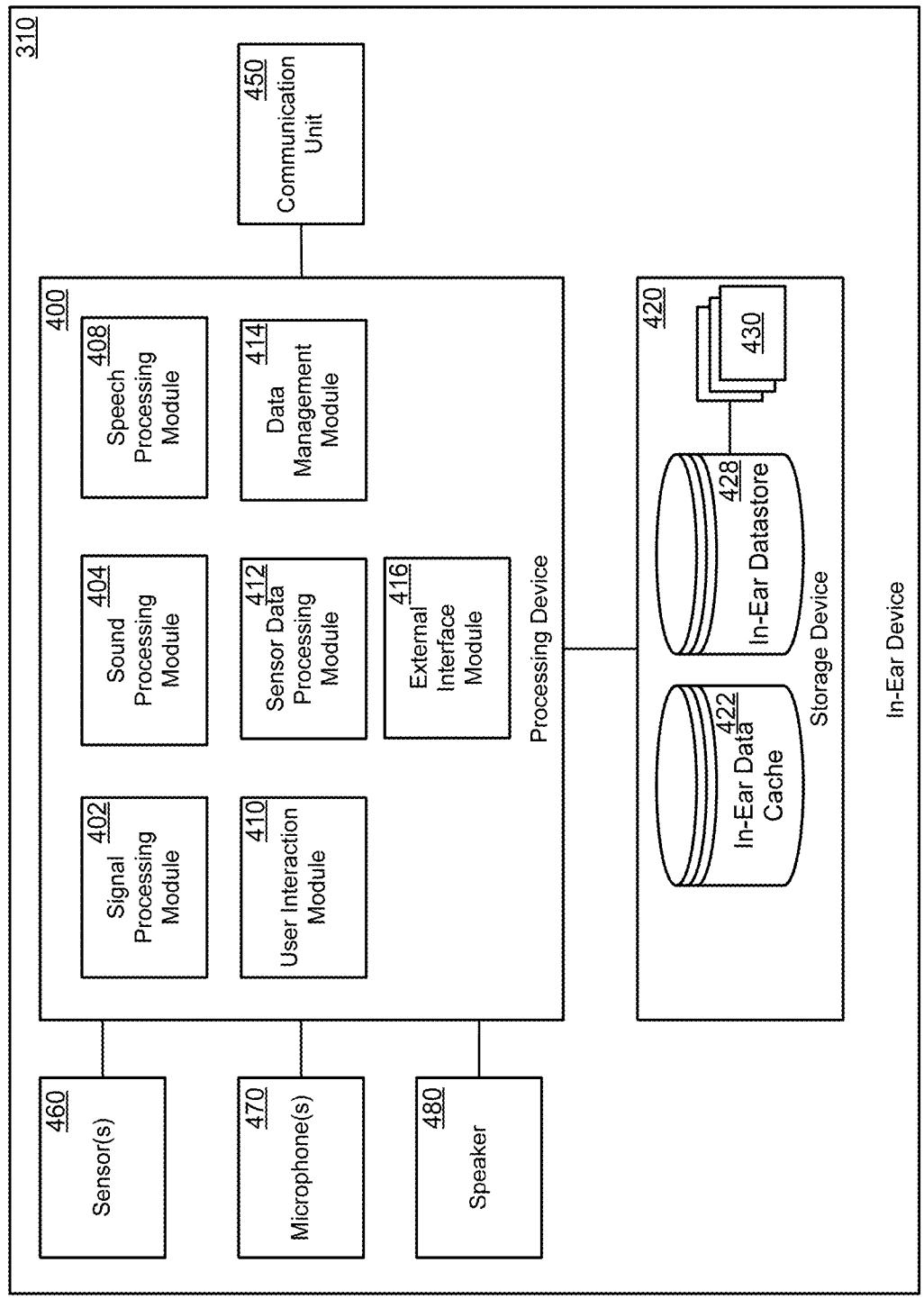
FIG. 4A is a schematic illustrating an example set of components of an in-ear device according to some embodiments of the present disclosure.

FIG. 4A illustrates an example in-ear device 310 according to some embodiments of the present disclosure. The in-ear device 310 may be the in-ear devices described with respect to FIGS. 1A, 1B, and 2A-2N. In embodiments, the in-ear device 310 includes a processing device 400, a storage device 420, a communication unit 450, one or more sensors 460, one or more microphones 470, and a speaker 480.

The processing device 400 may include one or more processors and memory. The processors may operate in an individual or distributed manner. The memory may store computer-executable instructions that are executed by the one or more processors. The processing device 400 may execute a signal processing module 402, a sound processing module 404, a speech processing module 408, a user interaction module 410, a sensor signal processing module 412, a data management module 414, and an external interface module 416.

The storage device 420 may include one or more computer-readable mediums. The storage device 420 may store an in-ear datastore 428. In embodiments, the in-ear datastore 428 stores in-ear data records 430. Additionally, or alternatively, the in-ear datastore 428 may store raw in-ear data. In embodiments, the in-ear datastore 428 may store one or more databases that store in-ear data records 430, one or more tables, and/or one or more indexes. In embodiments, the indexes may index in-ear data records 430 by sound-related data, speech-related data, biometric data, temporal data, and/or geographic data. In embodiments, the storage device 420 may also include an in-ear data cache 422. The in-ear data cache 422 may temporarily store in-ear data that is to be transferred to an external device or system. As will be discussed, the in-ear device 310 is configured to determine a storage plan that defines where to store an instance of in-ear data (referred to as an in-ear data object). In the event that the determined in-ear device 310 is unable to communicate with an external device (e.g., the in-ear device 310 is not currently connected to a network), the in-ear device 310 may temporarily store the in-ear data object in the in-ear data cache 422 until connectivity is restored. The storage device 420 may store any other suitable data. For example, the storage device 420 may store any number of machine-learned models that are used by the in-ear device 310 for various applications.

The communication unit 450 may include one or more transceivers that are configured to effectuate wireless or wired communication with one or more external devices. The communication unit 450 may implement any suitable communication protocol. For example, the communication unit 450 may implement the Bluetooth communication protocol, the ZigBee communication protocol, Near-Field Communication protocols, or the like to effectuate communication with an external device in a personal area network 324 of the in-ear device 310. The communication unit 450 may implement, for example, a IEEE 801.11 wireless communication protocol and/or any suitable cellular communication protocol to effectuate wireless communication with external devices via a wireless network.

The one or more sensors 460 may include any suitable types of sensors described with respect to FIGS. 1A, 1B, and 2A-2N. In embodiments, the sensors 460 include one or more accelerometers that output motion data indicating an acceleration of the in-ear device 310. As the in-ear device 310 is meant to be worn in the ear of a user, the motion data output by a motion sensor (e.g., an accelerometer and/or gyroscope) may be indicative of the motion of a user's head. As a human's head is more likely to remain steady with respect with the torso, the motion data collected may be more accurate than motion data collected from other areas of the body, such as wrist or ankle, at least with respect to determining the nature and extent of some kinds of motion, such as steps during walking, jogging or running. Furthermore, many non-verbal communications are based on head motions. For example, non-verbal communication can include nods to indicate agreement, longer nods to indicate understanding, head shakes to indicate disagreement or disgust, and head tilts to indicate puzzlement. As such, a motion sensor secured to the user's ear is able to detect motions that are indicative of non-verbal communication in a way that motion sensors situated near a user's waist (e.g., in a pocket) or to an extremity (e.g., wrist, ankle) are unable to. In embodiments, sentiment data may be captured and processed along with words spoken by or to a user, or other audio signals (including entertainment or news content) based on contemporaneous capture of an audio signal and a head motion signal of the user by an in-ear device. The sentiment data may be included in one or more records accessible in one or more databases described herein, may be published by such systems, or the like.

In embodiments, the sensors 460 include a temperature sensor. In embodiments, a temperature sensor may be integrated into an outer housing of the in-ear device 310. For example, a temperature sensor may be integrated on an outer surface of a balloon 21 (see e.g., FIG. 2) or other attachment device (such as a polymer-based tip) that seals or otherwise secures the in-ear device 310 to the membrane of the ear canal. In this way, the temperature sensor is positioned flush against the membrane, whereby the temperature sensor is able to obtain very accurate temperature readings. The temperature sensor may also provide informative information regarding a heat fluctuation of a user, whereby elements may be inferred, such as calories burned, activity levels or type, and the like.

In embodiments one or more sensors 460 may be used to detect activity, such as motion and temperature fluctuations, while a user is immersed underwater, because a balloon 21 or other attachment device may be configured to provide a water proof seal to the ear canal (such as by its regular configuration or by one or more attachments that provide further waterproofing for use during underwater activity. Thus, an activity monitor is provided that allows accurate motion detection while a user is swimming, diving, waterskiing, windsurfing, kiteboarding, or performing other water-based activities. Various forms of sensor data, including activity levels and types, may be captured, parsed, tagged and/or associated with time stamps, location data, contemporaneous audio signals, and other sensor data, and may be included in one or more datastores or databases as described throughout this disclosure.

In embodiments a database may include one or more knowledge graphs, such as representing one or more a priori structures representing an understanding of one or more topics, such as a knowledge graph of physical activities, a knowledge graph of social relationships, a knowledge graph of business relationships, a knowledge graph of content (e.g., music, audio, video or the like), a knowledge graph of psychographic or demographic categories, a map or other location-based knowledge graph, or the like. In embodiments, sensor data, audio signal data, speech, processed output, and other information handled by the systems described herein may be associated with one or more nodes in a knowledge graph, such as by machine processing, such as by supervised learning on a labeled training set or by deep learning based on feedback to the system. For example, the system may learn to augment a social graph for a user or a group by adding speech or other content that is spoken by or to a user (or an annotation about such speech, or a summary thereof) to a relevant node of the knowledge graph, such as to capture a conversation over time involving one or more topics that are contained in the speech and that node of the knowledge graph. Thus, a database may accumulate spoken thoughts of a user and the user's colleagues or friends about a topic and automatically associate those thoughts, or summaries of those thoughts, in a knowledge graph. This may include social topics, conversations about entertainment, news or politics, topics related to a project or work-related topic, topics related to learning, and many others.

In embodiments, the sensors 460 may include a vibration sensor that measures the vibrations of the eardrum. A vibration sensor may output a signal indicating a frequency of the vibrations of the eardrum. This may be indicative of whether the user is able to hear the audio signal being captured by the microphone(s) 470 of the in-ear device 310. This may be highly relevant information when extracting features of an audio signal, analyzing a user response to the audio signal, and the like.

In embodiments, the sensors 460 include a galvanic response sensor. The galvanic response sensor may output a signal indicating the galvanic skin response of the user in the user's ear. The galvanic skin response of a user may be utilized, for example, when determining a mood, health condition, response, activity type of a user, activity level of a user, and the like. For example, the galvanic skin response may indicate that a user is exercising (increasing moisture in the ear canal).

In embodiments, activity types and activity levels may be understood by fusing output from multiple sensors, or by fusing outputs from a set of sensors with other information, such as audio signal information, location information, time-based information and the like. For example, an audio signal may include content that suggests that a particular activity is taking place, such as speech content (like the word "backstroke" during a swimming activity) or sound signature content (such as the sound of a splash during swimming). Thus, an audio signal, such as a speech signal, a sound signature, or a metadata tag in an audio signal, may be used in combination with a set of sensors of any of the types described herein or known to those of skill in the art to help determine the nature and level of a user's activity, to determine the user's context, or the like. This may occur by labeling activities in a training set of sensor and audio signal data for supervised learning or by deep learning. Once learned, activity levels and types may be published in time-associated, location-associated, and/or context-associated records in one or more databases or datastores as described throughout this disclosure.

The one or more microphones 470 may be any suitable microphones that are configured and dimensioned to fit within a housing of the in-ear device 310. In embodiments, the microphone(s) 470 may include one or more directional microphones and/or independent microphones 470 that are positioned to receive audio signals from different directions. In these embodiments, the audio signal output by the one or more microphones 470 may be comprised of composite audio signals captured from different orientations. In embodiments, each microphone may capture a sound wave and convert the sound wave into a respective digital signal. Each one of these signals may be a composite audio signal, where the composite audio signals collectively make up the audio signal. As each microphone may capture the same sound wave but at a slightly different orientation, the output of each microphone may slightly vary in amplitude and/or frequency (e.g., due to Doppler Effect). The in-ear device 310 (e.g., the signal processing module 402) may utilize these differences to extrapolate a direction of travel of the sound wave on which the audio signal is derived.

Speaker 480 may be any suitable speaker device configured and dimensioned to fit in the housing of the in-ear device 310. The speaker 480 may be used to provide audible communications and/or sounds to the user.

In embodiments, the signal processing module 402, the sound processing module 404, and the speech processing module 408 operate together or individually to generate in-ear data relating to captured audio signals. In-ear data relating to captured audio signals may include, but is not limited to, the captured audio signals, speech portions of the captured audio signals, sound portions of the audio signals (e.g., non-speech sounds), features of the captured audio signals, features of the sound portions of the audio signals, features of the speech portions of the audio signals, sound signatures of the sound portions of the audio signals, digital fingerprints of the sound portions of the audio signals, tokens of recognized words or groups of words in the speech portion of the audio signal, annotation objects that define a meaning or understanding of a speech portion of the audio signals, classifications of the sound portions of the audio signals, classifications of the speech portions of the audio signals (e.g., topic or subject matter of the speech portion), identification of speakers detected in the speech portions of the audio signals, and the like.

In embodiments, the signal processing module 402 processes an incoming audio signal. In embodiments, the signal processing module 402 is configured to process the audio signal into a series of time-sequenced audio frames. The audio frames may be of fixed length. In embodiments, the signal processing module 402 may assign time-stamps to the audio signal. For example, the signal processing module 402 may assign a time-stamp to the beginning of each audio frame. In embodiments, the signal processing module 402 is configured to identify a speech portion of an audio signal and/or a sound portion of the audio signal. In embodiments, the signal processing module 402 may implement one or more filters (e.g., band pass filters, high-pass filters, low pass filters, and the like) to isolate different portions of the audio signal. The filters may be tuned to isolate frequencies that are generally attributed to human speech. Additionally, or alternatively, filters may be tuned to isolate frequencies that are generally attributed to different sounds (e.g., ambient noise, music, barking dogs, emergency signals, and the like). In embodiments, the signal processing module 402 is configured to transform each audio frame of the audio signal from a time domain to a frequency domain. The signal processing module 402 may then identify a speech portion and/or sound portions of the audio signal in each audio frame based on the different frequency bands in which the transformed audio signal resides. The signal processing module 402 may implement any suitable techniques to transform the audio signal (e.g., Fourier Transforms or Fast Fourier Transforms). In embodiments, the signal processing module 402 may be configured to determine a direction of the sound wave captured in the audio signal, which may be indicative of a source of the sound wave captured in the audio signal. For example, in embodiments of the in-ear device 410 with multiple microphones and/or a directional microphone, the signal processing module 402 may determine whether a speech portion of the audio signal is originating from the user or from another speaker based on the relative magnitudes and/or frequencies of the composite audio signals.

The sound processing module 404 is configured to process a sound portion of an audio signal. In embodiments, the sound processing module 404 is configured to extract one or more features of the sound portion of the audio signal. In implementations, the sound processing module 404 may identify frequency ranges of the sound portion and the magnitudes of the audio signal at those frequencies. The sound processing module 404 may identify spikes in the magnitude of the audio signal at certain times and frequencies. In implementations, the sound processing module 404 may generate sound signatures of sound portions of the audio signal. The sound signatures may be indicative of the source of a sound. For example, the sound signatures may be indicative of an emergency signal (e.g., a car horn, an ambulance or police siren, a tornado siren, an earthquake signal, a train crossing signal, and the like), an animal sound (e.g., a dog barking), music, television, and the like.

In embodiments, the sound processing module 404 may implement a machine-learned classification model that classifies a sound captured in the audio signal. A machine-learned classification model may be trained in a supervised, semi-supervised, or unsupervised manner. For example, a machine-learned classification model may be trained with labeled sound signatures and/or unlabeled sound signatures. In another example, a machine-learned classification model may be trained with labeled and unlabeled feature vectors. In embodiments, a machine-learned classification model may receive a feature vector containing the features of the sound portion of audio signal (or a sound signature) and may output one or more candidate labels. Each candidate label may include a confidence score. The confidence score of a candidate label may indicate a degree in confidence in the candidate label relative to the other candidate labels. The sound processing module 408 may assign the label having the highest score to the feature vector (or sound signature).

The speech processing module 408 is configured to process a speech portion of an audio signal. In embodiments, the speech processing module 408 is configured to perform speech recognition. The speech processing module 408 may analyze the speech portion of the audio signal to identify one or more tokens based on the speech portion of the audio signal. A token may correspond to an utterance (e.g., a word or group of words) recognized in the speech portion of the audio signal. A token may be a text representation of a detected utterance or a value that is related to the recognized utterance. The speech processing module 408 may implement any suitable speech recognition process or processes when performing speech recognition on the speech portion of the audio signal. In embodiments, the speech processing module 408 may detect a language of the speech portion. The language may be a known language of the user (e.g., set in the settings of the in-ear device) or may be detected based on a preliminary analysis of the speech portion of the audio signal. In embodiments, the speech processing module 408 may parse the speech portion of the audio signal to identify a sequence of phonemes. Phonemes may refer to the perceptually distinct units of sound in a specified language that distinguish one word from another word. Put another way, a phoneme is the smallest unit of human speech, where phonemes represent the different individual sounds that can be spoken in a given language. In embodiments, the speech processing module 408 determines potential utterances (e.g., words) based on the phonemes. In some implementations, the speech processing module 408 generates various n-grams (unigrams, bi-grams, tri-grams, etc.) of sequential phonemes. The speech processing module 408 may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the speech processing module 408 may utilize the output tokens to generate a transcription of the speech portion of the audio signal based on a sequential processing of the speech portion of the audio signal. Additionally, or alternatively, the speech processing module 408 may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the sound wave from which the audio signal is derived, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech processing module 408 may implement other processing techniques on the tokens.

In embodiments, the speech processing module 408 is configured to perform natural language processing (NLP) on the recognized speech. In embodiments, the speech processing module 408 analyzes the results of the speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled, and the label may be assigned a confidence score indicating a degree of confidence in the label assigned to the token or sequence of tokens. In embodiments, each relationship may be labeled, and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the captured audio. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The speech processing module 408 may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

In embodiments, the speech processing module 408 may encode the output of a natural language processor in an annotation object, whereby the annotation object defines the meaning or understanding of a speech portion of an audio signal by defining tokens and/or sequences of tokens and relationships between the tokens and/or sequences of tokens. The speech processing module 408 may include additional information in the annotation object. For instance, the speech processing module 408 may include the speech portion of the audio signal, a feature vector corresponding to the speech portion of the audio signal, a best guess of the speaker of the speech portion of the audio signal, and metadata relating to the speech portion of the audio signal.

In embodiments, the speech processing module 408 may determine a speaker or likely speaker corresponding to the audio signal. In embodiments, the speech processing module 408 may determine whether the speaker is the user (i.e., the human wearing the in-ear device) or someone else. In these embodiments, the speech processing module 408 may analyze composite audio signals received by the microphones 470 or directional microphone 470 to determine the direction from which the incoming speech is received. For example, if the speech is coming from inside the user (e.g., from the user's head/throat), the speech processing module 408 may infer that the speaker is the user. In the case that the audio signal is coming from another direction, the speech processing module 408 can infer that the speaker is someone other than the user. In embodiments, the speech processing module 408 may be trained to recognize the speech of the user based on features of the user's voice, dialect, speech idiosyncrasies (e.g., user of prolonged "ums"), and the like. In embodiments, the speech processing module 408 may attempt to identify a speaker when the speaker is someone other than the user. In these embodiments, the speech processing module 408 may utilize machine-learning techniques and/or user feedback to identify the speaker. For example, the speech processing module 408 may implement a machine-learned model that receives a feature vector of the speech portion of the audio signal that is trained on voices of speakers that the user speaks to often (e.g., family members, coworkers, and friends). The machine-learned model may be updated using user feedback, where the user is asked to confirm the identity of a speaker and/or provide an identification of an unknown speaker.

In embodiments, a user interaction module 410 communicates with a user to receive user feedback and/or instruction. The user interaction module 410 may utilize natural language generation techniques and/or rules-based scripts to communicate with the user. In embodiments, the user interaction module 410 may receive an annotation object and may ask for user instruction depending on the contents of the annotation object. For example, in response to receiving an annotation object corresponding to processing speech containing the phrase "I need to make dinner reservations for tomorrow," the user interaction module 410 may determine the appropriate response is "would you like me to make dinner reservations for you." The user may respond by saying "yes, please make reservations for two tomorrow at Morton's Steakhouse," which may be processed by the speech processing module 408. In response to receiving a second annotation object corresponding to the processed user instruction, the user interaction module 410 may transmit a request to a restaurant reservation application that is installed on a paired user device 320 via the communication unit 450 that indicates the name of the restaurant, the date of the reservation, and the number of people on the reservation.

In embodiments, the user interaction module 410 may ask for explicit user feedback to reinforce existing models and/or to train new models. In embodiments, explicit user feedback can be feedback relating to a processed sound or speech. For example, in response to processing a sound portion of an audio signal containing a doorbell, the user interaction module 410 can ask the user if the processed sound was his or her doorbell. An affirmation of the classification may be used to as training data that may be used to reinforce a model's classification of the user's doorbell. A negative response (e.g., "no it is not my doorbell") may be used to train a model to learn that that particular sound is not the user's doorbell. In another example, the speech processing module 408 may attempt to identify a speaker. In response to the identification, the user interaction module 410 may ask the user to confirm the identity of the speaker (e.g., "was that your wife speaking to you?"). An affirmation of the speaker identifier may be used to reinforce the model that identified the speaker as the user's wife. Negative feedback (e.g., "no, that was my boss, Martha") may be used to train the model on the voice of the user's boss, while adding negative feedback to the classification of the user's wife's voice. In this scenario, the features of the initial speech portion of the audio signal may be tagged with the user provided identification (e.g., "boss & Martha"), such that the features and the user provided feedback may be used to train a model on the voice of the user's boss. In another example, the user interaction module 410 may ask the user to confirm an inference made based on received sensor data. For example, if the sensor data is indicative of the user being upset, the user interaction module 410 may ask the user if he or she is upset. In this scenario, a user can confirm or deny the inference. In the case the user affirms the user state (e.g., "upset"), the user interaction module 410 may reinforce the user state with the features used to make the inference.

In embodiments, the user interaction module 410 may be configured to request explicit user feedback regarding the data management of collected in-ear data. For example, the user interaction module 410 may ask the user whether the user would like to generate and keep a transcript of a recorded conversation. In another example, the user interaction module 410 may ask the user whether the collected in-ear data may be published to an external system. In yet another example, the user interaction module 410 may ask a user if the contents of his or her most recent speech contained sensitive data, where publication of in-ear data would raise privacy concerns. The user may provide feedback to the user interaction module 410, which may pass the user feedback to a relevant module (e.g., the data management module 414).

In embodiments, the sensor data processing module 412 receives sensor data from the sensor(s) 460 of the in-ear device 310 and/or from paired user devices 330. In embodiments, the sensor data processing module 412 is configured to supplement in-ear data with the received sensor data. The sensor data processing module 412 may process the sensor data received from a sensor 460 to determine a value of a particular condition (e.g., a user's body temperature, an ambient temperature, a geo-location of the user, a heartrate of the user, etc.). The sensor data processing module 412 may generate a timestamp for each value. The sensor data processing module 412 may pass the timestamped sensor data (e.g., timestamped values) to the data management module 412, which may supplement the audio-related in-ear data with the sensor data received by the sensor data processing module 412. In embodiments, time stamped biometric data derived from the sensor data may be synchronized with audio data (e.g., an audio signal or a portion thereof) to provide for improved data for purposes of analysis on the audio signal and/or the biometric data.

In embodiments, the sensor processing module 412 is configured to draw inferences regarding a user state of the user. A user state may include a mood of the user, a health condition of the user, an activity of the user, and the like. The sensor processing module 412 may utilize a rules-based approach and/or machine-learning to infer a user state. In embodiments, the sensor processing module 412 may implement a rules-based engine that receives senor data regarding a user and outputs an inferred user state. The rules-based engine may implement one or more rules that relate specific sensor values to inferred user states. An example rule may be if the user's temperature increases by 0.1 degrees and the user's heartrate increases by 5%, then the user is likely in an agitated state. Another example rule may be if the user is moving at a speed greater than five miles per hour for more than five minutes and the user's heartrate is greater than 90 beats per minute, then the user is likely exercising. In embodiments, the sensor processing module 412 may employ one or more machine-learned models to infer a user's state. For example, the sensor processing module 412 may employ a neural network that is trained using various biometric sensor readings of people in different states. In operation, the sensor processing module 412 may vectorize the received sensor data and may input the vector into the neural network. The neural network may output one or more candidate user states and a confidence score for each candidate user state. The sensor processing module 412 may select the candidate state having the greatest score as the inferred user state. In embodiments, an inferred user state may be used to supplement the in-ear data collected by the in-ear device 310. The inferred user state may be used by a natural language processor to derive a meaning or understanding of the captured speech portions of an audio signal. Additionally, or alternatively, the inferred user state may be used as another feature in the in-ear data that is stored and later used to train new machine-learned models and/or reinforce existing machine-learned models. In embodiments, an inferred user state may be used by an external system to improve recommendations and/or advertisements. For example, the in-ear device 310 may communicate an inferred user state of the user to an entertainment system 360. In response to the inferred user state, the entertainment system 360 may determine a media content to play for the user (e.g., a soothing song when the user is upset, or a high-tempo song when the user is exercising). In another example, the in-ear device 310 may transmit an inferred user state of the user to an advertising system 380. In response to the inferred user state, the advertisement system 370 may transmit an advertisement to a user device 320 associated with the user that is more relevant given the inferred user state. In another example, the inferred user state may be used by an analytics system to ask the user if he or she wishes to purchase a particular product. For example, if the analytics system has access to the users' purchase history as well as either inferred or expressed user states when those users made the purchases, the analytics system 340 may determine a purchase that the user may like to make given their inferred state.

In embodiments, the sensor processing module 412 is configured to determine non-verbal communication of a user based on the sensor data. In embodiments, the sensor processing module 412 may attempt to match motion data received from one or more motion sensors (e.g., an accelerometer and/or gyroscope) to head motion signatures associated with different types of non-verbal communication. For example, the signal processing module 412 may compare the motion data received from a motion sensor to motion signatures corresponding to nodding (which may indicate agreement), motion signatures corresponding to longer periods of nodding (which may indicate understanding), motion signatures corresponding to head shaking (which may indicate disagreement or disgust), and motion signatures corresponding to head tilts (which may indicate puzzlement). Upon identifying a match between the motion data received from one or more motion sensors to a motion signature, the sensor processing module 412 may determine that the user's non-verbal communication based on the type of non-verbal communication associated with the matching motion signature. The sensor processing module 412 can utilize the determined non-verbal communication for many different applications. In embodiments, the determined non-verbal communication can be included in a transcript of a conversation. In embodiments, the determined non-verbal communication can be used to improve the accuracy of natural language processing. In embodiments, the determined non-verbal communication can be used as a form of user feedback.

In embodiments, the data management module 414 receives and manages the storage of in-ear data. In-ear data may include data relating to a sound portion of an audio signal, data relating to a speech portion of an audio signal, biometric data collected from the sensors of the in-ear device 310, and/or metadata corresponding to a captured audio signal. In embodiments, the data management module 414 generates in-ear data objects based on in-ear data. An in-ear data object may correspond to an event and may include the in-ear data captured during the event. An event may refer to an occurrence that is detectable by the in-ear device 310. Examples of events may include an entire conversation, a single speaker's turn speaking during a conversation, a particular noise (e.g., a dog barking, a car alarm sounding, a train whistle blowing, etc.), playback of a particular media item (e.g., a song, television show, or movie), a user instruction to the in-ear device 310 spoken by the user, a detected user activity based on sensor data, and/or any other suitable detectable occurrences. In embodiments, the data management module 414 may generate in-ear data object corresponding to respective events. The term in-ear data object may refer to database records (e.g., database records), files (e.g., .json files), containers, data structures, and the like. The data management module 414 may determine the occurrence of an event and may generate an in-ear data object in response thereto. In generating an in-ear data object, the data management module 414 may obtain relevant data from the signal processing module 402, the sound processing module 404, the speech processing module 406, and/or the sensor signal processing module 408.

Figure 4B:
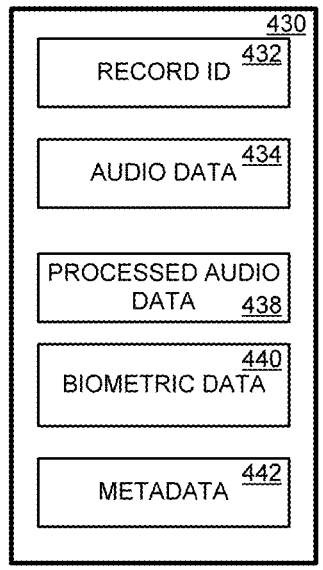
FIG. 4B is a schematic illustrating an example in-ear data record according to some embodiments of the present disclosure.

In embodiments, the data management module 414 generates in-ear data records 430 (which is a type of in-ear data objects) and stores in-ear data records 430 in the in-ear datastore 428. In response to an event, the data management module 414 may generate an in-ear data record 430. FIG. 4B illustrates an example in-ear data record 430 according to some embodiments of the present disclosure. In embodiments, an in-ear data record 430 may include a record identifier 432 (or "record ID" 432), audio data 434, processed audio data 438, biometric data 440, and metadata 442, all of which may include respective subtypes of data. The record ID 432 may be a string or value that uniquely identifies an in-ear data record 430 from other in-ear data records 430.

In embodiments, the audio data 434 of an in-ear data record 430 may include or reference an audio signal corresponding to an event, a sound portion of the audio signal, and/or a speech portion of the audio signal.

In embodiments, the processed audio data 438 of an in-ear data record 430 may include any data corresponding to an event that is derived and/or extracted from the audio signal. Examples of processed audio data 438 may include, but are not limited to, features of the speech and/or sound portions of the audio signal, sound signatures of the speech and/or sound portions of the audio signal, tokens corresponding to utterances that were recognized in the speech portion of the audio signal, a transcript of the speech portion of the audio signal, an annotation object corresponding to the speech portion of the audio signal, classifications of sounds that were recognized in the sound portion of the audio signal, and the like.

In embodiments, the biometric data 440 may include sensor data corresponding to an event that is collected by the in-ear device 310 and/or received from another device associated with the user. The biometric data 440 corresponding to an event may include, but are not limited to motion data relating to the user (e.g., acceleration, velocity, speed of the user) during the event, a heartrate of the user during the event, a body temperature of the user, a body temperature fluctuation of the user during the event, a galvanic skin response of the user during the event, a frequency at which the user's eardrum was vibrating during the event, and the like. In embodiments, the biometric data 440 may additionally include inferences that are derived by the in-ear device 310. In embodiments, inferences that are drawn include a user state at the time of the event. A user state may define, for example, a mood of the user, a current activity of the user, and/or a current health condition of the user.

In embodiments, the metadata 442 may include any additional information relating to an event. The metadata 442 may be obtained by the in-ear device 310 and/or received from an external device or system. Examples of metadata 442 may include, but are not limited to, a geolocation of the user at the time of the event, a region of the user at the time of the event, a time of day corresponding to the event, a media content being consumed by the user at the time of the event, a purchase made during the event, an activity of the user during the event, identities of other humans in proximity to the user at the time of the event, and the like.

The foregoing example is an example of an in-ear data record 430. In embodiments, the record 430 of FIG. 4B may be stored in multiple records that are related via one or more relationships. In embodiments, the in-ear data records 430 may be stored in a database, which indexes the in-ear data records 430 by one or more different data type. For example, in some embodiments, the in-ear data records 430 may be indexed according to one or more of the following: words in the speech; classified sounds in the speech; times of day; location; heart rate; temperature; motion type; and the like. Furthermore, the records 430 may store additional or alternative data types not shown.

In embodiments, the data management module 414 determines a storage plan for in-ear data relating to an event. A storage plan may define where the in-ear data relating to an event is to be stored. In embodiments, in-ear data may be stored on the storage device 420 of the in-ear device 310 (in the in-ear datastore 428), at a user device 320 associated with the in-ear device 310, at a data publishing system 330 associated with the in-ear device 310, a data analytics system 340, or other suitable systems (e.g., a cloud storage system). In an example, a determined storage plan relating to non-private in-ear data may cause the non-private data to be published to and stored at the data publishing system 330. In another example, a determined storage plan relating to in-ear data corresponding to user instructions (e.g., an instruction to store a voice note) may cause the in-ear data to be stored on the in-ear device 310 or at a user device 320 associated with the user of the in-ear device 310. Various examples of storage plans will be presented throughout the disclosure and are not intended to limit the scope of the disclosure.

In embodiments, the data management module 414 employs machine learning to optimize storage space on the in-ear device 310. The data management module 414 may be configured to determine a storage plan based on one or more features of a processed audio signal and a machine-learned model. A storage plan may include one or more recommendations, where each recommendation defines a recommended storage location (or "location") at which the in-ear data is to be stored. Examples of recommended storage locations may include the in-ear device 310, a user device 320 associated with the user, and/or one or more external systems (e.g., the data publishing system 330). In this way, the data management module 414 can determine whether in-ear data can be discarded, stored on the in-ear device 310, stored on a user device 320 of the user, and/or transmitted to an external system. The data management module 414 may be configured to determine the storage plan based on the features of a sound portion of an audio signal and/or the features of a speech portion of the audio signal. In embodiments, the machine-learned model may output one or more locations at which in-ear data corresponding to the audio signal can be stored in response to the features of the audio signal and/or features of the in-ear data. For each device or system on which in-ear data may be stored, the machine-model may output a respective confidence score corresponding to the location that indicates a degree of confidence that the model has in the location as an appropriate storage location for the in-ear data. The data management module 414 may utilize the outputted confidence scores to determine the storage plan. For example, the data management module 414 may include any location having a confidence score greater than a threshold (e.g., ≥0.9) in the storage plan. In some implementations, the data management module 414 can determine that an instance of in-ear data should be discarded if none of the confidence scores exceed a threshold. For example, if the audio signal captures a random noise that is inconsequential (e.g., random dog barking), the data management module 414 may determine that the in-ear data relating to the event is to be discarded.

In embodiments, the data management module 414 may input a feature vector containing features of a speech portion of an audio signal into a machine-learned model that is trained to optimize storage. For example, feature vectors may only be stored for speech portions that represent words that appear with less than a threshold level of frequency, such that common words like "the" and "and" are discarded. In such embodiments, speech portions may be accumulated for a population of individuals, such as in a geographic region, to determine what uncommon words are trending in conversation. These can be stored in a database, searched, and published, such as to provide insight to marketers, advertisers and the like, such as to determine what keywords are most likely to be of interest to users in online searches, mobile searches, and the like.

In embodiments, the features may be tokens that are recognized from a speech portion of an audio signal, one or more sound signatures that are determined based on the speech portion of the audio signal, and/or data from an annotation object derived from the speech portion of the audio signal. In embodiments, the data management module 414 may further input additional features, such as biometric data received from one or more of the sensors, a geolocation of the user, and/or a time of day, into the machine-learned model. In embodiments, the machine-learned model may be a model trained using data of any number of individual users. In these embodiments, the recommendations output by the decision model are based on the data collected from the collection of individual users. In embodiments, the machine-learned model may be personalized for the user, where the model is initially trained using training data obtained from any number of users and is reinforced using feedback from the user. In these embodiments, the machine-learned model may learn preferences of the user based on feedback received therefrom. In response to receiving the features of a speech portion of the audio signal and/or any other additional features, the machine-learned model may output confidence scores relating to each potential storage location. The data management module 414 may utilize the outputted confidence scores to determine the storage plan. For example, the data management module 414 may include any location having a confidence score greater than a threshold (e.g., ≥0.9) in the storage plan.

In embodiments, the data management module 414 may input a feature vector containing features of a sound portion of an audio signal into a machine-learned model that is trained to optimize storage. The features may be one or more extracted features, one or more sound signatures that are determined based on the sound portion of the audio signal, and/or classifications that were associated with sounds captured in the sound portion of the audio signal. In embodiments, the data management module 414 may further input additional features, such as biometric data received from one or more of the sensors, a geolocation of the user, and/or a time of day, into the machine-learned model. In embodiments, the machine-learned model may be a model trained using data of any number of individual users. In embodiments, the machine-learned model may be personalized for the user, where the model is initially trained using training data obtained from any number of users and is reinforced using feedback from the user. In response to receiving the features of a sound portion of the audio signal and/or any other additional features, the machine-learned model may output confidence scores relating to each potential storage location. The data management module 414 may utilize the outputted confidence scores to determine the storage plan. For example, the data management module 414 may include any location having a confidence score greater than a threshold (e.g., ≥0.9) in the storage plan.

In embodiments, the data management module 414 may obtain user feedback regarding a storage plan and may alter one or more of the recommendations based on the user feedback. In embodiments, user feedback regarding a storage plan may be feedback from a user as to whether an instance of in-ear data can be shared to an external system. In embodiments, user feedback regarding a storage plan may be feedback from a user as to whether an instance of in-ear data should be stored on the in-ear device 310. In embodiments, user feedback regarding a storage plan may be feedback from a user as to whether an instance of in-ear data should be stored on an associated user device 330. The user interaction module 412 can ask the user to confirm one or more recommendations in the storage plan. For example, if the confidence score corresponding to a potential recommended location is below a first threshold (e.g., ≤0.9), but above a second threshold (e.g., >0.75), the user interaction module 412 can ask the user if the user wishes to store the instance of in-ear data at the potential recommended location. The user can affirm or deny the recommendation. In the scenario where the user denies the recommendation, the potential recommended location is not included in the storage plan. In the scenario where the user affirms the recommendation, the data management module 414 includes the potential recommended location in the storage plan as an affirmation of the recommendation. In embodiments, the user feedback provided by the user can be used to reinforce the machine-learned decision models implemented by the data management module 414.

In embodiments, the data management module 414 can execute a storage plan in response to determining the storage plan. In response to a storage plan that includes a recommendation to store the in-ear data on the in-ear device, the data management module 414 can generate an in-ear data object (e.g., an in-ear data record 430) corresponding to the event to which the recommendation corresponds and can store the in-ear data object in the in-ear datastore 428. In response to a storage plan that includes a recommendation to store the in-ear data on a user device associated with the user, the data management module 414 can generate an in-ear data object (e.g., a .json object containing the in-ear data) and can provide the in-ear data object to the user device 320 associated with the user. For example, the data management module 414 may transmit the in-ear data object to the associated user device 320 via a personal area network 324. In response to a storage plan that includes a recommendation to store and/or publish the in-ear data to an external system, the data management module 414 can generate an in-ear data object (e.g., a .json object containing the in-ear data) and can provide the in-ear data object to the external system. For example, the data management module 414 may transmit the in-ear data object to the data publishing system 330 or the data analytics system 340 via a communication network and/or via an intermediate device (e.g., a user device 330) that is paired to the in-ear device 310.

In embodiments, the external system interface 416 provides in-ear data to external systems. In embodiments, the external system interface 416 may publish in-ear data, such that systems that are granted access may pull in-ear data from the in-ear device 310. For example, the external system interface 416 may maintain a white list of systems that are granted access to the in-ear datastore 428. The white-listed systems may include a data publishing system 330, an analytics system 340, a social network system 350, an entertainment system 360, an advertising system 370, and the like. A user and/or a provider of the in-ear device 310 (e.g., a manufacturer or service provider) may provide the systems to be included in the white-list. In embodiments, the external system interface 416 may receive a request to access the in-ear data from an external system. In response to the request, the external system interface 416 may verify that the system is on the white list. If the system is white-listed, the external system interface 416 may provide in-ear data to the white-listed system. In embodiments, the external system interface 416 may establish a communication session with the external system, thereby allowing the external system to make multiple data requests. In embodiments, the external system interface 416 may publish the in-ear data to a white-listed external system. In embodiments, the external system interface 416 may implement an API that allows the white-listed external systems to query the in-ear datastore 428 for specific types of data. In this way, the external interface 416 can make in-ear data relating to sounds and/or speech captured by the in-ear device 310 available to external systems. For example, an external system (e.g., the data publishing system 330 or the data analytics system 340) may request in-ear data records 430 relating to all sounds captured by the in-ear device 310 over a particular time frame. In another example, an external system (e.g., the data publishing system 330 or the data analytics system 340) may request in-ear data records 430 relating to all speech records captured by the in-ear device 310 over a particular time frame. In embodiments, the external system interface 416 may further publish in-ear data that has been stored at a user device 330 associated with the user. In these embodiments, the external system interface 416 may maintain an index of in-ear data records 430 that identifies whether a particular record is stored on the in-ear device 310 and/or a user device 320 associated with the user of the in-ear device 310. In the case that one or more in-ear data records 430 are stored on the user device 320, the external system interface 416 may retrieve the in-ear data record(s) 430 from the user device 320 and provides the in-ear data record(s) 430 from the user device 320.

The external system interface 416 may implement any suitable type of API. For example, the external system interface 416 may implement any one of Representational State Transfer (REST), Simple Object Access Protocol (SOAP), Remote Procedure Call (RPC), a Real Time Operating System (RTOS) protocol, and the like. In embodiments, the API implemented by the external system interface 416 may allow an external system to query the in-ear datastore 428 for data records 430 having specific characteristics. For example, an external system may query the in-ear data store for all in-ear data records 430 captured when the user was at the gym and that contain speech-related in-ear data. In another example, the external system may query the in-ear data store for any in-ear data records 430 that correspond to sounds classified as a safety signal (e.g., earthquake sirens, tornado sirens, police sirens, ambulance sirens, and the like). In another example, the external system may query the in-ear data store for in-ear data records 430 that correspond to music listened to by the user. In response to a query from an external system, the external system interface may retrieve the in-ear data records 430 implicated by the request and may transmit the in-ear data records 430, or the contents thereof, to the requesting external system. In some embodiments, any sharing of in-ear data with an external system may be contingent on obtaining user permission and/or organizational permission for the sharing of in-ear data.

In embodiments, one or more of the components of FIG. 4A may be implemented at a user device 320 associated with the user of the in-ear device 310. For example, one or more of the signal processing module 402, the sound processing module 404, the speech processing module 408, the user interaction module 410, the sensor signal processing module 412, the data management module 414, and the external interface module 416 may be implemented at a user device 320. In these embodiments, the in-ear device 310 may communicate captured audio signals or in-ear data to the user device 320, whereby a native application executing at the user device 320 performs the functions described above with respect to the respective components. In this way, the demands placed on the processing device 400 of the in-ear device 310 may be reduced. In some of these embodiments, the native application may communicate with a server, which may also perform some of these described functions. In these embodiments, the server may instantiate a respective container for each in-ear device 310 in use. The container may communicate and may execute one or more of the signal processing module 402, the sound processing module 404, the speech processing module 408, the user interaction module 410, the sensor signal processing module 412, the data management module 414, and the external interface module 416.

Figure 5A:
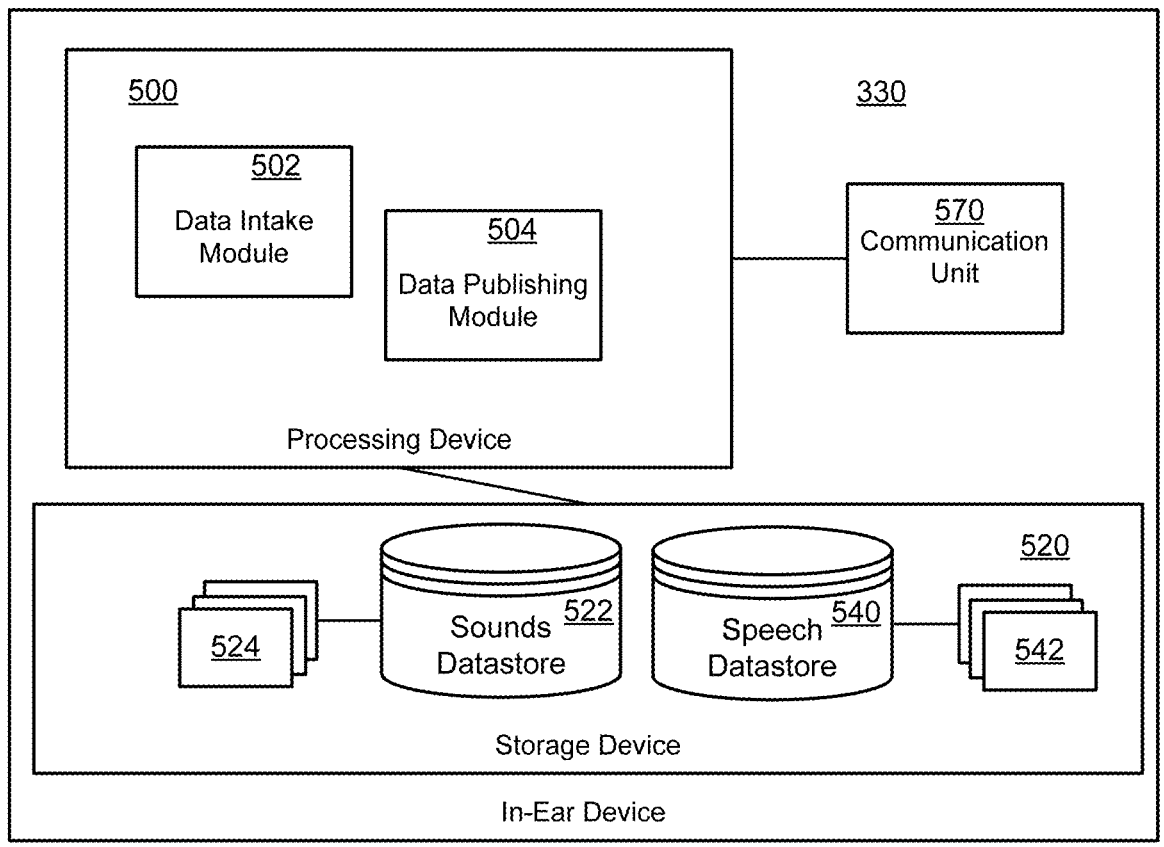
FIG. 5A is a schematic illustrating an example set of components of a data publishing system according to some embodiments of the present disclosure.

FIG. 5A illustrates an example data publishing system 330. The data publishing system 330 is a computing system that provides in-ear data collected from a population of users of in-ear devices 310 to external systems (e.g., a data analytics system 340, a social network system 350, an entertainment system 360, and/or an advertising system 370). The data publishing system 330 may be distributed across one or more computing devices. In embodiments, the data publishing system 330 may include a processing system 500, a storage system 520, and a communication unit 570.

The processing system 500 includes one or more processors that execute computer-readable instructions and non-transitory memory that stores the computer-readable instructions. In implementations having two or more processors, the two or more processors can operate in an individual or distributed manner. In these implementations, the processors may be connected via a bus and/or a network. The processors may be located in the same physical device or may be located in different physical devices. In embodiments, the processing system 500 may execute a data intake module 502 and a data publishing module 504.

The storage system 520 includes one or more storage devices. The storage devices may be any suitable type of computer readable mediums, including but not limited to read-only memory, solid state memory devices, hard disk memory devices, Flash memory devices, one-time programmable memory devices, many time programmable memory devices, RAM, DRAM, SRAM, network attached storage devices, and the like. The storage devices may be connected via a bus and/or a network. Storage devices may be located at the same physical location (e.g., in the same device and/or the same data center) or may be distributed across multiple physical locations (e.g., across multiple data centers). In embodiments, the storage system 520 may store a sound datastore 522 and a speech datastore 540.

Figure 5B:
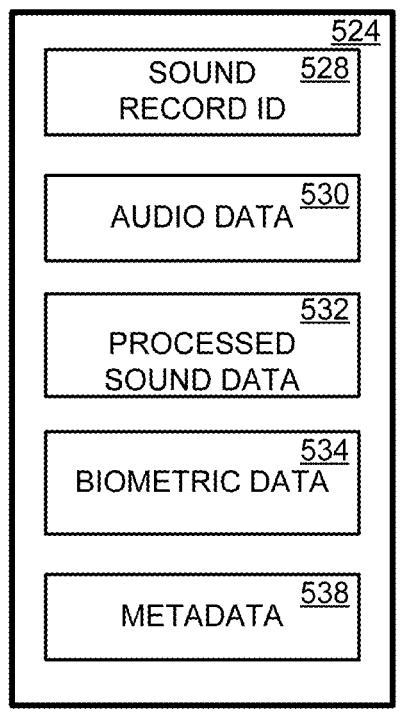
FIG. 5B is a schematic illustrating an example sound record according to some embodiments of the present disclosure.

In embodiments, the sound datastore 522 may store sound records 524. In embodiments, the sound datastore 522 may store one or more databases that store sound records 524, one or more tables, and/or one or more indexes that index the sound records 524. In embodiments, the indexes may index sound records 524 by sound-related data (e.g., classifications of sounds, sound signatures of sound portions of audio signals, digital fingerprints), biometric data, temporal data, context data and/or geographic data. FIG. 5B illustrates an example schema of a sound record 524 according to some embodiments of the present disclosure. A sound record 524 may correspond to an event captured by an in-ear device 310 of an individual user. The sound records 524 may collectively define events captured by in-ear devices 310 of a collection of users. A sound record 524 may include a sound record ID 528, audio data 530, processed sound data 532, biometric data 534, and metadata 538, all of which may include one or more fields that store respective types of data. The sound record ID 528 may be a string or value that uniquely identifies a sound record 524 from other sound records 524.

In embodiments, the audio data 530 of a sound record 524 may include or reference an audio signal corresponding to an event and/or a sound portion of the audio signal. In embodiments, the processed sound data 532 of a sound record 524 may include any data corresponding to an event that is derived and/or extracted from a sound portion of an audio signal. Examples of processed sound data 532 may include, but are not limited to, features of the sound portion of the audio signal, sound signatures of the sound portion of the audio signal, digital fingerprints of the sound portion of the audio signal, classifications of sounds that were recognized in the sound portion of the audio signal, and the like.

In embodiments, the biometric data 534 may include sensor data corresponding to an individual user of an in-ear device 310 that is collected during or in proximity to the event to which the sound record 524 corresponds. The biometric data 534 corresponding to an event may include, but are not limited to motion data relating to the user (e.g., acceleration, velocity, speed of the user) during the event, a heartrate of the user during the event, a body temperature of the user, a body temperature fluctuation of the user during the event, a galvanic skin response of the user during the event, a frequency at which the user's eardrum was vibrating during the event, and the like. In embodiments, the biometric data 534 may additionally include inferences that are derived from the sensor data. In embodiments, inferences that are drawn include a user state at the time of the event. A user state may define a mood of the user, a current activity of the user, and/or a current health condition of the user.

In embodiments, the metadata 538 may include any additional information relating to an event. The metadata 538 may be obtained by the in-ear device 310 and/or received from an external device or system. Examples of metadata 538 may include, but are not limited to, a geolocation of the user at the time of the event, a region of the user at the time of the event, a time of day corresponding to the event, a media content being consumed by the user at the time of the event, identities of other humans in proximity to the user at the time of the event, and the like.

Figure 5C:
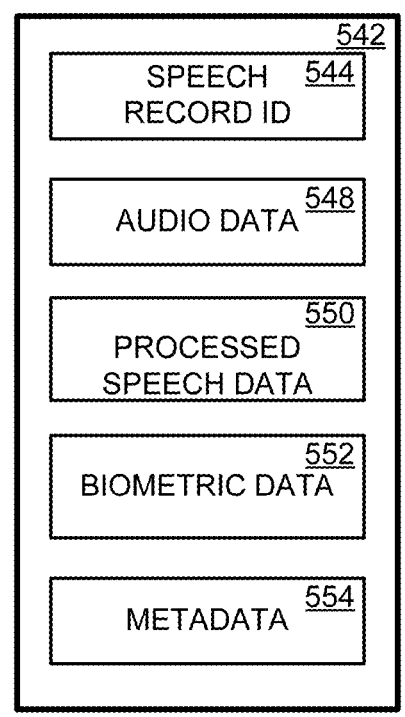
FIG. 5C is a schematic illustrating an example speech record according to some embodiments of the present disclosure.

In embodiments, the speech datastore 540 may store speech records 542. In embodiments, the speech datastore 540 may store one or more databases that store speech records 542, one or more tables, and/or one or more indexes that index the speech records 542. In embodiments, the indexes may index 542 by speech related data (e.g., tokens and/or sound signatures of the speech), biometric data, temporal data, and/or geographic data. FIG. 5C illustrates an example of a speech record 542 according to some embodiments of the present disclosure. A speech record 542 may correspond to an event captured by an in-ear device 310 of an individual user. The speech records 542 may collectively define events captured by in-ear devices 310 of a collection of users. A speech record 542 may include a speech record ID 544, audio data 548, processed speech data 550, biometric data 552, and metadata 554, all of which may include one or more fields for respective types of data. The speech record ID 544 may be a string or value that uniquely identifies a speech record 542 from other speech records 542.

In embodiments, the audio data 548 of a speech record 542 may include or reference an audio signal corresponding to an event and/or a speech portion of the audio signal. In embodiments, the processed speech data 550 of a speech record 542 may include any data corresponding to an event that is derived and/or extracted from a speech portion of an audio signal. Examples of processed speech data 550 may include, but are not limited to, features of the speech portion of the audio signal, sound signatures of the speech portion of the audio signal, digital fingerprints of the speech portion of the audio signal, tokens of utterances that were recognized in the speech portion of the audio signal, term frequency-inverse document frequency (TFIDF) scores of the recognized utterances, annotation objects corresponding to the speech portion of the audio signal, transcripts of the speech portion of the audio signal, and the like.

In embodiments, the biometric data 552 may include sensor data corresponding to an individual user of an in-ear device 310 that is collected during or in proximity to the event to which the speech record 542 corresponds. The biometric data 552 corresponding to an event may include, but are not limited to motion data relating to the user (e.g., acceleration, velocity, speed of the user) during the event, a heartrate of the user during the event, a body temperature of the user, a body temperature fluctuation of the user during the event, a galvanic skin response of the user during the event, a frequency at which the user's eardrum was vibrating during the event, and the like. In embodiments, the biometric data 552 may additionally include inferences that are derived from the sensor data. In embodiments, inferences that are drawn include a user state at the time of the event. A user state may define a mood of the user, a current activity of the user, and/or a current health condition of the user.

In embodiments, the metadata 554 may include any additional information relating to an event. The metadata 554 may be obtained by the in-ear device 310 and/or received from an external device or system. Examples of metadata 554 may include, but are not limited to, a geolocation of the user at the time of the event, a region of the user at the time of the event, a time of day corresponding to the event, a media content being consumed by the user at the time of the event, identities of other humans in proximity to the user at the time of the event, and the like.

In embodiments, the data intake module 502 receives in-ear data objects from in-ear devices 310. The data intake module 502 may receive an in-ear data object directly from an in-ear device 310 or from a user device 320 associated with the in-ear device 310. In embodiments, the data intake module 502 may receive an in-ear data object and may store a sound record 524 in the sound datastore 522 based on the in-ear data object and/or may store a speech record 532 in the speech datastore 540 based on the in-ear data object.

In embodiments, the data intake module 502 may receive an in-ear data object and determine whether the in-ear data object contains sound data. If the in-ear data object contains sound data, the data intake module 502 may generate a new sound record 524 based on the received in-ear data object. In embodiments, the in-ear data object is a .json file. As such, the data received by the in-take module may be structured according to a schema that is known by the data intake module 502. The data intake module 502 may instantiate a new sound record 52 and may populate the fields of the new sound record 524 with the in-ear data contained in the in-ear data object that pertains to a sound portion of the audio signal as well as any additional biometric data and/or metadata contained in the in-ear data object. In embodiments, the data intake module 502 may index the new sound record 522 and may store the new sound record in the sound datastore.

In embodiments, the data intake module 502 may receive an in-ear data object and determine whether the in-ear data object contains speech data. If the in-ear data object contains speech data, the data intake module 502 may generate a new speech record 542 based on the received in-ear data object. In embodiments, the in-ear data object is a .json file. As such, the data received by the in-take module may be structured according to a schema that is known by the data intake module 502. The data intake module 502 may instantiate a new speech record 542 and may populate the fields of the new speech record 542 with the in-ear data contained in the in-ear data object that pertains to a speech portion of the audio signal as well as any additional biometric data and/or metadata contained in the in-ear data object. In embodiments, the data intake module 502 may index the new speech record 542 and may store the new sound record in the speech datastore 540.

In embodiments, the data publication module 504 provides in-ear data collected from a collection of in-ear devices 310 to other external systems. In some embodiments, the data publication module 504 implements an API that allows the data publication module 504 to publish the in-ear data to the external systems (e.g., a data analytics system 340, a social network system 350, an entertainment system 360, and an advertising system 370). The data publication module 504 may implement any suitable type of API including, but not limited to, Representational State Transfer (REST), Simple Object Access Protocol (SOAP), a Real Time Operating System (RTOS) protocol, and/or Remote Procedure Call (RPC). In embodiments, an external system may utilize the in-ear data to improve machine-learning tasks. In embodiments, an external system may use the in-ear data to train application-specific models and/or to perform other suitable analytics on the in-ear data. An external system may obtain in-ear data from the data publication in any suitable manner. In embodiments, an external system may query the data publication module 504 via the API for the in-ear data for records having one or more characteristics. For example, an external system may query the data publication module to receive all newly indexed speech records 542. In another example, an external system may request sound records that corresponding to sounds that have been classified as a particular sound (e.g., doorbells or ringtones). The data publication module 504 may implement a flexible subscription model that allows an external system to request records based on multiple characteristics. For example, an external system 504 may request sound records 524 that correspond to audio signals containing music, where the user was in a particular geographic area and was exhibiting particular biometric characteristics (e.g., a body temperature that is greater than 99 degrees Fahrenheit and/or a heartrate greater than 80 beats per minute). In another example, an external system may request speech records 542 that correspond to speech captured when a user was exhibiting certain biometric characteristics (e.g., a certain galvanic skin response). In embodiments, the data publication module 504 may provide the requested data records to the external system via the API.

In embodiments, an external system may subscribe to the data publication module 504 to receive in-ear data having certain characteristics. For example, an external system may subscribe to a data feed to receive all speech records 542 from a particular country or region. In another example, an external system may subscribe to a data feed to receive all speech records 542 pertaining to a particular subject matter. In another example, an external system may subscribe to a data feed to receive all newly indexed sound records 528. In another example, an external system may subscribe to a data feed to receive all newly indexed speech records 542. The data publication module 504 may implement a flexible subscription model that allows an external system to request records based on multiple characteristics. For example, an external system may request speech records 542 corresponding to audio captured in a particular region from users exhibiting certain biometric features. In another example, an external system may request sound records 524 corresponding to sounds having certain classifications or qualities that were captured in a particular geographic area from users exhibiting certain biometric features. In embodiments, the data publication module 504 may provide the requested data records to the external system via the API.

The data publication module 504 may interact with any number of suitable systems. In embodiments, the data publication module 504 may provide audio-related data and corresponding biometric data to an analytics system 340. An analytics system 340 may be any computing system that receives large amounts of data and performs one or more analytics-related tasks based on the received data. In embodiments, an analytics system 340 generates models based on received data. In embodiments, the analytics system 340 may generate machine-learned models based on the audio-related data and corresponding biometric data. In embodiments, an analytics system 340 may analyze data to uncover statistical trends within the data.

In some embodiments, the analytics system 340 may train machine-learned models 340 that are used in natural language processing tasks based on speech records 542 containing biometric data 552. The analytics system 340 may receive speech records 542 from the data publication module 504 that have certain characteristics. For example, the analytics system 504 may request/receive speech records 542 that correspond to a particular location, geographic region, or country and/or that have particular types of speech (e.g., phone calls or conversations). Each of the speech records 542 may include biometric data 552 that includes various sensor readings relating to the body of the user at the time the audio signal was captured. The analytics system 340 may utilize the processed speech data 550, the biometric data 552, and the metadata 554 contained in the speech records 542 to improve natural language processing by taking into account the user's biometric response to certain phrases. For example, a user's heartbeat, galvanic skin response, temperature, and head movements may be informative of the user's mood when engaging in conversation. In this example, the analytics system 340 may train models that also predicts a user's mood when predicting the meaning of a speech portion of an audio signal based on the user's heartbeat, galvanic skin response, temperature, and/or head movements.

In embodiments, the data publishing module 504 may publish a set of speech records 542 to the analytics system 340. The set of speech records 542 may be explicitly requested by the analytics system 340 using specified search criteria and/or may be in response to a subscription for speech records 542 having specified characteristics. The analytics system 340 may then train new models and/or update pre-existing models based on the received speech records 542. The analytics system 340 may extract relevant processed speech data 550, biometric data 552, and/or metadata 554 from the speech records 542 and may train/update a model based on the relevant data.

In some embodiments, the analytics system 340 may train machine-learned models 340 that are used in sound processing tasks based on sound-related data and corresponding biometric data corresponding to the sound-related data. In embodiments, the analytics system 340 may receive sound records 524 from the data publication module 504 that have certain characteristics. For example, the analytics system 504 may request/receive sound records 524 that have been classified as being of a particular sound type. Each of the sound records 524 may include biometric data 552 that includes various sensor readings relating to the body of the user at the time the audio signal was captured. The analytics system 340 may utilize the processed sound data 532, the biometric data 534, and the metadata 538 contained in the sound records 524 to improve models that are trained to predict a user state given an audible stimulus. For example, a user's heartbeat, galvanic skin response, temperature, and head movements may be informative of a user's state when confronted with a particular stimulus. In this example, the analytics system 340 may train models that also predicts a user state in response to classifying a particular sound. Models that are trained to predict a user state in response to classifying a particular sound may be used to help improve recommendations to the user and/or user-specific AI tasks.

In embodiments, an analytics system 340 (or an advertising system 370) may receive audio-related data collected from the in-ear devices 310 of a collection of users to identify trends. The analytics system may receive speech records 542 that have particular characteristics and determine trends based on the speech records 542. For example, the analytics system 340 may request speech records 542 relating to speech that was captured in a particular location, geographic region, or country. Additionally, or alternatively, the analytics system 340 may request speech records 542 that are limited to a particular time period (e.g., the previous week). In some embodiments, the analytics system 340 may identify trending words or topics based on the speech records 542. The analytics system 340 may identify words (which may be represented by tokens) or sequences of words that have greater than normal usage in a particular geographic area. For example, if the New York Yankees are playing a baseball series in Kansas City, Mo., the speech records 542 corresponding to audio signals collected by in-ear devices 310 of users in Kansas City may include the words "New York Yankees" in the processed speech data 550 at a much greater rate during the baseball series than speech records 542 corresponding to audio signals collected with the New York Yankees were not in town or than speech records 542 corresponding to audio signals collected in different parts of the country or world. Thus, the analytics system 542 can identify a list of words that are trending in a particular region. In another example, the analytics system 340 may request data pertaining to particular demographics. In this example, the analytics system 340 may request speech records 542 that correspond to users in a certain age range, users that have certain activity levels (e.g., users who take more than 10,000 steps a day), and/or users that have particular characteristics (e.g., same sex, same interests, etc.). The analytics system 340 may then identify trending words or phrases within those demographics based on the requested speech records. The trending words may provide an insight to topics that are not necessarily being searched or discussed on social media by users but that are trending nonetheless. To identify trending words, the analytics system 340 may compare words or phrases having relatively high TFIDF scores in those records. In another example, the analytics system 340 may request all speech records 542 that were generated during a recent time period. The analytics system 340 may then cluster the speech records 542 based on a set of defined features (e.g., recognized tokens, age, biometric data, and location) using a suitable clustering algorithm (e.g., k-means clustering). The analytics system 340 may then identify the different demographics of users based on those clusters. The analytics system 340 may analyze the clusters of speech records 542 to find common feature values amongst the speech records to determine a demographic. The analytics system 340 may then identify words or phrases within those clusters that have relatively high TFIDF scores. As opposed to relying on search terms, hashtags, and the like, speech data is a better indicator of trending words because the speech data may be collected passively and is a more accurate indicator of topics that are being discussed by humans.

In embodiments, the data publication module 504 may publish data collected from in-ear devices 310 of a collection of users to improve the automation of entertainment systems 360. For example, an entertainment system 360 that provides music to users may receive sound records 524 from the data publication module 504 that relate to sounds recognized as music. The sound records may include or may reference sound signatures and/or digital fingerprints that correspond to a song or part of a song. In embodiments, the sound records 524 may further contain biometric data 534 and/or metadata 538. The biometric data 534 may be indicative of a user mood when listening to the song. In embodiments mood may be derived at least in part from head motion, such as detected by a motion sensor in the in-ear device 20. The metadata 538 may be indicative of a time of day when the user was listening to the song, a location of the user when listening to the song, and/or a user activity when the user was listening to the song. The entertainment system 524 may utilize the received sound records 524 to train machine-learned models (e.g., neural networks or regression models) that are configured to make content recommendations to users based on certain user characteristics. In embodiments, the entertainment system 360 may train models that are used to recommend content to a user based on a perceived mood of the user, which may be indicated by biometric data of the user. Such models may be used to recommend specific songs or types of songs to a user when the biometric data of the user is indicative of a particular user state. The entertainment system 360 may upload these models to the in-ear devices 310 of users that utilize the entertainment system 360, such that users of the in-ear devices 310 may be presented with content recommendations based on the biometric data collected by the in-ear device 310. In embodiments, the models may be customized for an individual user by reinforcing the model with data extracted from sound records 524 derived from in-ear data captured by the in-ear device 310 of the individual user. Other entertainment systems 360 can utilize data collected from in-ear devices 310 in other suitable manners. For instance, a video gaming platform may utilize sound-related data and/or speech-related data to improve the gameplay experience of a video game.

In embodiments, the data publication module 504 may publish data collected from in-ear devices 310 of a collection of users to a social networking system 350. A social networking system 350 may utilize the published data to improve the user experience on the social networking system 350. In embodiments, the social networking system 350 may request speech records 542 to identify trending words or phrases, as described above. A social networking system 350 may tailor a newsfeed or other content provided by the social networking system 350 based on the trending words or phrases.

In embodiments, the data publication module 504 may publish data collected from in-ear devices 310 of a collection of users to an analytics system 340 to improve location-based services. For example, the data publication module 504 may include location data (e.g., geolocations or geographic regions) corresponding to users as well as the in-ear data that was captured, extracted, or derived from audio signals captured by in-ear devices 310 of a collection of users when at locations indicated by the location data. In embodiments, the combination of location data and the in-ear data may be used to train models that are tuned to recognize trends that are location-based. For example, the data publication module 504 may provide speech records 542 containing combinations of location data and speech data that may be used to train speech recognition models that are geographically specific. These types of machine-learned models may be better at recognizing newly termed regional slang. In another example, machine-learned models trained using location data and in-ear data can be utilized to improve advertisement placement and recommending content to users in specific regions.

In embodiments, the data publication module 504 may publish data collected from in-ear devices 310 of a collection of users to an analytics system 340 to train models that can improve emergency response systems. In some embodiments, the data publication module 504 may provide sound records 524 to the analytics system 340 to determine human responses to emergency signals. For example, the data publication module 504 may publish any sound records 524 corresponding to recognized sounds that have been classified as safety-related sounds. Examples of safety-related sounds may include, but are not limited to, emergency broadcast signals, earthquake sirens, tornado sirens, police sirens, ambulance sirens, firetruck sirens, car horns, fire alarms, smoke alarms, train signals, and the like. The analytics module 524 may then analyze the biometric data 534, as well as any features pertaining to the volume or frequency of the safety-related sounds, to determine information relating to human responses to the safety-related sounds. For example, the analytics system 340 may determine safety-related sounds that are reacted to or ignored by users based on motion data that defines a movement of the user's head in response to hearing the sound and/or a galvanic skin response of a user in response to hearing the sound. The analytics system 340 may train a machine-learned model (e.g., a neural network) that receives sound features and biometric features and outputs a determination whether the user is appropriately responding to the safety sound. The analytics system 340 may train the machine-learned model in a supervised or semi-supervised manner. For example, the analytics system 340 may utilize sound records 524 that have been labeled as either a situation where the user appropriately responded to the safety sound or a situation where the user ignored the safety sound to initially train the model. The analytics system 340 may further use unlabeled sound records 524 to further train the model. These machine-learned models may be uploaded to in-ear devices 310, so as to gauge whether a user is appropriately responding to a safety sound. In the case the user is not responding to the safety sound, the in-ear device 310 may output an audible message in the user's ear notifying them of the safety sound and/or instructing them to pay attention.

The data publication module 504 may publish sound and/or speech data to any other suitable systems. Furthermore, while certain types of systems are discussed, it is understood that the systems described above may be integrated in a single service. For example, an entertainment system 360 may include or be associated with an analytics system 340 that trains models for the entertainment system 360. In another example, the analytics system 340 may be incorporated in an advertising system 370 and/or a social network system 350.

Figure 6:
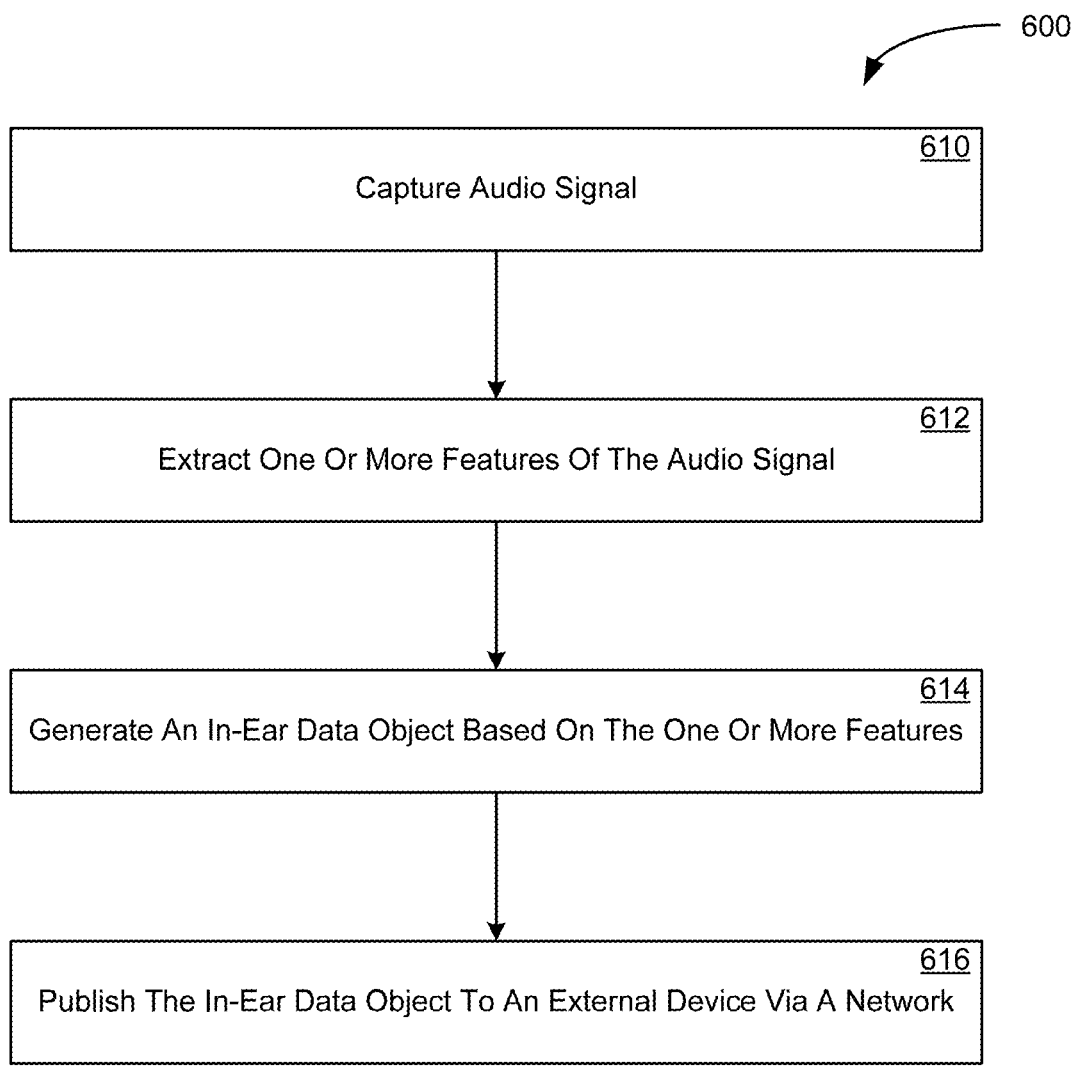
FIG. 6 is a flow chart illustrating a method for publishing in ear data according to some embodiments of the present disclosure.

FIG. 6 illustrates an example set of operations of a method 600 for publishing in-ear data objects to external devices or systems. In embodiments, the method 600 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 610, the in-ear device captures an audio signal. The in-ear device may capture an audio signal via one or more microphones embedded in the in-ear device. The microphone(s) may capture a sound wave and may output an audio signal corresponding to the sound wave. The audio signal may contain speech (e.g., a speech portion of the audio signal) and/or sounds (e.g., a sound portion of the audio signal) captured in the sound wave.

At 612, the in-ear device may extract one or more features of the audio signal. In embodiments, extracting one or more features may include identifying or otherwise isolating a sound portion of the audio signal and/or a speech portion of the audio signal. In embodiments, the in-ear device may implement one or more filters (e.g., high-pass filters, low pass filters, band-pass filters, and the like) to identify the speech and sound portions of the audio signal. In embodiments, the in-ear device may transform audio frames of the audio signal to the frequency domain and may identify the speech and/or sound portions of the audio signal based on the transformed audio frames.

In embodiments, the in-ear device may determine features of the sound portion of the sound signal. In embodiments, the in-ear device may determine one or more of the following features of a sound portion of the audio signal: a sound signature of the sound portion of the audio signal, a digital fingerprint of the sound portion of the audio signal, a volume of the sound portion of the audio signal, a frequency of the sound portion of the audio signal, classifications of sounds captured in the sound portion of the audio signal, and the like.

In embodiments, the in-ear device may determine features of the speech portion of the audio signal. In embodiments, the in-ear device may determine one or more of the following features of a speech portion of the audio signal: one or more tokens recognized in the speech portion of the audio signal, one or more annotation objects indicating a meaning or understanding of the speech portion of the audio signal, a sound signature of the speech portion of the audio signal, identities of speakers heard in the speech portion of the audio signal, a volume of the speech portion of the audio signal, and the like. In embodiments, the in-ear device may utilize one or more speech recognition techniques and/or natural language processing techniques to determine the features of the speech portion of the audio signal.

At 614, the in-ear device generates an in-ear data object based on the one or more features. The term in-ear data object may refer to database records (e.g., database records), files (e.g., .json files), data structures, and the like. In generating an in-ear data object, in-ear device may include the one or more features of the audio signal and/or any other relevant data in the in-ear data object. In the case of a sound portion of an audio signal, the in-ear device may include features such as the original audio signal, a sound portion of the audio signal, a sound signature of the sound portion of the audio signal, a digital fingerprint of the sound portion of the audio signal, a volume of the sound portion of the audio signal, a frequency of the sound portion of the audio signal, classifications of sounds captured in the sound portion of the audio signal, and/or any other suitable sound-related data in the in-ear data object. In the case of a speech portion of the audio signal, the in-ear device may include one or more tokens recognized in the speech portion of the audio signal, one or more annotation objects indicating a meaning or understanding of the speech portion of the audio signal, a sound signature of the speech portion of the audio signal, identities of speakers heard in the speech portion of the audio signal, a volume of the speech portion of the audio signal, and/or any other suitable speech related data in the in-ear data object. The in-ear device may further include biometric features and/or metadata in the in-ear data object. For example, the in-ear device may include a heartrate of the user, a heartrate flux of the user, a body temperature of the user, a temperature flux of the user, a galvanic skin response of the user, motion data corresponding to the user, motion data relating to the user's head, a vibration frequency of the user's eardrum, a geolocation of the user at a time the audio was captured, a region of the user at the time of capture, a time at which the audio signal was captured, and/or any other suitable metrics in the in-ear data object.

At 616, the in-ear data object may publish the in-ear data object to an external device via a network. In embodiments, the in-ear device may publish in-ear data objects, such that external systems that are granted access may pull in-ear data objects from the in-ear device. For example, the in-ear device may maintain a white list of systems that are granted access to an in-ear data from the in-ear device. The white-listed systems may include a data publishing system, an analytics system, a social network system, an entertainment system, an advertising system, and the like. In embodiments, a cloud-based edge computing system, such as Amazon™

Lambda™, may be provided with data from the in-ear device for calculation of one or more metrics, such as word counts, sound signature counts, dosimetry, activity levels, or others, such as to trigger one or more events or activities, to configure one or more settings, to determine routing of data, or the like. In embodiments, a user and/or a provider of the in-ear device 310 (e.g., a manufacturer or service provider) may provide the systems to be included in the white-list. In embodiments, the in-ear device may receive a request to access the in-ear data from an external system. In response to the request, the in-ear device may verify that the system is on the white list. If the system is white-listed, the in-ear device may provide in-ear data to the white-listed system. In embodiments, the in-ear device may establish a communication session with the external system, thereby allowing the external system to make multiple data requests. In embodiments, the in-ear device may publish the in-ear data to a white-listed external system. In embodiments, the in-ear device may implement an API that allows the white-listed external systems to query a database residing on the in-ear device for specific types of data. In this way, the in-ear device can make requests for in-ear data relating to sounds and/or speech captured by the in-ear device available to external systems. For example, an external system may request in-ear data objects relating to all sounds captured by the in-ear device over a particular time frame. In another example, an external system may request in-ear data objects relating to all speech records captured by the in-ear device over a particular time frame.

In embodiments, the in-ear device may further publish in-ear data that has been stored at a user device associated with the user. In these embodiments, the in-ear device may maintain an index of in-ear data objects that identifies whether a particular record is stored on the in-ear device and/or a user device associated with the user of the in-ear device. In the case that one or more in-ear data objects are stored on the user device, the in-ear device retrieves the in-ear data objects from the user device and provides the in-ear data objects from the user device. The in-ear device may implement any suitable type of API. For example, the in-ear device may implement any one of Representational State Transfer (REST), Simple Object Access Protocol (SOAP), Remote Procedure Call (RPC), Real Time Operating System protocol (RTOS) and the like.

Figure 7:
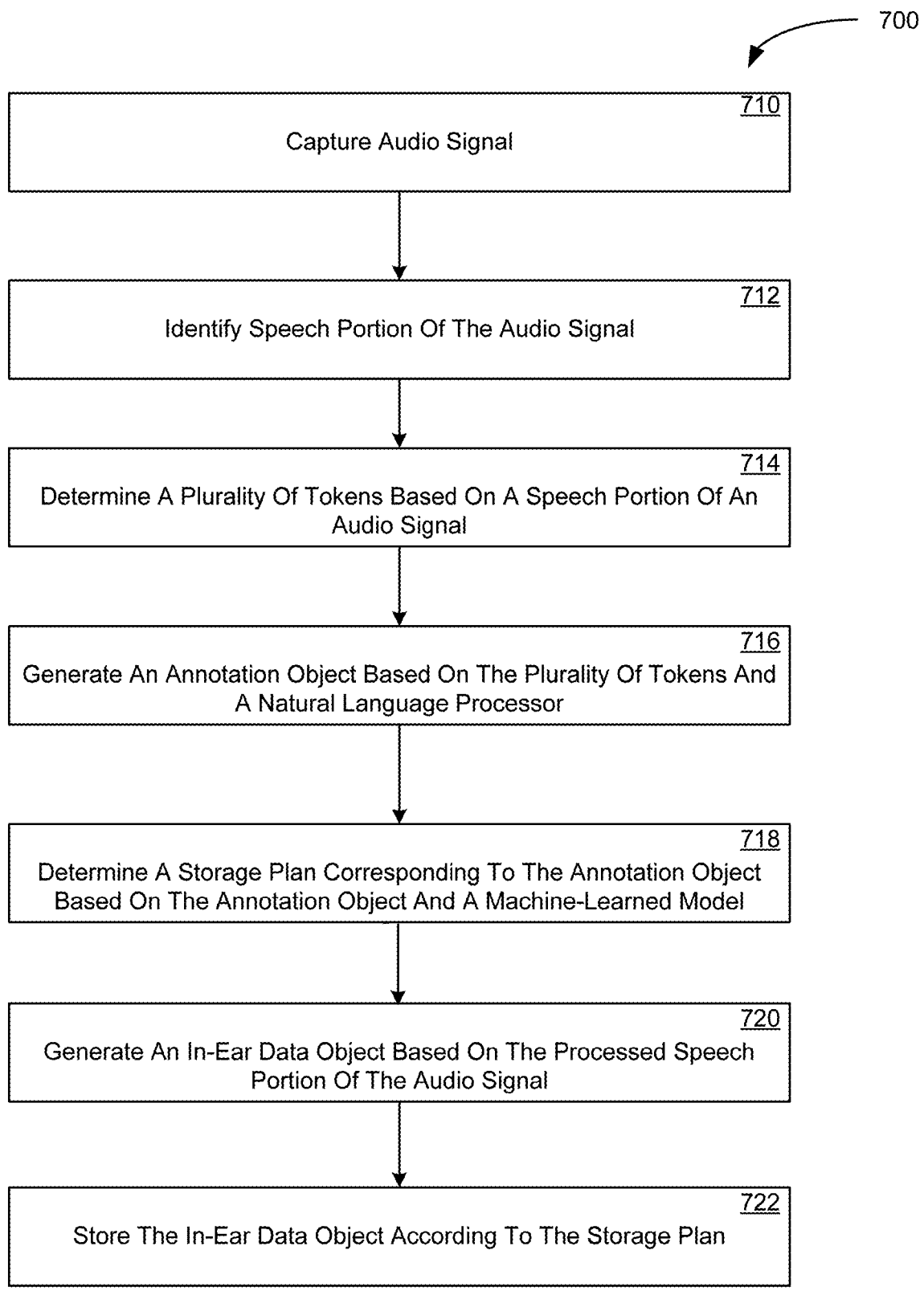
FIG. 7 is a flow chart illustrating a method for optimizing storage of in-ear data corresponding to an audio signal captured by an in-ear device according to some embodiments of the present disclosure.

FIG. 7 illustrates an example set of operations of a method 700 for optimizing storage of in-ear data corresponding to an audio signal captured by an in-ear device using machine-learning. In embodiments, the method 700 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 710, the in-ear device captures an audio signal. For example, the in-ear device may include a heartrate of the user, a heartrate flux of the user, a body temperature of the user, a temperature flux of the user, a galvanic skin response of the user, motion data corresponding to the user, motion data relating to the user's head, a vibration frequency of the user's eardrum, a geolocation of the user at a time the audio was captured, a region of the user at the time of capture, a time at which the audio signal was captured, and/or any other suitable metrics in the in-ear data object.

At 712, the in-ear device may identify a speech portion of the audio signal. In embodiments, the in-ear device may implement one or more filters (e.g., high-pass filters, low pass filters, band-pass filters, and the like) to identify the speech portion of the audio signal. In embodiments, the in-ear device may transform audio frames of the audio signal to the frequency domain and may identify the speech portion of the audio signal based on the transformed audio frames.

At 714, the in-ear device may determine a plurality of tokens based on the speech portion of the audio signal. In embodiments, the in-ear device may analyze the speech portion of the audio signal to identify one or more tokens based on the speech portion of the audio signal. The in-ear device may implement any suitable speech recognition process or processes when performing speech recognition on the speech portion of the audio signal.

In embodiments, the in-ear device may detect a language of the speech portion. The language may be a known language of the user or may be detected based on a preliminary analysis of the speech portion of the audio signal. In embodiments, the in-ear device may parse the speech portion of the audio signal to identify a sequence of phonemes. The in-ear device may determine potential utterances (e.g., words) based on the phonemes. In some implementations, the in-ear device generates various n-grams (unigrams, bi-grams, tri-grams, etc.) of sequential phonemes. The in-ear device may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the in-ear device may utilize the output tokens to generate a transcription of the speech portion of the audio signal based on a sequential processing of the speech portion of the audio signal. Additionally, or alternatively, the in-ear device may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the audio signal, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech in-ear device may implement other processing techniques on the tokens.

At 716, the in-ear device may generate an annotation object based on the plurality of tokens and a natural language processor. In embodiments, the in-ear device implements a natural language processor that is configured to perform natural language processing (NLP) on the recognized speech. In embodiments, the in-ear device analyzes the results speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled and the label may be assigned a confidence score indicating a degree of confidence in the label assigned to the token or sequence of tokens. In embodiments, each relationship may be labeled and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the annotation object. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The in-ear device may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens, and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

At 718, the in-ear device may determine a storage plan based on the annotation object. In embodiments, the in-ear device determines a storage plan for in-ear data relating to an event. A storage plan may define where the in-ear data relating to an event is to be stored. A storage plan may include one or more recommendations, where each recommendation defines a recommended storage location (or "location") at which the in-ear data is to be stored. In embodiments, in-ear data may be stored on the storage of the in-ear device, at a user device associated with the in-ear device, at a data publishing system associated with the in-ear device, a data analytics system, or other suitable systems (e.g., a dedicated cloud storage system). In an example, a determined storage plan relating to non-private in-ear data may cause the non-private data to be published to and stored at a data publishing system and/or analytics system. In another example, a determined storage plan relating to in-ear data corresponding to user instructions (e.g., an instruction to store a voice note) may cause the in-ear data to be stored on the in-ear device or at a user device associated with the user of the in-ear device.

In embodiments, the in-ear device employs machine learning to improve storage on the in-ear device. The in-ear device may be configured to determine a storage plan based on one or more features of the processed speech captured in an audio signal and a machine-learned decision model. In this way, the in-ear device can determine whether in-ear data can be discarded, stored on the in-ear device, stored on a user device associated with the user, and/or transmitted to an external system. In embodiments, the in-ear device may be configured to determine the storage plan based on the features of a speech portion of the audio signal. In embodiments, the machine-learned decision model may output one or more locations at which in-ear data corresponding to the audio signal can be stored in response to the inputted features. For each device or system on which in-ear data may be stored, the machine-model may output a respective confidence score corresponding to the location that indicates a degree of confidence that the model has in the location as an appropriate storage location for the in-ear data. The in-ear device may utilize the outputted confidence scores to determine the storage plan. For example, the in-ear device may include any location having a confidence score greater than a threshold (e.g., $\geq 0.9$) in the storage plan. In some implementations, the in-ear device can determine that an instance of in-ear data should be discarded if none of the confidence scores exceed a threshold. For example, if the audio signal captures random speech that is inconsequential (e.g., a random person speaking in the background noise), the in-ear device may determine that the in-ear data relating to the event is to be discarded.

In embodiments, the in-ear device may input a feature vector containing features of a speech portion of an audio signal into a machine-learned decision model that is trained to optimize storage. The features may be the tokens that are recognized from a speech portion of an audio signal, one or more sound signatures that are determined based on the speech portion of the audio signal, and/or data from an annotation object derived from the speech portion of the audio signal. In embodiments, the in-ear device may further input additional features, such as one or more biometric features derived from sensor data received from the sensors of the in-ear device, a geolocation of the user, and/or a time of day, into the machine-learned decision model. In embodiments, the machine-learned decision model may be a model trained using data of any number of individual users. In these embodiments, the recommendations output by the decision model are based on the data collected from the collection of individual users. In embodiments, the machine-learned model may be personalized for the user, where the decision model is initially trained using training data obtained from any number of users and is reinforced using feedback from the user. In these embodiments, the machine-learned decision model may learn preferences of the user based on feedback received therefrom. In response to receiving the features of a speech portion of the audio signal and/or any other additional features, the machine-learned model may output confidence scores relating to each potential storage location. The in-ear device may utilize the outputted confidence scores to determine the storage plan. For example, the in-ear device may include any location having a confidence score greater than a threshold (e.g., $\geq 0.9$) in the storage plan.

In embodiments, the machine-learned decision model may be trained to identify personal, sensitive, or otherwise private data. In these embodiments, the machine-learned decision model may be trained to bias recommendations of private data towards storage on the in-ear device and/or the user device associated with the user, as opposed to external systems that utilize the data for purposes other than merely remote storage.

At 720, the in-ear device may generate an in-ear data object based on the processed speech portion of the audio signal. The in-ear device may include the annotation object in the in-ear data object, as well as any other relevant data, features, and/or metadata in the in-ear data object. As discussed, an in-ear data object may be a data record, a file, container, data structure, and the like. In embodiments, the in-ear device may generate multiple in-ear data objects, depending on the locations at which an in-ear data object may be stored. For instance, in the event a storage plan calls for an in-ear data object to be stored on the in-ear device and at an external system for publication, the in-ear device may generate a first in-ear data object that is suitable for storing at the in-ear device (e.g., an in-ear data record) and a second in-ear data object that is suitable for transmission to an external system (e.g., a .json file). The in-ear device may further include the original audio signal, the speech portion of the audio signal, a sound signature of the speech portion of the audio signal, one or more tokens that were detected based on the speech portion, an identity of the speaker (e.g., the user or another speaker), biometric features measured during the capture of the audio signal (e.g., heartrate, heartrate flux, temperature, temperature flux, galvanic skin response, motion data, and/or motion data relating to the user's head specifically), a geolocation of the user at the time the audio was captured, a region of the user at the time of capture, a detected language, a time at which the audio signal was captured, and/or any other suitable metrics in the in-ear data object.

At 722, the in-ear device may store the in-ear data object according to the storage plan. In embodiments, the in-ear device can execute a storage plan in response to determining the storage plan. In response to a storage plan that includes a recommendation to store the in-ear data on a user device associated with the user, the in-ear device can provide the in-ear data object to the user device associated with the user. For example, the in-ear device may transmit the in-ear data object to the associated user device via a personal area network. In response to a storage plan that includes a recommendation to store and/or publish the in-ear data to an external system, the in-ear device can transmit an in-ear data object (e.g., a .json file) to the external system. For example, the in-ear device may transmit the in-ear data object to a data publishing system or a data analytics system via a communication network and/or via an intermediate device (e.g., a user device) that is paired to the in-ear device.

Figure 8:
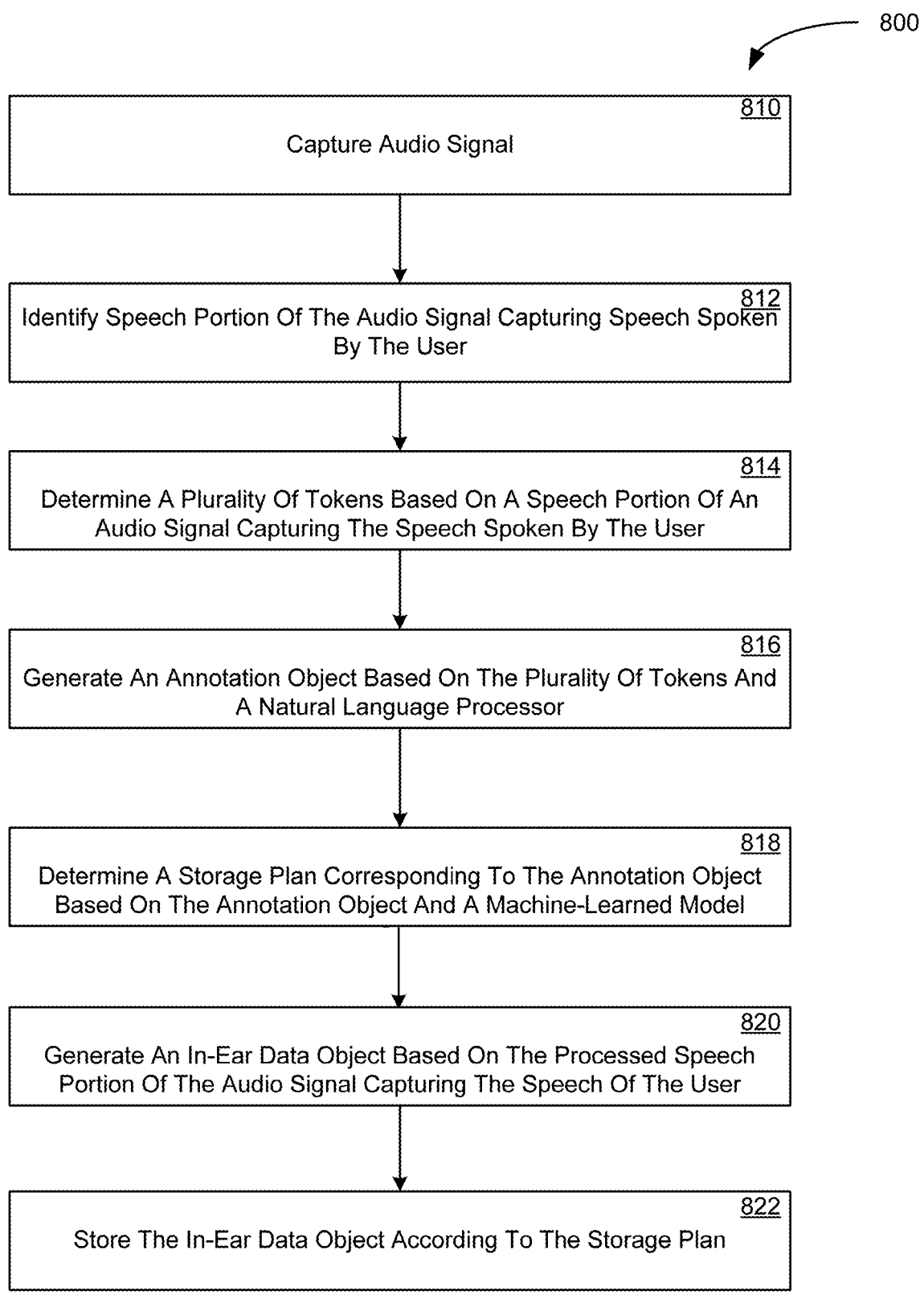
FIG. 8 is a flow chart illustrating a method for optimizing storage of speech data corresponding to an audio signal captured by an in-ear device of the speaker according to some embodiments of the present disclosure.

FIG. 8 illustrates an example set of operations of a method 800 for optimizing storage of speech data corresponding to an audio signal captured by an in-ear device of the speaker (i.e., the user of the in-ear device). In embodiments, the method 800 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 810, the in-ear device captures an audio signal. The in-ear device may capture an audio signal via one or more microphones embedded in the in-ear device. The microphone(s) may capture a sound wave and may output an audio signal corresponding to the sound wave. The audio signal may contain speech (e.g., a speech portion of the audio signal) and/or sounds (e.g., a sound portion of the audio signal) captured in the sound wave.

At 812, the in-ear device may identify a speech portion of the audio signal capturing speech spoken by the user. In embodiments, the in-ear device may implement one or more filters (e.g., high-pass filters, low pass filters, band-pass filters, and the like) to identify the speech portion of the audio signal. In embodiments, the in-ear device may transform audio frames of the audio signal to the frequency domain and may identify the speech portion of the audio signal based on the transformed audio frames. In embodiments, the in-ear device may determine whether the speaker is the user (i.e., the human wearing the in-ear device) or another individual. In these embodiments, the in-ear device may analyze composite audio signals received by the microphones or a directional microphone of the in-ear device to determine the direction from which the sound wave containing the speech was received. For example, if the sound wave is coming from inside the user (e.g., from the head/throat area of the user), the in-ear device may infer that the speaker is the user. In the case that the audio signal is coming from another direction, the in-ear device can infer that the speaker is someone other than the user. In embodiments, the in-ear device may be trained to recognize the speech of the user based on features of the user's voice, dialect, speech idiosyncrasies (e.g., user of prolonged "ums").

At 814, the in-ear device may determine a plurality of tokens based on the speech portion of the audio signal capturing the speech of the user. In embodiments, the in-ear device may analyze the speech portion of the audio signal capturing the speech spoken by the user to identify one or more tokens that correspond to the user's speech. The in-ear device may implement any suitable speech recognition process or processes when performing speech recognition on the speech portion of the audio signal. In embodiments, the in-ear device may detect a language of the speech portion. The language may be a known language of the user or may be detected based on a preliminary analysis of the speech portion of the audio signal and/or based on a setting of the user (e.g., a language setting of the user). In embodiments, the in-ear device may parse the speech portion of the audio signal to identify a sequence of phonemes. The in-ear device may determine potential utterances (e.g., words) based on the phonemes. In some implementations, the in-ear device generates various n-grams (unigrams, bi-grams, tri-grams, etc.) of sequential phonemes. The in-ear device may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the in-ear device may utilize the output tokens to generate a transcription of the speech portion of the audio signal based on a sequential processing of the speech portion of the audio signal. Additionally, or alternatively, the in-ear device may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the audio signal, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech in-ear device may implement other processing techniques on the tokens.

At 816, the in-ear device may generate an annotation object based on the plurality of tokens and a natural language processor. In embodiments, the in-ear device implements a natural language processor that is configured to perform natural language processing (NLP) on the recognized speech. In embodiments, the in-ear device analyzes the results speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled and the label may be assigned a confidence score indicating a degree of confidence in the label assigned to the token or sequence of tokens. In embodiments, each relationship may be labeled and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the annotation object. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The in-ear device may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

At 818, the in-ear device may determine a storage plan based on the annotation object. In embodiments, the in-ear device determines a storage plan for in-ear data relating to an event. A storage plan may define where the in-ear data relating to an event is to be stored. A storage plan may include one or more recommendations, where each recommendation defines a recommended storage location (or "location") at which the in-ear data is to be stored. In embodiments, in-ear data may be stored on the storage of the in-ear device, at a user device associated with the in-ear device, at a data publishing system associated with the in-ear device, a data analytics system, or other suitable systems (e.g., a dedicated cloud storage system). In an example, a determined storage plan relating to non-private in-ear data may cause the non-private data to be published to and stored at a data publishing system and/or analytics system. In another example, a determined storage plan relating to in-ear data corresponding to user instructions (e.g., an instruction to store a voice note) may cause the in-ear data to be stored on the in-ear device or at a user device associated with the user of the in-ear device.

In embodiments, the in-ear device employs machine learning to improve storage on the in-ear device. The in-ear device may be configured to determine a storage plan based on one or more features of the processed speech captured in an audio signal and a machine-learned decision model. In this way, the in-ear device can determine whether in-ear data can be discarded, stored on the in-ear device, stored on a user device associated with the user, and/or transmitted to an external system. In embodiments, the in-ear device may be configured to determine the storage plan based on the features of a speech portion of the audio signal. In embodiments, the machine-learned decision model may output one or more locations at which in-ear data corresponding to the audio signal can be stored in response to the inputted features. For each device or system on which in-ear data may be stored, the machine-model may output a respective confidence score corresponding to the location that indicates a degree of confidence that the model has in the location as an appropriate storage location for the in-ear data. The in-ear device may utilize the outputted confidence scores to determine the storage plan. For example, the in-ear device may include any location having a confidence score greater than a threshold (e.g., ≥0.9) in the storage plan. In some implementations, the in-ear device can determine that an instance of in-ear data should be discarded if none of the confidence scores exceed a threshold. For example, if the audio signal captures random speech that is inconsequential (e.g., a random person speaking in the background noise), the in-ear device may determine that the in-ear data relating to the event is to be discarded.

In embodiments, the in-ear device may input a feature vector containing features of a speech portion of an audio signal into a machine-learned decision model that is trained to optimize storage. The features may be the tokens that are recognized from a speech portion of an audio signal, one or more sound signatures that are determined based on the speech portion of the audio signal, and/or data from an annotation object derived from the speech portion of the audio signal. In embodiments, the in-ear device may further input additional features, such as one or more biometric features derived from sensor data received from the sensors of the in-ear device, a geolocation of the user, and/or a time of day, into the machine-learned decision model. In embodiments, the machine-learned decision model may be a model trained using data of any number of individual users. In these embodiments, the recommendations output by the decision model are based on the data collected from the collection of individual users. In embodiments, the machine-learned model may be personalized for the user, where the decision model is initially trained using training data obtained from any number of users and is reinforced using feedback from the user. In these embodiments, the machine-learned decision model may learn preferences of the user based on feedback received therefrom. In response to receiving the features of a speech portion of the audio signal and/or any other additional features, the machine-learned model may output confidence scores relating to each potential storage location. The in-ear device may utilize the outputted confidence scores to determine the storage plan. For example, the in-ear device may include any location having a confidence score greater than a threshold (e.g., ≥0.9) in the storage plan.

In embodiments, the machine-learned decision model may be trained to identify personal, sensitive, or otherwise private data. In these embodiments, the machine-learned decision model may be trained to bias recommendations of private data towards storage on the in-ear device and/or the user device associated with the user, as opposed to external systems that utilize the data for purposes other than merely remote storage.

At 820, the in-ear device may generate an in-ear data object based on the processed speech portion of the audio signal corresponding to the user. The in-ear device may include the annotation object in the in-ear data object, as well as any other relevant data, features, and/or metadata in the in-ear data object. As discussed, an in-ear data object may be a data record, a file, container, data structure, and the like. In embodiments, the in-ear device may generate multiple in-ear data objects, depending on the locations at which an in-ear data object may be stored. For instance, in the event a storage plan calls for an in-ear data object to be stored on the in-ear device and at an external system for publication, the in-ear device may generate a first in-ear data object that is suitable for storing at the in-ear device (e.g., an in-ear data record) and a second in-ear data object that is suitable for transmission to the external system (e.g., a .json file). The in-ear device may further include the original audio signal, the speech portion of the audio signal, a sound signature of the speech portion, one or more tokens that were detected based on the speech portion, an identity of the speaker (e.g., the user or another speaker), biometric features measured during the capture of the audio signal (e.g., heartrate, heartrate flux, temperature, temperature flux, galvanic skin response, motion data, and/or motion data relating to the user's head specifically), a geolocation of the user at the time the audio was captured, a region of the user at the time of capture, a detected language, a time at which the audio signal was captured, and/or any other suitable metrics.

At 822, the in-ear device may store the in-ear data object according to the storage plan. In embodiments, the in-ear device can execute a storage plan in response to determining the storage plan. In response to a storage plan that includes a recommendation to store the in-ear data on a user device associated with the user, the in-ear device can provide the in-ear data object to the user device associated with the user. For example, the in-ear device may transmit the in-ear data object to the associated user device via a personal area network. In response to a storage plan that includes a recommendation to store and/or publish the in-ear data to an external system, the in-ear device can transmit an in-ear data object (e.g., a .json file) to the external system. For example, the in-ear device may transmit the in-ear data object to a data publishing system or a data analytics system via a communication network and/or via an intermediate device (e.g., a user device) that is paired to the in-ear device.

Figure 9:
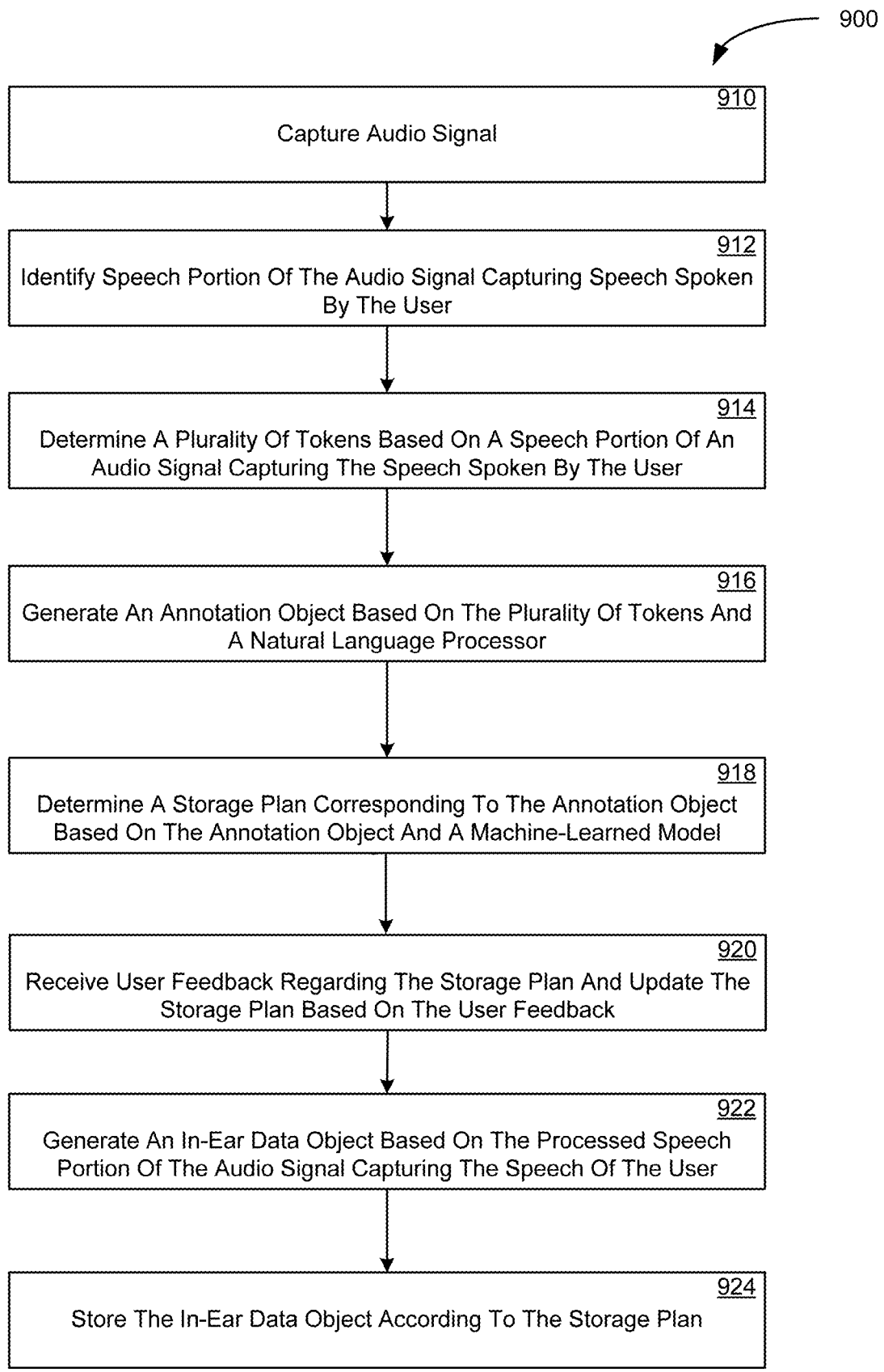
FIG. 9 is a flow chart illustrating a method for optimizing storage of speech data corresponding to an audio signal captured an in-ear device of the speaker using a feedback mechanism according to some embodiments of the present disclosure.

FIG. 9 illustrates an example set of operations of a method 900 for optimizing storage of speech data corresponding to an audio signal captured an in-ear device of the speaker (i.e., the user of the in-ear device) using machine-learning and a feedback mechanism. In embodiments, the method 900 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 910, the in-ear device captures an audio signal. The in-ear device may capture an audio signal via one or more microphones embedded in the in-ear device. The microphone(s) may capture a sound wave and may output an audio signal corresponding to the sound wave. The audio signal may contain speech (e.g., a speech portion of the audio signal) and/or sounds (e.g., a sound portion of the audio signal) captured in the sound wave.

At 912, the in-ear device may identify a speech portion of the audio signal capturing speech spoken by the user. In embodiments, the in-ear device may implement one or more filters (e.g., high-pass filters, low pass filters, band-pass filters, and the like) to identify the speech portion of the audio signal. In embodiments, the in-ear device may transform audio frames of the audio signal to the frequency domain and may identify the speech portion of the audio signal based on the transformed audio frames. In embodiments, the in-ear device may determine whether the speaker is the user (i.e., the human wearing the in-ear device) or another individual. In these embodiments, the in-ear device may analyze composite audio signals received by the microphones or a directional microphone of the in-ear device to determine the direction from which the sound wave containing the speech was received. For example, if the sound wave is coming from inside the user (e.g., from the head/throat area of the user), the in-ear device may infer that the speaker is the user. In the case that the audio signal is coming from another direction, the in-ear device can infer that the speaker is someone other than the user. In embodiments, the in-ear device may be trained to recognize the speech of the user based on features of the user's voice, dialect, speech idiosyncrasies (e.g., user of prolonged "ums").

At 914, the in-ear device may determine a plurality of tokens based on the speech portion of the audio signal capturing the speech of the user. In embodiments, the in-ear device may analyze the speech portion of the audio signal capturing the speech spoken by the user to identify one or more tokens that correspond to the user's speech. The in-ear device may implement any suitable speech recognition process or processes when performing speech recognition on the speech portion of the audio signal. In embodiments, the in-ear device may detect a language of the speech portion. The language may be a known language of the user or may be detected based on a preliminary analysis of the speech portion of the audio signal and/or based on a setting of the user (e.g., a language setting of the user). In embodiments, the in-ear device may parse the speech portion of the audio signal to identify a sequence of phonemes. The in-ear device may determine potential utterances (e.g., words) based on the phonemes. In some implementations, the in-ear device generates various n-grams (unigrams, bi-grams, tri-grams, etc.) of sequential phonemes. The in-ear device may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the in-ear device may utilize the output tokens to generate a transcription of the speech portion of the audio signal based on a sequential processing of the speech portion of the audio signal. Additionally, or alternatively, the in-ear device may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the audio signal, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech in-ear device may implement other processing techniques on the tokens.

At 916, the in-ear device may generate an annotation object based on the plurality of tokens and a natural language processor. In embodiments, the in-ear device implements a natural language processor that is configured to perform natural language processing (NLP) on the recognized speech. In embodiments, the in-ear device analyzes the results speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled, and the label may be assigned a confidence score indicating a degree of confidence in the label assigned to the token or sequence of tokens. In embodiments, each relationship may be labeled, and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the annotation object. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The in-ear device may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

At 918, the in-ear device may determine a storage plan based on the annotation object. In embodiments, the in-ear device determines a storage plan for in-ear data relating to an event. A storage plan may define where the in-ear data relating to an event is to be stored. A storage plan may include one or more recommendations, where each recommendation defines a recommended storage location (or "location") at which the in-ear data is to be stored. In embodiments, in-ear data may be stored on the storage of the in-ear device, at a user device associated with the in-ear device, at a data publishing system associated with the in-ear device, a data analytics system, or other suitable systems (e.g., a dedicated cloud storage system). In an example, a determined storage plan relating to non-private in-ear data may cause the non-private data to be published to and stored at a data publishing system and/or analytics system. In another example, a determined storage plan relating to in-ear data corresponding to user instructions (e.g., an instruction to store a voice note) may cause the in-ear data to be stored on the in-ear device or at a user device associated with the user of the in-ear device.

In embodiments, the in-ear device employs machine learning to improve storage on the in-ear device. The in-ear device may be configured to determine a storage plan based on one or more features of the processed speech captured in an audio signal and a machine-learned decision model. In this way, the in-ear device can determine whether in-ear data can be discarded, stored on the in-ear device, stored on a user device associated with the user, and/or transmitted to an external system. In embodiments, the in-ear device may be configured to determine the storage plan based on the features of a speech portion of the audio signal. In embodiments, the machine-learned decision model may output one or more locations at which in-ear data corresponding to the audio signal can be stored in response to the inputted features. For each device or system on which in-ear data may be stored, the machine-model may output a respective confidence score corresponding to the location that indicates a degree of confidence that the model has in the location as an appropriate storage location for the in-ear data. The in-ear device may utilize the outputted confidence scores to determine the storage plan. For example, the in-ear device may include any location having a confidence score greater than a threshold (e.g., ≥0.9) in the storage plan. In some implementations, the in-ear device can determine that an instance of in-ear data should be discarded if none of the confidence scores exceed a threshold. For example, if the audio signal captures random speech that is inconsequential (e.g., a random person speaking in the background noise), the in-ear device may determine that the in-ear data relating to the event is to be discarded.

In embodiments, the in-ear device may input a feature vector containing features of a speech portion of an audio signal into a machine-learned decision model that is trained to optimize storage. The features may be the tokens that are recognized from a speech portion of an audio signal, one or more sound signatures that are determined based on the speech portion of the audio signal, and/or data from an annotation object derived from the speech portion of the audio signal. In embodiments, the in-ear device may further input additional features, such as one or more biometric features derived from sensor data received from the sensors of the in-ear device, a geolocation of the user, and/or a time of day, into the machine-learned decision model. In embodiments, the machine-learned decision model may be a model trained using data of any number of individual users. In these embodiments, the recommendations output by the decision model are based on the data collected from the collection of individual users. In embodiments, the machine-learned model may be personalized for the user, where the decision model is initially trained using training data obtained from any number of users and is reinforced using feedback from the user. In these embodiments, the machine-learned decision model may learn preferences of the user based on feedback received therefrom. In response to receiving the features of a speech portion of the audio signal and/or any other additional features, the machine-learned model may output confidence scores relating to each potential storage location. The in-ear device may utilize the outputted confidence scores to determine the storage plan. For example, the in-ear device may include any location having a confidence score greater than a threshold (e.g., ≥0.9) in the storage plan.

In embodiments, the machine-learned decision model may be trained to identify personal, sensitive, or otherwise private data. In these embodiments, the machine-learned decision model may be trained to bias recommendations of private data towards storage on the in-ear device and/or the user device associated with the user, as opposed to external systems that utilize the data for purposes other than merely remote storage.

At 920, the in-ear device obtains user feedback regarding the storage plan and may update one or more of the recommendations based on the user feedback. In embodiments, the in-ear device may obtain user feedback regarding a storage plan. In embodiments, user feedback regarding a storage plan may be feedback from a user as to whether an instance of in-ear data can be shared to an external system. In embodiments, user feedback regarding a storage plan may be feedback from a user as to whether an instance of in-ear data should be stored on the in-ear device. In embodiments, user feedback regarding a storage plan may be feedback from a user as to whether an instance of in-ear data should be stored on an associated user device. The in-ear device can ask the user to confirm one or more recommendations in the storage plan. For example, if the confidence score corresponding to a potential recommended location is below a first threshold (e.g., <0.9), but above a second threshold (e.g., >0.75), the in-ear device can ask (e.g., output an audio signal containing a question) the user if the user wishes to store the instance of in-ear data at the potential recommended location. In another example, if the decision model determines that the user's speech likely contains personal, sensitive, or otherwise private information, the in-ear device can ask the user if the in-ear device has permission to share the in-ear data relating to the user's speech to an external system. The user can affirm or deny a recommendation. In the scenario where the user denies a recommendation, the in-ear device may remove the potential recommended location from the storage plan. In the scenario where the user affirms a recommendation, the in-ear device includes the potential recommended location in the storage plan as a confirmed recommended location. In embodiments, the user feedback provided by the user can be used to reinforce the machine-learned decision model implemented by the in-ear device to determine storage the storage plans.

At 922, the in-ear device may generate an in-ear data object based on the processed speech portion of the audio signal corresponding to the user. The in-ear device may include the annotation object in the in-ear data object, as well as any other relevant data, features, and/or metadata in the in-ear data object. As discussed, an in-ear data object may be a data record, a file, container, data structure, and the like. In embodiments, the in-ear device may generate multiple in-ear data objects, depending on the locations at which an in-ear data object may be stored. For instance, in the event a storage plan calls for an in-ear data object to be stored on the in-ear device and at an external system for publication, the in-ear device may generate a first in-ear data object that is suitable for storing at the in-ear device (e.g., an in-ear data record) and a second in-ear data object that is suitable for transmission to the external system (e.g., a .json file). The in-ear device may further include the original audio signal, the speech portion of the audio signal, a sound signature of the speech portion, one or more tokens that were detected based on the speech portion, an identity of the speaker (e.g., the user or another speaker), biometric features measured during the capture of the audio signal (e.g., heartrate, heartrate flux, temperature, temperature flux, galvanic skin response, motion data, and/or motion data relating to the user's head specifically), a geolocation of the user at the time the audio was captured, a region of the user at the time of capture, a detected language, a time at which the audio signal was captured, and/or any other suitable metrics.

At 924, the in-ear device may store the in-ear data object according to the storage plan. In embodiments, the in-ear device can execute a storage plan in response to determining the storage plan. In response to a storage plan that includes a recommendation to store the in-ear data on a user device associated with the user, the in-ear device can provide the in-ear data object to the user device associated with the user. For example, the in-ear device may transmit the in-ear data object to the associated user device via a personal area network. In response to a storage plan that includes a recommendation to store and/or publish the in-ear data to an external system, the in-ear device can transmit an in-ear data object (e.g., a .json file) to the external system. For example, the in-ear device may transmit the in-ear data object to a data publishing system or a data analytics system via a communication network and/or via an intermediate device (e.g., a user device) that is paired to the in-ear device.

Figure 10:
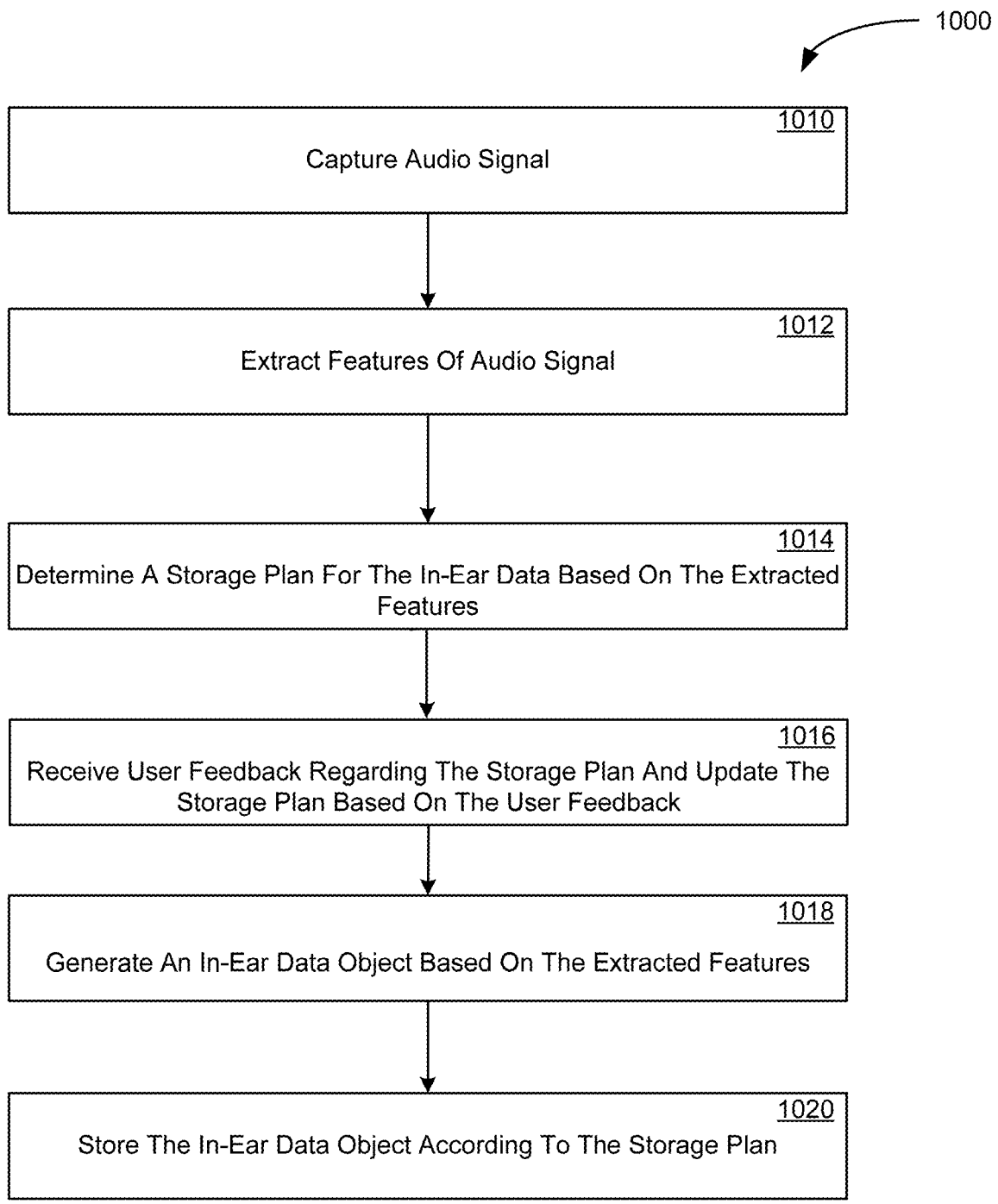
FIG. 10 is a flow chart illustrating a method for optimizing storage of in-ear data corresponding to an audio signal captured by an in-ear device using machine-learning and a feedback mechanism according to some embodiments of the present disclosure.

FIG. 10 illustrates an example set of operations of a method 1000 for optimizing storage of in-ear data corresponding to an audio signal captured by an in-ear device using machine-learning and a feedback mechanism. In embodiments, the method 1000 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 1010, the in-ear device captures an audio signal. The in-ear device may capture an audio signal via one or more microphones embedded in the in-ear device. The audio signal may include human speech (e.g., a speech portion of the audio signal) and/or sounds (e.g., a sound portion of the audio signal).

At 1012, the in-ear device may extract one or more features of the audio signal. In embodiments, extracting one or more features may include identifying or otherwise isolating a sound portion of the audio signal and/or a speech portion of the audio signal. In embodiments, the in-ear device may implement one or more filters (e.g., high-pass filters, low pass filters, band-pass filters, and the like) to identify the speech and sound portions of the audio signal. In embodiments, the in-ear device may transform audio frames of the audio signal to the frequency domain and may identify the speech and/or sound portions of the audio signal based on the transformed audio frames.

In embodiments, the in-ear device may determine features of the sound portion of the sound signal. In embodiments, the in-ear device may determine one or more of the following features of a sound portion of the audio signal: a sound signature of the sound portion of the audio signal, a digital fingerprint of the sound portion of the audio signal, a volume of the sound portion of the audio signal, a frequency of the sound portion of the audio signal, classifications of sounds captured in the sound portion of the audio signal, and the like.

In embodiments, the in-ear device may determine features of the speech portion of the audio signal. In embodiments, the in-ear device may determine one or more of the following features of a speech portion of the audio signal: one or more tokens recognized in the speech portion of the audio signal, one or more annotation objects indicating a meaning or understanding of the speech portion of the audio signal, a sound signature of the speech portion of the audio signal, identities of speakers heard in the speech portion of the audio signal, a volume of the speech portion of the audio signal, and the like. In embodiments, the in-ear device may utilize one or more speech recognition techniques and/or natural language processing techniques to determine the features of the speech portion of the audio signal.

At 1014, the in-ear device may determine a storage plan for the in-ear data based on the extracted features of the audio signal. In embodiments, the in-ear device determines a storage plan for in-ear data relating to an event. A storage plan may define where the in-ear data relating to an event is to be stored. A storage plan may include one or more recommendations, where each recommendation defines a recommended storage location (or "location") at which the in-ear data is to be stored. In embodiments, in-ear data may be stored on the storage of the in-ear device, at a user device associated with the in-ear device, at a data publishing system associated with the in-ear device, a data analytics system, or other suitable systems (e.g., a dedicated cloud storage system). In an example, a determined storage plan relating to non-private in-ear data may cause the non-private data to be published to and stored at a data publishing system and/or analytics system. In another example, a determined storage plan relating to in-ear data corresponding to user instructions (e.g., an instruction to store a voice note) may cause the in-ear data to be stored on the in-ear device or at a user device associated with the user of the in-ear device.

In embodiments, the in-ear device employs machine learning to improve storage on the in-ear device. The in-ear device may be configured to determine a storage plan based on one or more features of the processed audio signal and a machine-learned decision model. In this way, the in-ear device can determine whether in-ear data can be discarded, stored on the in-ear device, stored on a user device associated with the user, and/or transmitted to an external system. In embodiments, the in-ear device may be configured to determine the storage plan based on the features extracted from the audio signal. For example, the in-ear device may determine the storage plan based on features extracted from a sound portion of an audio signal and/or features extracted from a speech portion of the audio signal. In embodiments, the machine-learned decision model may output one or more locations at which in-ear data corresponding to the audio signal can be stored in response to the inputted features. For each device or system on which in-ear data may be stored, the machine-model may output a respective confidence score corresponding to the location that indicates a degree of confidence that the model has in the location as an appropriate storage location for the in-ear data. The in-ear device may utilize the outputted confidence scores to determine the storage plan. For example, the in-ear device may include any location having a confidence score greater than a threshold (e.g., ≥0.9) in the storage plan. In some implementations, the in-ear device can determine that an instance of in-ear data should be discarded if none of the confidence scores exceed a threshold. For example, if the audio signal captures random sounds or speech that is inconsequential (e.g., a dog barking in the background noise), the in-ear device may determine that the in-ear data relating to the event is to be discarded.

In embodiments, the in-ear device may input a feature vector containing features extracted from the audio signal into a machine-learned decision model that is trained to optimize storage. In the case of in-ear data relating to speech, the in-ear data may generate a feature vector that includes the tokens that are recognized from a speech portion of an audio signal, one or more sound signatures that are determined based on the speech portion of the audio signal, and/or data from an annotation object derived from the speech portion of the audio signal. In the case of in-ear data relating to sounds captured in the audio signal, the in-ear data may generate a feature vector that includes a sound signature of the sound portion of the audio signal, a digital fingerprint of the sound portion of the audio signal, a volume of the sound portion of the audio signal, a frequency of the sound portion of the audio signal, classifications of sounds captured in the sound portion of the audio signal, and the like. In embodiments, the in-ear device may further input additional features in the feature vector, such as one or more biometric features derived from sensor data received from the sensors of the in-ear device, a geolocation of the user, and/or a time of day, into the machine-learned decision model. In embodiments, the machine-learned decision model may be a model trained using data of any number of individual users. In these embodiments, the recommendations output by the decision model are based on the data collected from the collection of individual users. In embodiments, the machine-learned model may be personalized for the user, where the decision model is initially trained using training data obtained from any number of users and is reinforced using feedback from the user. In these embodiments, the machine-learned decision model may learn preferences of the user based on feedback received therefrom. In response to receiving the features of a speech portion of the audio signal and/or any other additional features, the machine-learned model may output confidence scores relating to each potential storage location. The in-ear device may utilize the outputted confidence scores to determine the storage plan. For example, the in-ear device may include any location having a confidence score greater than a threshold (e.g., ≥0.9) in the storage plan.

In embodiments, the machine-learned decision model may be trained to identify personal, sensitive, or otherwise private data. In these embodiments, the machine-learned decision model may be trained to bias recommendations of private data towards storage on the in-ear device and/or the user device associated with the user, as opposed to external systems that utilize the data for purposes other than merely remote storage.

At 1016, the in-ear device obtains user feedback regarding the storage plan and may update one or more of the recommendations based on the user feedback. In embodiments, the in-ear device may obtain user feedback regarding a storage plan. In embodiments, user feedback regarding a storage plan may be feedback from a user as to whether an instance of in-ear data can be shared to an external system. In embodiments, user feedback regarding a storage plan may be feedback from a user as to whether an instance of in-ear data should be stored on the in-ear device. In embodiments, user feedback regarding a storage plan may be feedback from a user as to whether an instance of in-ear data should be stored on an associated user device. The in-ear device can ask the user to confirm one or more recommendations in the storage plan. For example, if the confidence score corresponding to a potential recommended location is below a first threshold (e.g., <0.9), but above a second threshold (e.g., >0.75), the in-ear device can ask (e.g., output an audio signal containing a question) the user if the user wishes to store the instance of in-ear data at the potential recommended location. In another example, if the decision model determines that the user's speech likely contains personal, sensitive, or otherwise private information, the in-ear device can ask the user if the in-ear device has permission to share the in-ear data relating to the user's speech to an external system. The user can affirm or deny a recommendation. In the scenario where the user denies a recommendation, the in-ear device may remove the potential recommended location from the storage plan. In the scenario where the user affirms a recommendation, the in-ear device includes the potential recommended location in the storage plan as a confirmed recommended location. In embodiments, the user feedback provided by the user can be used to reinforce the machine-learned decision model implemented by the in-ear device to determine storage the storage plans.

At 1018, the in-ear device may generate an in-ear data object based on the in-ear data corresponding to of the audio signal. The term in-ear data object may refer to database records (e.g., database records), files (e.g., .json files), data structures, and the like. In embodiments, the in-ear device may generate multiple in-ear data objects, depending on the locations at which an in-ear data object may be stored. For instance, in the event a storage plan calls for an in-ear data object to be stored on the in-ear device and at an external system for publication, the in-ear device may generate a first in-ear data object that is suitable for storing at the in-ear device (e.g., an in-ear data record) and a second in-ear data object that is suitable for transmission to the external system (e.g., a .json file). In generating an in-ear data object, in-ear device may include the one or more features of the audio signal and/or any other relevant data in the in-ear data object. In the case of a sound portion of an audio signal, the in-ear device may include features such as the original audio signal, a sound portion of the audio signal, a sound signature of the sound portion of the audio signal, a digital fingerprint of the sound portion of the audio signal, a volume of the sound portion of the audio signal, a frequency of the sound portion of the audio signal, classifications of sounds captured in the sound portion of the audio signal, and/or any other suitable sound-related data in the in-ear data object. In the case of a speech portion of the audio signal, the in-ear device may include one or more tokens recognized in the speech portion of the audio signal, one or more annotation objects indicating a meaning or understanding of the speech portion of the audio signal, a sound signature of the speech portion of the audio signal, identities of speakers heard in the speech portion of the audio signal, a volume of the speech portion of the audio signal, and/or any other suitable speech related data in the in-ear data object. The in-ear device may further include biometric features and/or metadata in the in-ear data object. For example, the in-ear device may include a heartrate of the user, a heartrate flux of the user, a body temperature of the user, a temperature flux of the user, a galvanic skin response of the user, motion data corresponding to the user, and/or motion data relating to the user's head, a geolocation of the user at a time the audio was captured, a region of the user at the time of capture, a time at which the audio signal was captured, and/or any other suitable metrics in the in-ear data object.

At 1020, the in-ear device may store the in-ear data object according to the storage plan. In embodiments, the in-ear device can execute a storage plan in response to determining the storage plan. In response to a storage plan that includes a recommendation to store the in-ear data on a user device associated with the user, the in-ear device can provide the in-ear data object to the user device associated with the user. For example, the in-ear device may transmit the in-ear data object to the associated user device via a personal area network. In response to a storage plan that includes a recommendation to store and/or publish the in-ear data to an external system, the in-ear device can transmit an in-ear data object (e.g., a .json file) to the external system. For example, the in-ear device may transmit the in-ear data object to a data publishing system or a data analytics system via a communication network and/or via an intermediate device (e.g., a user device) that is paired to the in-ear device.

Figure 11:
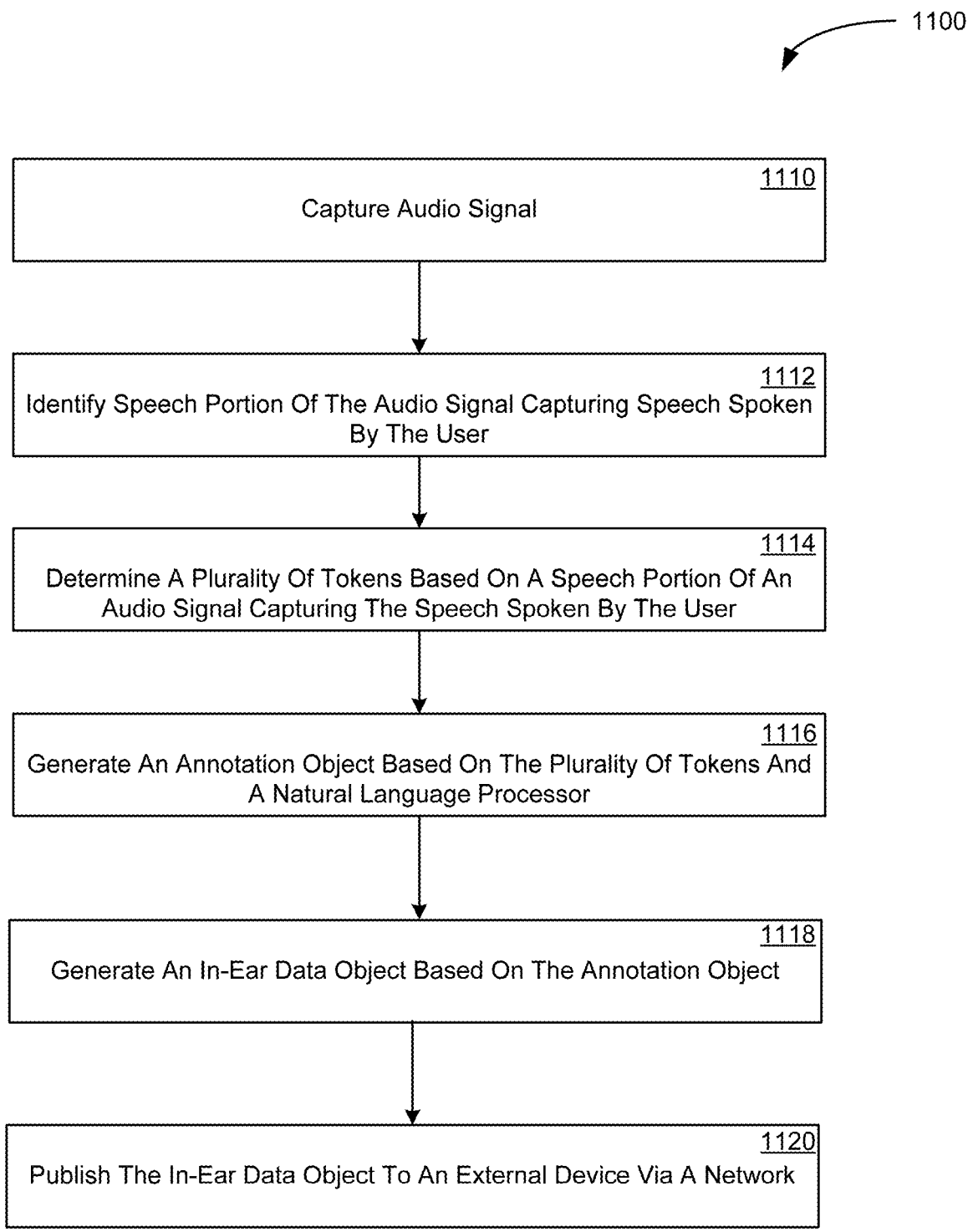
FIG. 11 is a flow chart illustrating a method for publishing in-ear data corresponding to speech data corresponding to an audio signal captured an in-ear device of the speaker to an external system according to some embodiments of the present disclosure.

FIG. 11 illustrates an example set of operations of a method 1100 for publishing in-ear data corresponding to speech data corresponding to an audio signal captured an in-ear device of the speaker (i.e., the user of the in-ear device) to an external system. In embodiments, the method 11000 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 1110, the in-ear device captures an audio signal. The in-ear device may capture an audio signal via one or more microphones embedded in the in-ear device. The microphone(s) may capture a sound wave and may output an audio signal corresponding to the sound wave. The audio signal may contain speech (e.g., a speech portion of the audio signal) and/or sounds (e.g., a sound portion of the audio signal) captured in the sound wave.

At 1112, the in-ear device may identify a speech portion of the audio signal capturing speech spoken by the user. In embodiments, the in-ear device may implement one or more filters (e.g., high-pass filters, low pass filters, band-pass filters, and the like) to identify the speech portion of the audio signal. In embodiments, the in-ear device may transform audio frames of the audio signal to the frequency domain and may identify the speech portion of the audio signal based on the transformed audio frames. In embodiments, the in-ear device may determine whether the speaker is the user (i.e., the human wearing the in-ear device) or another individual. In these embodiments, the in-ear device may analyze composite audio signals received by the microphones or a directional microphone of the in-ear device to determine the direction from which the sound wave containing the speech was received. For example, if the sound wave is coming from inside the user (e.g., from the head/throat area of the user), the in-ear device may infer that the speaker is the user. In the case that the audio signal is coming from another direction, the in-ear device can infer that the speaker is someone other than the user. In embodiments, the in-ear device may be trained to recognize the speech of the user based on features of the user's voice, dialect, speech idiosyncrasies (e.g., user of prolonged "ums").

At 1114, the in-ear device may determine a plurality of tokens based on the speech portion of the audio signal capturing the speech of the user. In embodiments, the in-ear device may analyze the speech portion of the audio signal capturing the speech spoken by the user to identify one or more tokens that correspond to the user's speech. The in-ear device may implement any suitable speech recognition process or processes when performing speech recognition on the speech portion of the audio signal. In embodiments, the in-ear device may detect a language of the speech portion. The language may be a known language of the user or may be detected based on a preliminary analysis of the speech portion of the audio signal and/or based on a setting of the user (e.g., a language setting of the user). In embodiments, the in-ear device may parse the speech portion of the audio signal to identify a sequence of phonemes. The in-ear device may determine potential utterances (e.g., words) based on the phonemes. In some implementations, the in-ear device generates various n-grams (unigrams, bi-grams, tri-grams, etc.) of sequential phonemes. The in-ear device may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the in-ear device may utilize the output tokens to generate a transcription of the speech portion of the audio signal based on a sequential processing of the speech portion of the audio signal. Additionally, or alternatively, the in-ear device may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the audio signal, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech in-ear device may implement other processing techniques on the tokens.

At 1116, the in-ear device may generate an annotation object based on the plurality of tokens and a natural language processor. In embodiments, the in-ear device implements a natural language processor that is configured to perform natural language processing (NLP) on the recognized speech. In embodiments, the in-ear device analyzes the results speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled and the label may be assigned a confidence score indicating a degree of confidence in the label assigned to the token or sequence of tokens. In embodiments, each relationship may be labeled and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the annotation object. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The in-ear device may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens, and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

At 1118, the in-ear device generates an in-ear data object based on the annotation object. The in-ear device may generate an in-ear data object based on the processed speech portion of the audio signal corresponding to the user. The in-ear device may include the annotation object in the in-ear data object, as well as any other relevant data, features, and/or metadata in the in-ear data object. As discussed, an in-ear data object may be a data record, a file, container, data structure, and the like. The in-ear device may include the original audio signal, the speech portion of the audio signal, a sound signature of the speech portion, one or more tokens that were detected based on the speech portion, an identity of the speaker (e.g., the user or another speaker), biometric features measured during the capture of the audio signal (e.g., heartrate, heartrate flux, temperature, temperature flux, galvanic skin response, motion data, and/or motion data relating to the user's head specifically), a geolocation of the user at the time the audio was captured, a region of the user at the time of capture, a detected language, a time at which the audio signal was captured, and/or any other suitable metrics in the in-ear data object.

At 1120, the in-ear device may publish the in-ear data object to an external system. In embodiments, the in-ear device may publish in-ear data objects, such that external systems that are granted access may pull in-ear data objects from the in-ear device. For example, the in-ear device may maintain a white list of systems that are granted access to an in-ear data from the in-ear device. The white-listed systems may include a data publishing system, an analytics system, a social network system, an entertainment system, an advertising system, and the like. A user and/or a provider of the in-ear device (e.g., a manufacturer or service provider) may provide the systems to be included in the white-list. In embodiments, the in-ear device may receive a request to access the in-ear data from an external system. In response to the request, the in-ear device may verify that the system is on the white list. If the system is white-listed, the in-ear device may provide in-ear data to the white-listed system. In embodiments, the in-ear device may establish a communication session with the external system, thereby allowing the external system to make multiple data requests. In embodiments, the in-ear device may publish the in-ear data to a white-listed external system. In embodiments, the in-ear device may implement an API that allows the white-listed external systems to query a database residing on the in-ear device for specific types of data. In this way, the in-ear device can make in-ear data relating to sounds and/or speech captured by the in-ear device available to external systems. For example, an external system may request in-ear data objects relating to all sounds captured by the in-ear device over a particular time frame. In another example, an external system may request in-ear data objects relating to all speech records captured by the in-ear device over a particular time frame. In embodiments, the in-ear device may further publish in-ear data that has been stored at a user device associated with the user. In these embodiments, the in-ear device may maintain an index of in-ear data objects that identifies whether a particular record is stored on the in-ear device and/or a user device associated with the user of the in-ear device. In the case that one or more in-ear data objects are stored on the user device, the in-ear device retrieves the in-ear data objects from the user device and provides the in-ear data objects from the user device. The in-ear device may implement any suitable type of API. For example, the in-ear device may implement any one of Representational State Transfer (REST), Simple Object Access Protocol (SOAP), Remote Procedure Call (RPC), and the like.

Figure 12:
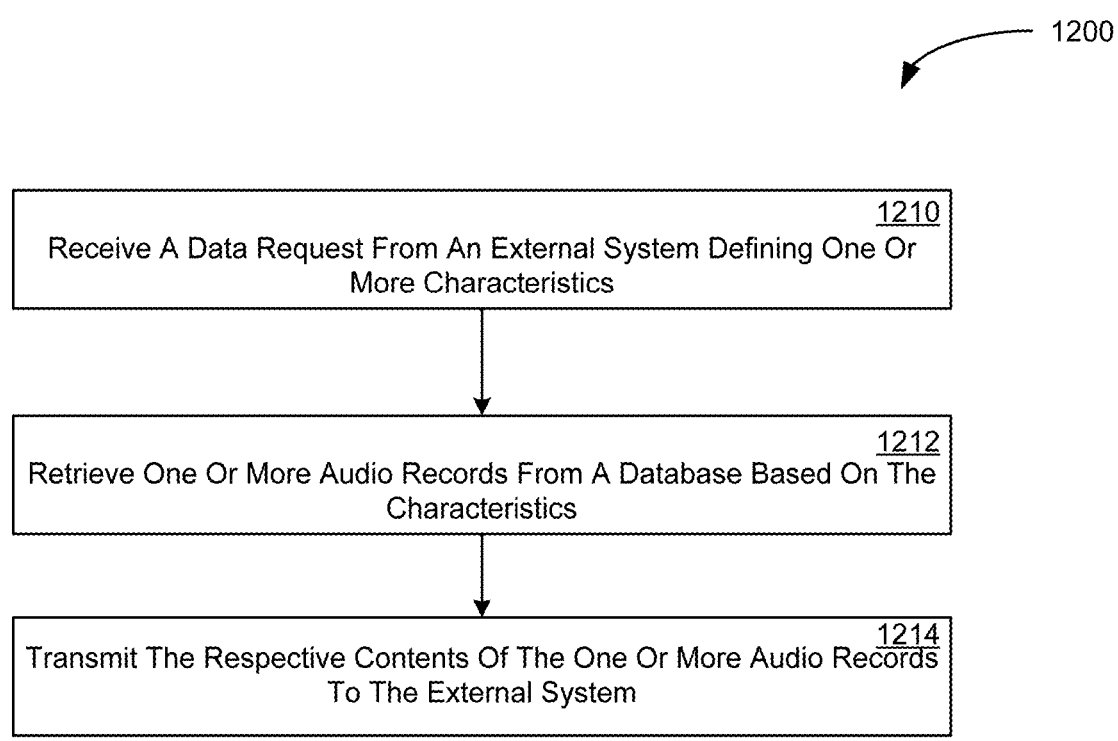
FIG. 12 illustrates a set of operations of a method for responding to a data request from an external system according to some embodiments of the present disclosure.

FIG. 12 illustrates a set of operations of a method 1200 for responding to a data request from an external system. In embodiments, the method 1200 is executed by a processing system of a data publishing system of FIGS. 3 and 4A. The method 1200 may be performed by other suitable systems without departing from the scope of the disclosure. In embodiments, the method 1200 may be modified to execute on an in-ear device, such that the in-ear device responds to requests from white-listed external systems.

At 1210, the data publishing system receives a data request from an external system. In embodiments, the request may be received via an API implemented by the data publishing system. The request may define one or more characteristics of the requested data. The characteristics may be characteristics of processed audio signals captured by a collection of in-ear devices of a respective collection of users. For example, the request may request records corresponding to audio signals containing a particular word, group of words, type of sound, sound signature, or the like. Additionally, or alternatively, the characteristics may be biometric features of the respective collection of users at a time when the respective audio signals were captured. For example, the request may request data records having biometric features falling within a range of user heartrates and/or a range of user body temperatures, or having a particular type of motion signature (e.g., nodding or head-shaking). Additionally, or alternatively, the characteristics may be metadata values. For example, the request may request data records corresponding to audio signals that were captured in particular geographic locations (e.g., geo-locations, regions, and/or countries) and/or captured at particular times of the day.

The request may be received from any suitable system. For example, the request may be received from a data analytics system, an entertainment system, an advertising system, a social networking system and the like. An external system may request data records from the publishing system so as to improve the operation of the external system. For example, an entertainment system may request records relating to media content that is being consumed by users that also indicate the biometric features of those users when consuming the media content. The entertainment system may utilize these records to train models that recommend media contents to users based on their biometric features. In another example, an advertising system or analytics system may request speech records of users in a particular geographic region. In this example, the advertising system or analytics system may utilize these speech records to determine trending words or topics in the region based on what people are talking about in that region. In another example, an analytics system may request sound records corresponding to safety sounds (e.g., earthquake sirens, tornado sirens, police sirens, and the like). In this example, the analytics system may train models to learn how to identify when users are ignoring safety sounds and when to alert those users that are ignoring the safety sounds.

At 1212, the data publishing system retrieves one or more records from a database based on the request. The database may store audio records. Each audio record may include data corresponding to a respective processed audio signal. The audio records may include store sound records corresponding to sound portions of audio signals and/or speech records corresponding to speech portions of audio signals. In embodiments, a sound record may store a sound portion of an audio signal, one or more features of the sound portion of an audio signal (e.g., a sound signature of the sound portion, a digital fingerprint of the sound portion, a classification of a sound recognized in the sound portion, a volume of the sound portion, and the like), biometric features of a user at a time the audio signal was captured (e.g., a heartrate of the user at the time the audio signal was captured, a temperature of the user at the time the audio signal was captured, motion data corresponding to the user at the time the audio signal was captured, a galvanic skin response of the user at the time the audio signal was captured, and the like), and metadata corresponding to the captured audio signal (e.g., a geographic location at which the audio signal was captured, a time of day at which the audio signal was captured, and the like). In embodiments, a speech record may store a speech portion of an audio signal, one or more features of the speech portion (e.g., a sound signature of the speech portion, a digital fingerprint of the speech portion, tokens corresponding to utterances that were recognized in the speech portion, a volume of the speech portion, and the like), biometric features of a user at a time the audio signal was captured (e.g., a heartrate of the user at the time the audio signal was captured, a temperature of the user at the time the audio signal was captured, motion data corresponding to the user at the time the audio signal was captured, a galvanic skin response of the user at the time the audio signal was captured, and the like), and metadata corresponding to the captured audio signal (e.g., a geographic location at which the audio signal was captured, a time of day at which the audio signal was captured, and the like).

The database may include one or more indexes that index the audio records based on one or more types of characteristics. For example, the audio records may be indexed by tokens, sound classifications, topics, sound signatures, biometrics features, geographic locations, and/or time. In embodiments, the data publishing system may query one or more indexes with the characteristics defined in the request. The index may output record identifiers of any audio records containing data that matches the characteristics defined in the request. The data publishing module may retrieve the requested audio records based on the outputted record identifiers.

At 1214, the data publishing system transmits the requested audio records to the external system. The data publishing system may transmit the audio records identified from the index. In embodiments, the data publishing system may transmit the audio records to the external system via an API implemented by the data publishing system.

The methods of FIGS. 6-12 are provided for example and not intended to limit the scope of the disclosure. Furthermore, the ordering of the steps is not mandatory and some steps may be performed coextensively or out of the shown order.

The contents of the application may be combined to achieve methods and systems having characteristics described herein. A system is disclosed herein having an interface to in-ear data storage that allows in-ear data collected from incoming sound to the ear canal to be published to an external system. A system is disclosed herein having an interface to in-ear data storage that allows in-ear data collected from incoming sound to the ear canal to be published to an external system and having a machine learning system to optimize storage of natural-language processed incoming sound in the ear canal. A system is disclosed herein having an interface to in-ear data storage that allows in-ear data collected from incoming sound to the ear canal to be published to an external system and having a machine learning system that optimizes use of in-ear data storage based on collection of incoming sound data and a feedback function regarding use of the data stored on the in-ear storage. A system is disclosed herein having an interface to in-ear data storage that allows in-ear data collected from incoming sound to the ear canal to be published to an external system and having an interface to in-ear data storage that allows in-ear data collected from spoken sound detected in the ear canal of a speaker to be published to an external system. A system is disclosed herein having an interface to in-ear data storage that allows in-ear data collected from incoming sound to the ear canal to be published to an external system and having a machine learning system to optimize storage of natural-language processed spoken sound collected in the ear canal of a speaker. A system is disclosed herein having an interface to in-ear data storage that allows in-ear data collected from incoming sound to the ear canal to be published to an external system and having a machine learning system to optimize use of in-ear data storage based on collection of spoken sound data in the ear canal of a speaker and a feedback function regarding use of the data stored on the in-ear storage. A system is disclosed herein having an interface to in-ear data storage that allows in-ear data collected from incoming sound to the ear canal to be published to an external system and having a database of natural-language processed words that are collected in the ear canal of an individual. A system is disclosed herein having an interface to in-ear data storage that allows in-ear data collected from incoming sound to the ear canal to be published to an external system and having a database of natural-language processed words that are collected in the ear canals of a population of individuals. A system is disclosed herein having an interface to in-ear data storage that allows in-ear data collected from incoming sound to the ear canal to be published to an external system and having an application programming interface for a database of sound information collected from the ear canals of a population of individuals by which an external system may query the database and obtain at least one of sound signature information and spoken word information. A system is disclosed herein having an interface to in-ear data storage that allows in-ear data collected from incoming sound to the ear canal to be published to an external system and having a publication system for a database of sound information collected from the ear canals of a population of individuals by which that database publishes at least one of sound signature information and spoken word information to an external system. A system is disclosed herein having an interface to in-ear data storage that allows in-ear data collected from incoming sound to the ear canal to be published to an external system and having a system that feeds a machine learning system with biometric data that is collected from the interface of a hearing device and the ear canal. A system is disclosed herein having an interface to in-ear data storage that allows in-ear data collected from incoming sound to the ear canal to be published to an external system and having a system that uses a database of at least one of sound signature information and spoken word information collected from the ear canals of a population of individuals to feed a machine learning system to optimize an entertainment system. A system is disclosed herein having an interface to in-ear data storage that allows in-ear data collected from incoming sound to the ear canal to be published to an external system and having a system that uses a database of at least one of sound signature information and spoken word information collected from the ear canals of a population of individuals to feed a machine learning system to optimize a social network. A system is disclosed herein having an interface to in-ear data storage that allows in-ear data collected from incoming sound to the ear canal to be published to an external system and having a system that uses a database of at least one of sound signature information and spoken word information collected from the ear canals of a population of individuals to feed a machine learning system to optimize a location-based service. A system is disclosed herein having an interface to in-ear data storage that allows in-ear data collected from incoming sound to the ear canal to be published to an external system and having a system that uses a database of at least one of sound signature information and spoken word information collected from the ear canals of a population of individuals to feed a machine learning system to optimize an emergency response system. A system is disclosed herein having an interface to in-ear data storage that allows in-ear data collected from incoming sound to the ear canal to be published to an external system and having a system for personalizing audio content management based on data collected at the ear of a user. A system is disclosed herein having an interface to in-ear data storage that allows in-ear data collected from incoming sound to the ear canal to be published to an external system and having a system for collecting acoustic data. A system is disclosed herein having an interface to in-ear data storage that allows in-ear data collected from incoming sound to the ear canal to be published to an external system and having acoustic detection and sound management. A system is disclosed herein having an interface to in-ear data storage that allows in-ear data collected from incoming sound to the ear canal to be published to an external system and having a system for sound signature detection. A system is disclosed herein having an interface to in-ear data storage that allows in-ear data collected from incoming sound to the ear canal to be published to an external system and having a system for voice authentication. A system is disclosed herein having an interface to in-ear data storage that allows in-ear data collected from incoming sound to the ear canal to be published to an external system and having a system for ear-based physiological and biometric monitoring. A system is disclosed herein having an interface to in-ear data storage that allows in-ear data collected from incoming sound to the ear canal to be published to an external system and having a system for analyzing and validating the quality of a sound sealing mechanism between an ear canal of a user and the ambient environment. A system is disclosed herein having an interface to in-ear data storage that allows in-ear data collected from incoming sound to the ear canal to be published to an external system and having a system for enhancing a directional parameter of sound experienced by a user of a hearing device. A system is disclosed herein having an interface to in-ear data storage that allows in-ear data collected from incoming sound to the ear canal to be published to an external system and having a system for monitoring and protection of the ear of a user based on detection of characteristics of sound experience by the user. A system is disclosed herein having an interface to in-ear data storage that allows in-ear data collected from incoming sound to the ear canal to be published to an external system and having a system for signal separation and mixing of sounds arriving at the ear of a user. A system is disclosed herein having an interface to in-ear data storage that allows in-ear data collected from incoming sound to the ear canal to be published to an external system and having a system for management of sound pressure levels based on characteristics of sound arriving at the ear of a user. A system is disclosed herein having an interface to in-ear data storage that allows in-ear data collected from incoming sound to the ear canal to be published to an external system and having a system for understanding and managing a situational state of a user based on sound arriving at the ear of the user. A system is disclosed herein having an interface to in-ear data storage that allows in-ear data collected from incoming sound to the ear canal to be published to an external system and having a secure data storage cache for temporarily storing the sound signal arriving at the ear of a user of a hearing device.

The contents of the application may be combined to achieve a system as described herein. A system is disclosed herein having a machine learning system to optimize storage of natural-language processed incoming sound in the ear canal. A system is disclosed herein having a machine learning system to optimize storage of natural-language processed incoming sound in the ear canal and having a machine learning system that optimizes use of in-ear data storage based on collection of incoming sound data and a feedback function regarding use of the data stored on the in-ear storage. A system is disclosed herein having a machine learning system to optimize storage of natural-language processed incoming sound in the ear canal and having an interface to in-ear data storage that allows in-ear data collected from spoken sound detected in the ear canal of a speaker to be published to an external system. A system is disclosed herein having a machine learning system to optimize storage of natural-language processed incoming sound in the ear canal and having a machine learning system to optimize storage of natural-language processed spoken sound collected in the ear canal of a speaker. A system is disclosed herein having a machine learning system to optimize storage of natural-language processed incoming sound in the ear canal and having a machine learning system to optimize use of in-ear data storage based on collection of spoken sound data in the ear canal of a speaker and a feedback function regarding use of the data stored on the in-ear storage. A system is disclosed herein having a machine learning system to optimize storage of natural-language processed incoming sound in the ear canal and having a database of natural-language processed words that are collected in the ear canal of an individual. A system is disclosed herein having a machine learning system to optimize storage of natural-language processed incoming sound in the ear canal and having a database of natural-language processed words that are collected in the ear canals of a population of individuals. A system is disclosed herein having a machine learning system to optimize storage of natural-language processed incoming sound in the ear canal and having an application programming interface for a database of sound information collected from the ear canals of a population of individuals by which an external system may query the database and obtain at least one of sound signature information and spoken word information. A system is disclosed herein having a machine learning system to optimize storage of natural-language processed incoming sound in the ear canal and having a publication system for a database of sound information collected from the ear canals of a population of individuals by which that database publishes at least one of sound signature information and spoken word information to an external system. A system is disclosed herein having a machine learning system to optimize storage of natural-language processed incoming sound in the ear canal and having a system that feeds a machine learning system with biometric data that is collected from the interface of a hearing device and the ear canal. A system is disclosed herein having a machine learning system to optimize storage of natural-language processed incoming sound in the ear canal and having a system that uses a database of at least one of sound signature information and spoken word information collected from the ear canals of a population of individuals to feed a machine learning system to optimize an entertainment system. A system is disclosed herein having a machine learning system to optimize storage of natural-language processed incoming sound in the ear canal and having a system that uses a database of at least one of sound signature information and spoken word information collected from the ear canals of a population of individuals to feed a machine learning system to optimize a social network. A system is disclosed herein having a machine learning system to optimize storage of natural-language processed incoming sound in the ear canal and having a system that uses a database of at least one of sound signature information and spoken word information collected from the ear canals of a population of individuals to feed a machine learning system to optimize a location-based service. A system is disclosed herein having a machine learning system to optimize storage of natural-language processed incoming sound in the ear canal and having a system that uses a database of at least one of sound signature information and spoken word information collected from the ear canals of a population of individuals to feed a machine learning system to optimize an emergency response system. A system is disclosed herein having a machine learning system to optimize storage of natural-language processed incoming sound in the ear canal and having a system for personalizing audio content management based on data collected at the ear of a user. A system is disclosed herein having a machine learning system to optimize storage of natural-language processed incoming sound in the ear canal and having a system for collecting acoustic data. A system is disclosed herein having a machine learning system to optimize storage of natural-language processed incoming sound in the ear canal and having acoustic detection and sound management. A system is disclosed herein having a machine learning system to optimize storage of natural-language processed incoming sound in the ear canal and having a system for sound signature detection. A system is disclosed herein having a machine learning system to optimize storage of natural-language processed incoming sound in the ear canal and having a system for voice authentication. A system is disclosed herein having a machine learning system to optimize storage of natural-language processed incoming sound in the ear canal and having a system for ear-based physiological and biometric monitoring. A system is disclosed herein having a machine learning system to optimize storage of natural-language processed incoming sound in the ear canal and having a system for analyzing and validating the quality of a sound sealing mechanism between an ear canal of a user and the ambient environment. A system is disclosed herein having a machine learning system to optimize storage of natural-language processed incoming sound in the ear canal and having a system for enhancing a directional parameter of sound experienced by a user of a hearing device. A system is disclosed herein having a machine learning system to optimize storage of natural-language processed incoming sound in the ear canal and having a system for monitoring and protection of the ear of a user based on detection of characteristics of sound experience by the user. A system is disclosed herein having a machine learning system to optimize storage of natural-language processed incoming sound in the ear canal and having a system for signal separation and mixing of sounds arriving at the ear of a user. A system is disclosed herein having a machine learning system to optimize storage of natural-language processed incoming sound in the ear canal and having a system for management of sound pressure levels based on characteristics of sound arriving at the ear of a user. A system is disclosed herein having a machine learning system to optimize storage of natural-language processed incoming sound in the ear canal and having a system for understanding and managing a situational state of a user based on sound arriving at the ear of the user. A system is disclosed herein having a machine learning system to optimize storage of natural-language processed incoming sound in the ear canal and having a secure data storage cache for temporarily storing the sound signal arriving at the ear of a user of a hearing device.

The contents of the application may be combined to achieve a system as described herein. A system is disclosed herein having a machine learning system that optimizes use of in-ear data storage based on collection of incoming sound data and a feedback function regarding use of the data stored on the in-ear storage. A system is disclosed herein having a machine learning system that optimizes use of in-ear data storage based on collection of incoming sound data and a feedback function regarding use of the data stored on the in-ear storage and having an interface to in-ear data storage that allows in-ear data collected from spoken sound detected in the ear canal of a speaker to be published to an external system. A system is disclosed herein having a machine learning system that optimizes use of in-ear data storage based on collection of incoming sound data and a feedback function regarding use of the data stored on the in-ear storage and having a machine learning system to optimize storage of natural-language processed spoken sound collected in the ear canal of a speaker. A system is disclosed herein having a machine learning system that optimizes use of in-ear data storage based on collection of incoming sound data and a feedback function regarding use of the data stored on the in-ear storage and having a machine learning system to optimize use of in-ear data storage based on collection of spoken sound data in the ear canal of a speaker and a feedback function regarding use of the data stored on the in-ear storage. A system is disclosed herein having a machine learning system that optimizes use of in-ear data storage based on collection of incoming sound data and a feedback function regarding use of the data stored on the in-ear storage and having a database of natural-language processed words that are collected in the ear canal of an individual. A system is disclosed herein having a machine learning system that optimizes use of in-ear data storage based on collection of incoming sound data and a feedback function regarding use of the data stored on the in-ear storage and having a database of natural-language processed words that are collected in the ear canals of a population of individuals. A system is disclosed herein having a machine learning system that optimizes use of in-ear data storage based on collection of incoming sound data and a feedback function regarding use of the data stored on the in-ear storage and having an application programming interface for a database of sound information collected from the ear canals of a population of individuals by which an external system may query the database and obtain at least one of sound signature information and spoken word information. A system is disclosed herein having a machine learning system that optimizes use of in-ear data storage based on collection of incoming sound data and a feedback function regarding use of the data stored on the in-ear storage and having a publication system for a database of sound information collected from the ear canals of a population of individuals by which that database publishes at least one of sound signature information and spoken word information to an external system. A system is disclosed herein having a machine learning system that optimizes use of in-ear data storage based on collection of incoming sound data and a feedback function regarding use of the data stored on the in-ear storage and having a system that feeds a machine learning system with biometric data that is collected from the interface of a hearing device and the ear canal. A system is disclosed herein having a machine learning system that optimizes use of in-ear data storage based on collection of incoming sound data and a feedback function regarding use of the data stored on the in-ear storage and having a system that uses a database of at least one of sound signature information and spoken word information collected from the ear canals of a population of individuals to feed a machine learning system to optimize an entertainment system. A system is disclosed herein having a machine learning system that optimizes use of in-ear data storage based on collection of incoming sound data and a feedback function regarding use of the data stored on the in-ear storage and having a system that uses a database of at least one of sound signature information and spoken word information collected from the ear canals of a population of individuals to feed a machine learning system to optimize a social network. A system is disclosed herein having a machine learning system that optimizes use of in-ear data storage based on collection of incoming sound data and a feedback function regarding use of the data stored on the in-ear storage and having a system that uses a database of at least one of sound signature information and spoken word information collected from the ear canals of a population of individuals to feed a machine learning system to optimize a location-based service. A system is disclosed herein having a machine learning system that optimizes use of in-ear data storage based on collection of incoming sound data and a feedback function regarding use of the data stored on the in-ear storage and having a system that uses a database of at least one of sound signature information and spoken word information collected from the ear canals of a population of individuals to feed a machine learning system to optimize an emergency response system. A system is disclosed herein having a machine learning system that optimizes use of in-ear data storage based on collection of incoming sound data and a feedback function regarding use of the data stored on the in-ear storage and having a system for personalizing audio content management based on data collected at the ear of a user. A system is disclosed herein having a machine learning system that optimizes use of in-ear data storage based on collection of incoming sound data and a feedback function regarding use of the data stored on the in-ear storage and having a system for collecting acoustic data. A system is disclosed herein having a machine learning system that optimizes use of in-ear data storage based on collection of incoming sound data and a feedback function regarding use of the data stored on the in-ear storage and having acoustic detection and sound management. A system is disclosed herein having a machine learning system that optimizes use of in-ear data storage based on collection of incoming sound data and a feedback function regarding use of the data stored on the in-ear storage and having a system for sound signature detection. A system is disclosed herein having a machine learning system that optimizes use of in-ear data storage based on collection of incoming sound data and a feedback function regarding use of the data stored on the in-ear storage and having a system for voice authentication. A system is disclosed herein having a machine learning system that optimizes use of in-ear data storage based on collection of incoming sound data and a feedback function regarding use of the data stored on the in-ear storage and having a system for ear-based physiological and biometric monitoring. A system is disclosed herein having a machine learning system that optimizes use of in-ear data storage based on collection of incoming sound data and a feedback function regarding use of the data stored on the in-ear storage and having a system for analyzing and validating the quality of a sound sealing mechanism between an ear canal of a user and the ambient environment. A system is disclosed herein having a machine learning system that optimizes use of in-ear data storage based on collection of incoming sound data and a feedback function regarding use of the data stored on the in-ear storage and having a system for enhancing a directional parameter of sound experienced by a user of a hearing device. A system is disclosed herein having a machine learning system that optimizes use of in-ear data storage based on collection of incoming sound data and a feedback function regarding use of the data stored on the in-ear storage and having a system for monitoring and protection of the ear of a user based on detection of characteristics of sound experience by the user. A system is disclosed herein having a machine learning system that optimizes use of in-ear data storage based on collection of incoming sound data and a feedback function regarding use of the data stored on the in-ear storage and having a system for signal separation and mixing of sounds arriving at the ear of a user. A system is disclosed herein having a machine learning system that optimizes use of in-ear data storage based on collection of incoming sound data and a feedback function regarding use of the data stored on the in-ear storage and having a system for management of sound pressure levels based on characteristics of sound arriving at the ear of a user. A system is disclosed herein having a machine learning system that optimizes use of in-ear data storage based on collection of incoming sound data and a feedback function regarding use of the data stored on the in-ear storage and having a system for understanding and managing a situational state of a user based on sound arriving at the ear of the user. A system is disclosed herein having a machine learning system that optimizes use of in-ear data storage based on collection of incoming sound data and a feedback function regarding use of the data stored on the in-ear storage and having a secure data storage cache for temporarily storing the sound signal arriving at the ear of a user of a hearing device.

The contents of the application may be combined to achieve a system as described herein. A system is disclosed herein having an interface to in-ear data storage that allows in-ear data collected from spoken sound detected in the ear canal of a speaker to be published to an external system. A system is disclosed herein having an interface to in-ear data storage that allows in-ear data collected from spoken sound detected in the ear canal of a speaker to be published to an external system and having a machine learning system to optimize storage of natural-language processed spoken sound collected in the ear canal of a speaker. A system is disclosed herein having an interface to in-ear data storage that allows in-ear data collected from spoken sound detected in the ear canal of a speaker to be published to an external system and having a machine learning system to optimize use of in-ear data storage based on collection of spoken sound data in the ear canal of a speaker and a feedback function regarding use of the data stored on the in-ear storage. A system is disclosed herein having an interface to in-ear data storage that allows in-ear data collected from spoken sound detected in the ear canal of a speaker to be published to an external system and having a database of natural-language processed words that are collected in the ear canal of an individual. A system is disclosed herein having an interface to in-ear data storage that allows in-ear data collected from spoken sound detected in the ear canal of a speaker to be published to an external system and having a database of natural-language processed words that are collected in the ear canals of a population of individuals. A system is disclosed herein having an interface to in-ear data storage that allows in-ear data collected from spoken sound detected in the ear canal of a speaker to be published to an external system and having an application programming interface for a database of sound information collected from the ear canals of a population of individuals by which an external system may query the database and obtain at least one of sound signature information and spoken word information. A system is disclosed herein having an interface to in-ear data storage that allows in-ear data collected from spoken sound detected in the ear canal of a speaker to be published to an external system and having a publication system for a database of sound information collected from the ear canals of a population of individuals by which that database publishes at least one of sound signature information and spoken word information to an external system. A system is disclosed herein having an interface to in-ear data storage that allows in-ear data collected from spoken sound detected in the ear canal of a speaker to be published to an external system and having a system that feeds a machine learning system with biometric data that is collected from the interface of a hearing device and the ear canal. A system is disclosed herein having an interface to in-ear data storage that allows in-ear data collected from spoken sound detected in the ear canal of a speaker to be published to an external system and having a system that uses a database of at least one of sound signature information and spoken word information collected from the ear canals of a population of individuals to feed a machine learning system to optimize an entertainment system. A system is disclosed herein having an interface to in-ear data storage that allows in-ear data collected from spoken sound detected in the ear canal of a speaker to be published to an external system and having a system that uses a database of at least one of sound signature information and spoken word information collected from the ear canals of a population of individuals to feed a machine learning system to optimize a social network. A system is disclosed herein having an interface to in-ear data storage that allows in-ear data collected from spoken sound detected in the ear canal of a speaker to be published to an external system and having a system that uses a database of at least one of sound signature information and spoken word information collected from the ear canals of a population of individuals to feed a machine learning system to optimize a location-based service. A system is disclosed herein having an interface to in-ear data storage that allows in-ear data collected from spoken sound detected in the ear canal of a speaker to be published to an external system and having a system that uses a database of at least one of sound signature information and spoken word information collected from the ear canals of a population of individuals to feed a machine learning system to optimize an emergency response system. A system is disclosed herein having an interface to in-ear data storage that allows in-ear data collected from spoken sound detected in the ear canal of a speaker to be published to an external system and having a system for personalizing audio content management based on data collected at the ear of a user. A system is disclosed herein having an interface to in-ear data storage that allows in-ear data collected from spoken sound detected in the ear canal of a speaker to be published to an external system and having a system for collecting acoustic data. A system is disclosed herein having an interface to in-ear data storage that allows in-ear data collected from spoken sound detected in the ear canal of a speaker to be published to an external system and having acoustic detection and sound management. A system is disclosed herein having an interface to in-ear data storage that allows in-ear data collected from spoken sound detected in the ear canal of a speaker to be published to an external system and having a system for sound signature detection. A system is disclosed herein having an interface to in-ear data storage that allows in-ear data collected from spoken sound detected in the ear canal of a speaker to be published to an external system and having a system for voice authentication. A system is disclosed herein having an interface to in-ear data storage that allows in-ear data collected from spoken sound detected in the ear canal of a speaker to be published to an external system and having a system for ear-based physiological and biometric monitoring. A system is disclosed herein having an interface to in-ear data storage that allows in-ear data collected from spoken sound detected in the ear canal of a speaker to be published to an external system and having a system for analyzing and validating the quality of a sound sealing mechanism between an ear canal of a user and the ambient environment. A system is disclosed herein having an interface to in-ear data storage that allows in-ear data collected from spoken sound detected in the ear canal of a speaker to be published to an external system and having a system for enhancing a directional parameter of sound experienced by a user of a hearing device. A system is disclosed herein having an interface to in-ear data storage that allows in-ear data collected from spoken sound detected in the ear canal of a speaker to be published to an external system and having a system for monitoring and protection of the ear of a user based on detection of characteristics of sound experience by the user. A system is disclosed herein having an interface to in-ear data storage that allows in-ear data collected from spoken sound detected in the ear canal of a speaker to be published to an external system and having a system for signal separation and mixing of sounds arriving at the ear of a user. A system is disclosed herein having an interface to in-ear data storage that allows in-ear data collected from spoken sound detected in the ear canal of a speaker to be published to an external system and having a system for management of sound pressure levels based on characteristics of sound arriving at the ear of a user. A system is disclosed herein having an interface to in-ear data storage that allows in-ear data collected from spoken sound detected in the ear canal of a speaker to be published to an external system and having a system for understanding and managing a situational state of a user based on sound arriving at the ear of the user. A system is disclosed herein having an interface to in-ear data storage that allows in-ear data collected from spoken sound detected in the ear canal of a speaker to be published to an external system and having a secure data storage cache for temporarily storing the sound signal arriving at the ear of a user of a hearing device.

The contents of this application may be arranged so as to describe a system as described herein. A system is disclosed herein having a machine learning system to optimize storage of natural-language processed spoken sound collected in the ear canal of a speaker. A system is disclosed herein having a machine learning system to optimize storage of natural-language processed spoken sound collected in the ear canal of a speaker and having a machine learning system to optimize use of in-ear data storage based on collection of spoken sound data in the ear canal of a speaker and a feedback function regarding use of the data stored on the in-ear storage. A system is disclosed herein having a machine learning system to optimize storage of natural-language processed spoken sound collected in the ear canal of a speaker and having a database of natural-language processed words that are collected in the ear canal of an individual. A system is disclosed herein having a machine learning system to optimize storage of natural-language processed spoken sound collected in the ear canal of a speaker and having a database of natural-language processed words that are collected in the ear canals of a population of individuals. A system is disclosed herein having a machine learning system to optimize storage of natural-language processed spoken sound collected in the ear canal of a speaker and having an application programming interface for a database of sound information collected from the ear canals of a population of individuals by which an external system may query the database and obtain at least one of sound signature information and spoken word information. A system is disclosed herein having a machine learning system to optimize storage of natural-language processed spoken sound collected in the ear canal of a speaker and having a publication system for a database of sound information collected from the ear canals of a population of individuals by which that database publishes at least one of sound signature information and spoken word information to an external system. A system is disclosed herein having a machine learning system to optimize storage of natural-language processed spoken sound collected in the ear canal of a speaker and having a system that feeds a machine learning system with biometric data that is collected from the interface of a hearing device and the ear canal. A system is disclosed herein having a machine learning system to optimize storage of natural-language processed spoken sound collected in the ear canal of a speaker and having a system that uses a database of at least one of sound signature information and spoken word information collected from the ear canals of a population of individuals to feed a machine learning system to optimize an entertainment system. A system is disclosed herein having a machine learning system to optimize storage of natural-language processed spoken sound collected in the ear canal of a speaker and having a system that uses a database of at least one of sound signature information and spoken word information collected from the ear canals of a population of individuals to feed a machine learning system to optimize a social network. A system is disclosed herein having a machine learning system to optimize storage of natural-language processed spoken sound collected in the ear canal of a speaker and having a system that uses a database of at least one of sound signature information and spoken word information collected from the ear canals of a population of individuals to feed a machine learning system to optimize a location-based service. A system is disclosed herein having a machine learning system to optimize storage of natural-language processed spoken sound collected in the ear canal of a speaker and having a system that uses a database of at least one of sound signature information and spoken word information collected from the ear canals of a population of individuals to feed a machine learning system to optimize an emergency response system. A system is disclosed herein having a machine learning system to optimize storage of natural-language processed spoken sound collected in the ear canal of a speaker and having a system for personalizing audio content management based on data collected at the ear of a user. A system is disclosed herein having a machine learning system to optimize storage of natural-language processed spoken sound collected in the ear canal of a speaker and having a system for collecting acoustic data. A system is disclosed herein having a machine learning system to optimize storage of natural-language processed spoken sound collected in the ear canal of a speaker and having acoustic detection and sound management. A system is disclosed herein having a machine learning system to optimize storage of natural-language processed spoken sound collected in the ear canal of a speaker and having a system for sound signature detection. A system is disclosed herein having a machine learning system to optimize storage of natural-language processed spoken sound collected in the ear canal of a speaker and having a system for voice authentication. A system is disclosed herein having a machine learning system to optimize storage of natural-language processed spoken sound collected in the ear canal of a speaker and having a system for ear-based physiological and biometric monitoring. A system is disclosed herein having a machine learning system to optimize storage of natural-language processed spoken sound collected in the ear canal of a speaker and having a system for analyzing and validating the quality of a sound sealing mechanism between an ear canal of a user and the ambient environment. A system is disclosed herein having a machine learning system to optimize storage of natural-language processed spoken sound collected in the ear canal of a speaker and having a system for enhancing a directional parameter of sound experienced by a user of a hearing device. A system is disclosed herein having a machine learning system to optimize storage of natural-language processed spoken sound collected in the ear canal of a speaker and having a system for monitoring and protection of the ear of a user based on detection of characteristics of sound experience by the user. A system is disclosed herein having a machine learning system to optimize storage of natural-language processed spoken sound collected in the ear canal of a speaker and having a system for signal separation and mixing of sounds arriving at the ear of a user. A system is disclosed herein having a machine learning system to optimize storage of natural-language processed spoken sound collected in the ear canal of a speaker and having a system for management of sound pressure levels based on characteristics of sound arriving at the ear of a user. A system is disclosed herein having a machine learning system to optimize storage of natural-language processed spoken sound collected in the ear canal of a speaker and having a system for understanding and managing a situational state of a user based on sound arriving at the ear of the user. A system is disclosed herein having a machine learning system to optimize storage of natural-language processed spoken sound collected in the ear canal of a speaker and having a secure data storage cache for temporarily storing the sound signal arriving at the ear of a user of a hearing device.

The contents of the application may be combined to achieve a system as described herein. A system is disclosed herein having a machine learning system to optimize use of in-ear data storage based on collection of spoken sound data in the ear canal of a speaker and a feedback function regarding use of the data stored on the in-ear storage. A system is disclosed herein having a machine learning system to optimize use of in-ear data storage based on collection of spoken sound data in the ear canal of a speaker and a feedback function regarding use of the data stored on the in-ear storage and having a database of natural-language processed words that are collected in the ear canal of an individual. A system is disclosed herein having a machine learning system to optimize use of in-ear data storage based on collection of spoken sound data in the ear canal of a speaker and a feedback function regarding use of the data stored on the in-ear storage and having a database of natural-language processed words that are collected in the ear canals of a population of individuals. A system is disclosed herein having a machine learning system to optimize use of in-ear data storage based on collection of spoken sound data in the ear canal of a speaker and a feedback function regarding use of the data stored on the in-ear storage and having an application programming interface for a database of sound information collected from the ear canals of a population of individuals by which an external system may query the database and obtain at least one of sound signature information and spoken word information. A system is disclosed herein having a machine learning system to optimize use of in-ear data storage based on collection of spoken sound data in the ear canal of a speaker and a feedback function regarding use of the data stored on the in-ear storage and having a publication system for a database of sound information collected from the ear canals of a population of individuals by which that database publishes at least one of sound signature information and spoken word information to an external system. A system is disclosed herein having a machine learning system to optimize use of in-ear data storage based on collection of spoken sound data in the ear canal of a speaker and a feedback function regarding use of the data stored on the in-ear storage and having a system that feeds a machine learning system with biometric data that is collected from the interface of a hearing device and the ear canal. A system is disclosed herein having a machine learning system to optimize use of in-ear data storage based on collection of spoken sound data in the ear canal of a speaker and a feedback function regarding use of the data stored on the in-ear storage and having a system that uses a database of at least one of sound signature information and spoken word information collected from the ear canals of a population of individuals to feed a machine learning system to optimize an entertainment system. A system is disclosed herein having a machine learning system to optimize use of in-ear data storage based on collection of spoken sound data in the ear canal of a speaker and a feedback function regarding use of the data stored on the in-ear storage and having a system that uses a database of at least one of sound signature information and spoken word information collected from the ear canals of a population of individuals to feed a machine learning system to optimize a social network. A system is disclosed herein having a machine learning system to optimize use of in-ear data storage based on collection of spoken sound data in the ear canal of a speaker and a feedback function regarding use of the data stored on the in-ear storage and having a system that uses a database of at least one of sound signature information and spoken word information collected from the ear canals of a population of individuals to feed a machine learning system to optimize a location-based service. A system is disclosed herein having a machine learning system to optimize use of in-ear data storage based on collection of spoken sound data in the ear canal of a speaker and a feedback function regarding use of the data stored on the in-ear storage and having a system that uses a database of at least one of sound signature information and spoken word information collected from the ear canals of a population of individuals to feed a machine learning system to optimize an emergency response system. A system is disclosed herein having a machine learning system to optimize use of in-ear data storage based on collection of spoken sound data in the ear canal of a speaker and a feedback function regarding use of the data stored on the in-ear storage and having a system for personalizing audio content management based on data collected at the ear of a user. A system is disclosed herein having a machine learning system to optimize use of in-ear data storage based on collection of spoken sound data in the ear canal of a speaker and a feedback function regarding use of the data stored on the in-ear storage and having a system for collecting acoustic data. A system is disclosed herein having a machine learning system to optimize use of in-ear data storage based on collection of spoken sound data in the ear canal of a speaker and a feedback function regarding use of the data stored on the in-ear storage and having acoustic detection and sound management. A system is disclosed herein having a machine learning system to optimize use of in-ear data storage based on collection of spoken sound data in the ear canal of a speaker and a feedback function regarding use of the data stored on the in-ear storage and having a system for sound signature detection. A system is disclosed herein having a machine learning system to optimize use of in-ear data storage based on collection of spoken sound data in the ear canal of a speaker and a feedback function regarding use of the data stored on the in-ear storage and having a system for voice authentication. A system is disclosed herein having a machine learning system to optimize use of in-ear data storage based on collection of spoken sound data in the ear canal of a speaker and a feedback function regarding use of the data stored on the in-ear storage and having a system for ear-based physiological and biometric monitoring. A system is disclosed herein having a machine learning system to optimize use of in-ear data storage based on collection of spoken sound data in the ear canal of a speaker and a feedback function regarding use of the data stored on the in-ear storage and having a system for analyzing and validating the quality of a sound sealing mechanism between an ear canal of a user and the ambient environment. A system is disclosed herein having a machine learning system to optimize use of in-ear data storage based on collection of spoken sound data in the ear canal of a speaker and a feedback function regarding use of the data stored on the in-ear storage and having a system for enhancing a directional parameter of sound experienced by a user of a hearing device. A system is disclosed herein having a machine learning system to optimize use of in-ear data storage based on collection of spoken sound data in the ear canal of a speaker and a feedback function regarding use of the data stored on the in-ear storage and having a system for monitoring and protection of the ear of a user based on detection of characteristics of sound experience by the user. A system is disclosed herein having a machine learning system to optimize use of in-ear data storage based on collection of spoken sound data in the ear canal of a speaker and a feedback function regarding use of the data stored on the in-ear storage and having a system for signal separation and mixing of sounds arriving at the ear of a user. A system is disclosed herein having a machine learning system to optimize use of in-ear data storage based on collection of spoken sound data in the ear canal of a speaker and a feedback function regarding use of the data stored on the in-ear storage and having a system for management of sound pressure levels based on characteristics of sound arriving at the ear of a user. A system is disclosed herein having a machine learning system to optimize use of in-ear data storage based on collection of spoken sound data in the ear canal of a speaker and a feedback function regarding use of the data stored on the in-ear storage and having a system for understanding and managing a situational state of a user based on sound arriving at the ear of the user. A system is disclosed herein having a machine learning system to optimize use of in-ear data storage based on collection of spoken sound data in the ear canal of a speaker and a feedback function regarding use of the data stored on the in-ear storage and having a secure data storage cache for temporarily storing the sound signal arriving at the ear of a user of a hearing device.

The contents of the application may be combined to achieve a system as described herein. A system is disclosed herein having a database of natural-language processed words that are collected in the ear canal of an individual. A system is disclosed herein having a database of natural-language processed words that are collected in the ear canal of an individual and having a database of natural-language processed words that are collected in the ear canals of a population of individuals. A system is disclosed herein having a database of natural-language processed words that are collected in the ear canal of an individual and having an application programming interface for a database of sound information collected from the ear canals of a population of individuals by which an external system may query the database and obtain at least one of sound signature information and spoken word information. A system is disclosed herein having a database of natural-language processed words that are collected in the ear canal of an individual and having a publication system for a database of sound information collected from the ear canals of a population of individuals by which that database publishes at least one of sound signature information and spoken word information to an external system. A system is disclosed herein having a database of natural-language processed words that are collected in the ear canal of an individual and having a system that feeds a machine learning system with biometric data that is collected from the interface of a hearing device and the ear canal. A system is disclosed herein having a database of natural-language processed words that are collected in the ear canal of an individual and having a system that uses a database of at least one of sound signature information and spoken word information collected from the ear canals of a population of individuals to feed a machine learning system to optimize an entertainment system. A system is disclosed herein having a database of natural-language processed words that are collected in the ear canal of an individual and having a system that uses a database of at least one of sound signature information and spoken word information collected from the ear canals of a population of individuals to feed a machine learning system to optimize a social network. A system is disclosed herein having a database of natural-language processed words that are collected in the ear canal of an individual and having a system that uses a database of at least one of sound signature information and spoken word information collected from the ear canals of a population of individuals to feed a machine learning system to optimize a location-based service. A system is disclosed herein having a database of natural-language processed words that are collected in the ear canal of an individual and having a system that uses a database of at least one of sound signature information and spoken word information collected from the ear canals of a population of individuals to feed a machine learning system to optimize an emergency response system. A system is disclosed herein having a database of natural-language processed words that are collected in the ear canal of an individual and having a system for personalizing audio content management based on data collected at the ear of a user. A system is disclosed herein having a database of natural-language processed words that are collected in the ear canal of an individual and having a system for collecting acoustic data. A system is disclosed herein having a database of natural-language processed words that are collected in the ear canal of an individual and having acoustic detection and sound management. A system is disclosed herein having a database of natural-language processed words that are collected in the ear canal of an individual and having a system for sound signature detection. A system is disclosed herein having a database of natural-language processed words that are collected in the ear canal of an individual and having a system for voice authentication. A system is disclosed herein having a database of natural-language processed words that are collected in the ear canal of an individual and having a system for ear-based physiological and biometric monitoring. A system is disclosed herein having a database of natural-language processed words that are collected in the ear canal of an individual and having a system for analyzing and validating the quality of a sound sealing mechanism between an ear canal of a user and the ambient environment. A system is disclosed herein having a database of natural-language processed words that are collected in the ear canal of an individual and having a system for enhancing a directional parameter of sound experienced by a user of a hearing device. A system is disclosed herein having a database of natural-language processed words that are collected in the ear canal of an individual and having a system for monitoring and protection of the ear of a user based on detection of characteristics of sound experience by the user. A system is disclosed herein having a database of natural-language processed words that are collected in the ear canal of an individual and having a system for signal separation and mixing of sounds arriving at the ear of a user. A system is disclosed herein having a database of natural-language processed words that are collected in the ear canal of an individual and having a system for management of sound pressure levels based on characteristics of sound arriving at the ear of a user. A system is disclosed herein having a database of natural-language processed words that are collected in the ear canal of an individual and having a system for understanding and managing a situational state of a user based on sound arriving at the ear of the user. A system is disclosed herein having a database of natural-language processed words that are collected in the ear canal of an individual and having a secure data storage cache for temporarily storing the sound signal arriving at the ear of a user of a hearing device.

The contents of the application may be combined to achieve a system as described herein. A system is disclosed herein having a database of natural-language processed words that are collected in the ear canals of a population of individuals. A system is disclosed herein having a database of natural-language processed words that are collected in the ear canals of a population of individuals and having an application programming interface for a database of sound information collected from the ear canals of a population of individuals by which an external system may query the database and obtain at least one of sound signature information and spoken word information. A system is disclosed herein having a database of natural-language processed words that are collected in the ear canals of a population of individuals and having a publication system for a database of sound information collected from the ear canals of a population of individuals by which that database publishes at least one of sound signature information and spoken word information to an external system. A system is disclosed herein having a database of natural-language processed words that are collected in the ear canals of a population of individuals and having a system that feeds a machine learning system with biometric data that is collected from the interface of a hearing device and the ear canal. A system is disclosed herein having a database of natural-language processed words that are collected in the ear canals of a population of individuals and having a system that uses a database of at least one of sound signature information and spoken word information collected from the ear canals of a population of individuals to feed a machine learning system to optimize an entertainment system. A system is disclosed herein having a database of natural-language processed words that are collected in the ear canals of a population of individuals and having a system that uses a database of at least one of sound signature information and spoken word information collected from the ear canals of a population of individuals to feed a machine learning system to optimize a social network. A system is disclosed herein having a database of natural-language processed words that are collected in the ear canals of a population of individuals and having a system that uses a database of at least one of sound signature information and spoken word information collected from the ear canals of a population of individuals to feed a machine learning system to optimize a location-based service. A system is disclosed herein having a database of natural-language processed words that are collected in the ear canals of a population of individuals and having a system that uses a database of at least one of sound signature information and spoken word information collected from the ear canals of a population of individuals to feed a machine learning system to optimize an emergency response system. A system is disclosed herein having a database of natural-language processed words that are collected in the ear canals of a population of individuals and having a system for personalizing audio content management based on data collected at the ear of a user. A system is disclosed herein having a database of natural-language processed words that are collected in the ear canals of a population of individuals and having a system for collecting acoustic data. A system is disclosed herein having a database of natural-language processed words that are collected in the ear canals of a population of individuals and having acoustic detection and sound management. A system is disclosed herein having a database of natural-language processed words that are collected in the ear canals of a population of individuals and having a system for sound signature detection. A system is disclosed herein having a database of natural-language processed words that are collected in the ear canals of a population of individuals and having a system for voice authentication. A system is disclosed herein having a database of natural-language processed words that are collected in the ear canals of a population of individuals and having a system for ear-based physiological and biometric monitoring. A system is disclosed herein having a database of natural-language processed words that are collected in the ear canals of a population of individuals and having a system for analyzing and validating the quality of a sound sealing mechanism between an ear canal of a user and the ambient environment. A system is disclosed herein having a database of natural-language processed words that are collected in the ear canals of a population of individuals and having a system for enhancing a directional parameter of sound experienced by a user of a hearing device. A system is disclosed herein having a database of natural-language processed words that are collected in the ear canals of a population of individuals and having a system for monitoring and protection of the ear of a user based on detection of characteristics of sound experience by the user. A system is disclosed herein having a database of natural-language processed words that are collected in the ear canals of a population of individuals and having a system for signal separation and mixing of sounds arriving at the ear of a user. A system is disclosed herein having a database of natural-language processed words that are collected in the ear canals of a population of individuals and having a system for management of sound pressure levels based on characteristics of sound arriving at the ear of a user. A system is disclosed herein having a database of natural-language processed words that are collected in the ear canals of a population of individuals and having a system for understanding and managing a situational state of a user based on sound arriving at the ear of the user. A system is disclosed herein having a database of natural-language processed words that are collected in the ear canals of a population of individuals and having a secure data storage cache for temporarily storing the sound signal arriving at the ear of a user of a hearing device.

The contents of the application may be combined to achieve a system as described herein. A system is disclosed herein having an application programming interface for a database of sound information collected from the ear canals of a population of individuals by which an external system may query the database and obtain at least one of sound signature information and spoken word information. A system is disclosed herein having an application programming interface for a database of sound information collected from the ear canals of a population of individuals by which an external system may query the database and obtain at least one of sound signature information and spoken word information and having a publication system for a database of sound information collected from the ear canals of a population of individuals by which that database publishes at least one of sound signature information and spoken word information to an external system. A system is disclosed herein having an application programming interface for a database of sound information collected from the ear canals of a population of individuals by which an external system may query the database and obtain at least one of sound signature information and spoken word information and having a system that feeds a machine learning system with biometric data that is collected from the interface of a hearing device and the ear canal. A system is disclosed herein having an application programming interface for a database of sound information collected from the ear canals of a population of individuals by which an external system may query the database and obtain at least one of sound signature information and spoken word information and having a system that uses a database of at least one of sound signature information and spoken word information collected from the ear canals of a population of individuals to feed a machine learning system to optimize an entertainment system. A system is disclosed herein having an application programming interface for a database of sound information collected from the ear canals of a population of individuals by which an external system may query the database and obtain at least one of sound signature information and spoken word information and having a system that uses a database of at least one of sound signature information and spoken word information collected from the ear canals of a population of individuals to feed a machine learning system to optimize a social network. A system is disclosed herein having an application programming interface for a database of sound information collected from the ear canals of a population of individuals by which an external system may query the database and obtain at least one of sound signature information and spoken word information and having a system that uses a database of at least one of sound signature information and spoken word information collected from the ear canals of a population of individuals to feed a machine learning system to optimize a location-based service. A system is disclosed herein having an application programming interface for a database of sound information collected from the ear canals of a population of individuals by which an external system may query the database and obtain at least one of sound signature information and spoken word information and having a system that uses a database of at least one of sound signature information and spoken word information collected from the ear canals of a population of individuals to feed a machine learning system to optimize an emergency response system. A system is disclosed herein having an application programming interface for a database of sound information collected from the ear canals of a population of individuals by which an external system may query the database and obtain at least one of sound signature information and spoken word information and having a system for personalizing audio content management based on data collected at the ear of a user. A system is disclosed herein having an application programming interface for a database of sound information collected from the ear canals of a population of individuals by which an external system may query the database and obtain at least one of sound signature information and spoken word information and having a system for collecting acoustic data. A system is disclosed herein having an application programming interface for a database of sound information collected from the ear canals of a population of individuals by which an external system may query the database and obtain at least one of sound signature information and spoken word information and having acoustic detection and sound management. A system is disclosed herein having an application programming interface for a database of sound information collected from the ear canals of a population of individuals by which an external system may query the database and obtain at least one of sound signature information and spoken word information and having a system for sound signature detection. A system is disclosed herein having an application programming interface for a database of sound information collected from the ear canals of a population of individuals by which an external system may query the database and obtain at least one of sound signature information and spoken word information and having a system for voice authentication. A system is disclosed herein having an application programming interface for a database of sound information collected from the ear canals of a population of individuals by which an external system may query the database and obtain at least one of sound signature information and spoken word information and having a system for ear-based physiological and biometric monitoring. A system is disclosed herein having an application programming interface for a database of sound information collected from the ear canals of a population of individuals by which an external system may query the database and obtain at least one of sound signature information and spoken word information and having a system for analyzing and validating the quality of a sound sealing mechanism between an ear canal of a user and the ambient environment. A system is disclosed herein having an application programming interface for a database of sound information collected from the ear canals of a population of individuals by which an external system may query the database and obtain at least one of sound signature information and spoken word information and having a system for enhancing a directional parameter of sound experienced by a user of a hearing device. A system is disclosed herein having an application programming interface for a database of sound information collected from the ear canals of a population of individuals by which an external system may query the database and obtain at least one of sound signature information and spoken word information and having a system for monitoring and protection of the ear of a user based on detection of characteristics of sound experience by the user. A system is disclosed herein having an application programming interface for a database of sound information collected from the ear canals of a population of individuals by which an external system may query the database and obtain at least one of sound signature information and spoken word information and having a system for signal separation and mixing of sounds arriving at the ear of a user. A system is disclosed herein having an application programming interface for a database of sound information collected from the ear canals of a population of individuals by which an external system may query the database and obtain at least one of sound signature information and spoken word information and having a system for management of sound pressure levels based on characteristics of sound arriving at the ear of a user. A system is disclosed herein having an application programming interface for a database of sound information collected from the ear canals of a population of individuals by which an external system may query the database and obtain at least one of sound signature information and spoken word information and having a system for understanding and managing a situational state of a user based on sound arriving at the ear of the user. A system is disclosed herein having an application programming interface for a database of sound information collected from the ear canals of a population of individuals by which an external system may query the database and obtain at least one of sound signature information and spoken word information and having a secure data storage cache for temporarily storing the sound signal arriving at the ear of a user of a hearing device.

The contents of the application may be combined to achieve a system as described herein. A system is disclosed herein having a publication system for a database of sound information collected from the ear canals of a population of individuals by which that database publishes at least one of sound signature information and spoken word information to an external system. A system is disclosed herein having a publication system for a database of sound information collected from the ear canals of a population of individuals by which that database publishes at least one of sound signature information and spoken word information to an external system and having a system that feeds a machine learning system with biometric data that is collected from the interface of a hearing device and the ear canal. A system is disclosed herein having a publication system for a database of sound information collected from the ear canals of a population of individuals by which that database publishes at least one of sound signature information and spoken word information to an external system and having a system that uses a database of at least one of sound signature information and spoken word information collected from the ear canals of a population of individuals to feed a machine learning system to optimize an entertainment system. A system is disclosed herein having a publication system for a database of sound information collected from the ear canals of a population of individuals by which that database publishes at least one of sound signature information and spoken word information to an external system and having a system that uses a database of at least one of sound signature information and spoken word information collected from the ear canals of a population of individuals to feed a machine learning system to optimize a social network. A system is disclosed herein having a publication system for a database of sound information collected from the ear canals of a population of individuals by which that database publishes at least one of sound signature information and spoken word information to an external system and having a system that uses a database of at least one of sound signature information and spoken word information collected from the ear canals of a population of individuals to feed a machine learning system to optimize a location-based service. A system is disclosed herein having a publication system for a database of sound information collected from the ear canals of a population of individuals by which that database publishes at least one of sound signature information and spoken word information to an external system and having a system that uses a database of at least one of sound signature information and spoken word information collected from the ear canals of a population of individuals to feed a machine learning system to optimize an emergency response system. A system is disclosed herein having a publication system for a database of sound information collected from the ear canals of a population of individuals by which that database publishes at least one of sound signature information and spoken word information to an external system and having a system for personalizing audio content management based on data collected at the ear of a user. A system is disclosed herein having a publication system for a database of sound information collected from the ear canals of a population of individuals by which that database publishes at least one of sound signature information and spoken word information to an external system and having a system for collecting acoustic data. A system is disclosed herein having a publication system for a database of sound information collected from the ear canals of a population of individuals by which that database publishes at least one of sound signature information and spoken word information to an external system and having acoustic detection and sound management. A system is disclosed herein having a publication system for a database of sound information collected from the ear canals of a population of individuals by which that database publishes at least one of sound signature information and spoken word information to an external system and having a system for sound signature detection. A system is disclosed herein having a publication system for a database of sound information collected from the ear canals of a population of individuals by which that database publishes at least one of sound signature information and spoken word information to an external system and having a system for voice authentication. A system is disclosed herein having a publication system for a database of sound information collected from the ear canals of a population of individuals by which that database publishes at least one of sound signature information and spoken word information to an external system and having a system for ear-based physiological and biometric monitoring. A system is disclosed herein having a publication system for a database of sound information collected from the ear canals of a population of individuals by which that database publishes at least one of sound signature information and spoken word information to an external system and having a system for analyzing and validating the quality of a sound sealing mechanism between an ear canal of a user and the ambient environment. A system is disclosed herein having a publication system for a database of sound information collected from the ear canals of a population of individuals by which that database publishes at least one of sound signature information and spoken word information to an external system and having a system for enhancing a directional parameter of sound experienced by a user of a hearing device. A system is disclosed herein having a publication system for a database of sound information collected from the ear canals of a population of individuals by which that database publishes at least one of sound signature information and spoken word information to an external system and having a system for monitoring and protection of the ear of a user based on detection of characteristics of sound experience by the user. A system is disclosed herein having a publication system for a database of sound information collected from the ear canals of a population of individuals by which that database publishes at least one of sound signature information and spoken word information to an external system and having a system for signal separation and mixing of sounds arriving at the ear of a user. A system is disclosed herein having a publication system for a database of sound information collected from the ear canals of a population of individuals by which that database publishes at least one of sound signature information and spoken word information to an external system and having a system for management of sound pressure levels based on characteristics of sound arriving at the ear of a user. A system is disclosed herein having a publication system for a database of sound information collected from the ear canals of a population of individuals by which that database publishes at least one of sound signature information and spoken word information to an external system and having a system for understanding and managing a situational state of a user based on sound arriving at the ear of the user. A system is disclosed herein having a publication system for a database of sound information collected from the ear canals of a population of individuals by which that database publishes at least one of sound signature information and spoken word information to an external system and having a secure data storage cache for temporarily storing the sound signal arriving at the ear of a user of a hearing device.

The contents of the application may be combined to achieve a system as described herein. A system that feeds a machine learning system with biometric data that is collected from the interface of a hearing device and the ear canal. A system that feeds a machine learning system with biometric data that is collected from the interface of a hearing device and the ear canal and having a system that uses a database of at least one of sound signature information and spoken word information collected from the ear canals of a population of individuals to feed a machine learning system to optimize an entertainment system. A system that feeds a machine learning system with biometric data that is collected from the interface of a hearing device and the ear canal and having a system that uses a database of at least one of sound signature information and spoken word information collected from the ear canals of a population of individuals to feed a machine learning system to optimize a social network. A system that feeds a machine learning system with biometric data that is collected from the interface of a hearing device and the ear canal and having a system that uses a database of at least one of sound signature information and spoken word information collected from the ear canals of a population of individuals to feed a machine learning system to optimize a location-based service. A system that feeds a machine learning system with biometric data that is collected from the interface of a hearing device and the ear canal and having a system that uses a database of at least one of sound signature information and spoken word information collected from the ear canals of a population of individuals to feed a machine learning system to optimize an emergency response system. A system that feeds a machine learning system with biometric data that is collected from the interface of a hearing device and the ear canal and having a system for personalizing audio content management based on data collected at the ear of a user. A system that feeds a machine learning system with biometric data that is collected from the interface of a hearing device and the ear canal and having a system for collecting acoustic data. A system that feeds a machine learning system with biometric data that is collected from the interface of a hearing device and the ear canal and having acoustic detection and sound management. A system that feeds a machine learning system with biometric data that is collected from the interface of a hearing device and the ear canal and having a system for sound signature detection. A system that feeds a machine learning system with biometric data that is collected from the interface of a hearing device and the ear canal and having a system for voice authentication. A system that feeds a machine learning system with biometric data that is collected from the interface of a hearing device and the ear canal and having a system for ear-based physiological and biometric monitoring. A system that feeds a machine learning system with biometric data that is collected from the interface of a hearing device and the ear canal and having a system for analyzing and validating the quality of a sound sealing mechanism between an ear canal of a user and the ambient environment. A system that feeds a machine learning system with biometric data that is collected from the interface of a hearing device and the ear canal and having a system for enhancing a directional parameter of sound experienced by a user of a hearing device. A system that feeds a machine learning system with biometric data that is collected from the interface of a hearing device and the ear canal and having a system for monitoring and protection of the ear of a user based on detection of characteristics of sound experience by the user. A system that feeds a machine learning system with biometric data that is collected from the interface of a hearing device and the ear canal and having a system for signal separation and mixing of sounds arriving at the ear of a user. A system that feeds a machine learning system with biometric data that is collected from the interface of a hearing device and the ear canal and having a system for management of sound pressure levels based on characteristics of sound arriving at the ear of a user. A system that feeds a machine learning system with biometric data that is collected from the interface of a hearing device and the ear canal and having a system for understanding and managing a situational state of a user based on sound arriving at the ear of the user. A system that feeds a machine learning system with biometric data that is collected from the interface of a hearing device and the ear canal and having a secure data storage cache for temporarily storing the sound signal arriving at the ear of a user of a hearing device.

The contents of the application may be combined to achieve a system as described herein. A system that uses a database of at least one of sound signature information and spoken word information collected from the ear canals of a population of individuals to feed a machine learning system to optimize an entertainment system. A system that uses a database of at least one of sound signature information and spoken word information collected from the ear canals of a population of individuals to feed a machine learning system to optimize an entertainment system and having a system that uses a database of at least one of sound signature information and spoken word information collected from the ear canals of a population of individuals to feed a machine learning system to optimize a social network. A system that uses a database of at least one of sound signature information and spoken word information collected from the ear canals of a population of individuals to feed a machine learning system to optimize an entertainment system and having a system that uses a database of at least one of sound signature information and spoken word information collected from the ear canals of a population of individuals to feed a machine learning system to optimize a location-based service. A system that uses a database of at least one of sound signature information and spoken word information collected from the ear canals of a population of individuals to feed a machine learning system to optimize an entertainment system and having a system that uses a database of at least one of sound signature information and spoken word information collected from the ear canals of a population of individuals to feed a machine learning system to optimize an emergency response system. A system that uses a database of at least one of sound signature information and spoken word information collected from the ear canals of a population of individuals to feed a machine learning system to optimize an entertainment system and having a system for personalizing audio content management based on data collected at the ear of a user. A system that uses a database of at least one of sound signature information and spoken word information collected from the ear canals of a population of individuals to feed a machine learning system to optimize an entertainment system and having a system for collecting acoustic data. A system that uses a database of at least one of sound signature information and spoken word information collected from the ear canals of a population of individuals to feed a machine learning system to optimize an entertainment system and having acoustic detection and sound management. A system that uses a database of at least one of sound signature information and spoken word information collected from the ear canals of a population of individuals to feed a machine learning system to optimize an entertainment system and having a system for sound signature detection. A system that uses a database of at least one of sound signature information and spoken word information collected from the ear canals of a population of individuals to feed a machine learning system to optimize an entertainment system and having a system for voice authentication. A system that uses a database of at least one of sound signature information and spoken word information collected from the ear canals of a population of individuals to feed a machine learning system to optimize an entertainment system and having a system for ear-based physiological and biometric monitoring. A system that uses a database of at least one of sound signature information and spoken word information collected from the ear canals of a population of individuals to feed a machine learning system to optimize an entertainment system and having a system for analyzing and validating the quality of a sound sealing mechanism between an ear canal of a user and the ambient environment. A system that uses a database of at least one of sound signature information and spoken word information collected from the ear canals of a population of individuals to feed a machine learning system to optimize an entertainment system and having a system for enhancing a directional parameter of sound experienced by a user of a hearing device. A system that uses a database of at least one of sound signature information and spoken word information collected from the ear canals of a population of individuals to feed a machine learning system to optimize an entertainment system and having a system for monitoring and protection of the ear of a user based on detection of characteristics of sound experience by the user. A system that uses a database of at least one of sound signature information and spoken word information collected from the ear canals of a population of individuals to feed a machine learning system to optimize an entertainment system and having a system for signal separation and mixing of sounds arriving at the ear of a user. A system that uses a database of at least one of sound signature information and spoken word information collected from the ear canals of a population of individuals to feed a machine learning system to optimize an entertainment system and having a system for management of sound pressure levels based on characteristics of sound arriving at the ear of a user. A system that uses a database of at least one of sound signature information and spoken word information collected from the ear canals of a population of individuals to feed a machine learning system to optimize an entertainment system and having a system for understanding and managing a situational state of a user based on sound arriving at the ear of the user. A system that uses a database of at least one of sound signature information and spoken word information collected from the ear canals of a population of individuals to feed a machine learning system to optimize an entertainment system and having a secure data storage cache for temporarily storing the sound signal arriving at the ear of a user of a hearing device.

The contents of the application may be combined to achieve a system as described herein. A system that uses a database of at least one of sound signature information and spoken word information collected from the ear canals of a population of individuals to feed a machine learning system to optimize a social network. A system that uses a database of at least one of sound signature information and spoken word information collected from the ear canals of a population of individuals to feed a machine learning system to optimize a social network and having a system that uses a database of at least one of sound signature information and spoken word information collected from the ear canals of a population of individuals to feed a machine learning system to optimize a location-based service. A system that uses a database of at least one of sound signature information and spoken word information collected from the ear canals of a population of individuals to feed a machine learning system to optimize a social network and having a system that uses a database of at least one of sound signature information and spoken word information collected from the ear canals of a population of individuals to feed a machine learning system to optimize an emergency response system. A system that uses a database of at least one of sound signature information and spoken word information collected from the ear canals of a population of individuals to feed a machine learning system to optimize a social network and having a system for personalizing audio content management based on data collected at the ear of a user. A system that uses a database of at least one of sound signature information and spoken word information collected from the ear canals of a population of individuals to feed a machine learning system to optimize a social network and having a system for collecting acoustic data. A system that uses a database of at least one of sound signature information and spoken word information collected from the ear canals of a population of individuals to feed a machine learning system to optimize a social network and having acoustic detection and sound management. A system that uses a database of at least one of sound signature information and spoken word information collected from the ear canals of a population of individuals to feed a machine learning system to optimize a social network and having a system for sound signature detection. A system that uses a database of at least one of sound signature information and spoken word information collected from the ear canals of a population of individuals to feed a machine learning system to optimize a social network and having a system for voice authentication. A system that uses a database of at least one of sound signature information and spoken word information collected from the ear canals of a population of individuals to feed a machine learning system to optimize a social network and having a system for ear-based physiological and biometric monitoring. A system that uses a database of at least one of sound signature information and spoken word information collected from the ear canals of a population of individuals to feed a machine learning system to optimize a social network and having a system for analyzing and validating the quality of a sound sealing mechanism between an ear canal of a user and the ambient environment. A system that uses a database of at least one of sound signature information and spoken word information collected from the ear canals of a population of individuals to feed a machine learning system to optimize a social network and having a system for enhancing a directional parameter of sound experienced by a user of a hearing device. A system that uses a database of at least one of sound signature information and spoken word information collected from the ear canals of a population of individuals to feed a machine learning system to optimize a social network and having a system for monitoring and protection of the ear of a user based on detection of characteristics of sound experience by the user. A system that uses a database of at least one of sound signature information and spoken word information collected from the ear canals of a population of individuals to feed a machine learning system to optimize a social network and having a system for signal separation and mixing of sounds arriving at the ear of a user. A system that uses a database of at least one of sound signature information and spoken word information collected from the ear canals of a population of individuals to feed a machine learning system to optimize a social network and having a system for management of sound pressure levels based on characteristics of sound arriving at the ear of a user. A system that uses a database of at least one of sound signature information and spoken word information collected from the ear canals of a population of individuals to feed a machine learning system to optimize a social network and having a system for understanding and managing a situational state of a user based on sound arriving at the ear of the user. A system that uses a database of at least one of sound signature information and spoken word information collected from the ear canals of a population of individuals to feed a machine learning system to optimize a social network and having a secure data storage cache for temporarily storing the sound signal arriving at the ear of a user of a hearing device.

The contents of the application may be combined to achieve a system as described herein. A system that uses a database of at least one of sound signature information and spoken word information collected from the ear canals of a population of individuals to feed a machine learning system to optimize a location-based service. A system that uses a database of at least one of sound signature information and spoken word information collected from the ear canals of a population of individuals to feed a machine learning system to optimize a location-based service and having a system that uses a database of at least one of sound signature information and spoken word information collected from the ear canals of a population of individuals to feed a machine learning system to optimize an emergency response system. A system that uses a database of at least one of sound signature information and spoken word information collected from the ear canals of a population of individuals to feed a machine learning system to optimize a location-based service and having a system for personalizing audio content management based on data collected at the ear of a user. A system that uses a database of at least one of sound signature information and spoken word information collected from the ear canals of a population of individuals to feed a machine learning system to optimize a location-based service and having a system for collecting acoustic data. A system that uses a database of at least one of sound signature information and spoken word information collected from the ear canals of a population of individuals to feed a machine learning system to optimize a location-based service and having acoustic detection and sound management. A system that uses a database of at least one of sound signature information and spoken word information collected from the ear canals of a population of individuals to feed a machine learning system to optimize a location-based service and having a system for sound signature detection. A system that uses a database of at least one of sound signature information and spoken word information collected from the ear canals of a population of individuals to feed a machine learning system to optimize a location-based service and having a system for voice authentication. A system that uses a database of at least one of sound signature information and spoken word information collected from the ear canals of a population of individuals to feed a machine learning system to optimize a location-based service and having a system for ear-based physiological and biometric monitoring. A system that uses a database of at least one of sound signature information and spoken word information collected from the ear canals of a population of individuals to feed a machine learning system to optimize a location-based service and having a system for analyzing and validating the quality of a sound sealing mechanism between an ear canal of a user and the ambient environment. A system that uses a database of at least one of sound signature information and spoken word information collected from the ear canals of a population of individuals to feed a machine learning system to optimize a location-based service and having a system for enhancing a directional parameter of sound experienced by a user of a hearing device. A system that uses a database of at least one of sound signature information and spoken word information collected from the ear canals of a population of individuals to feed a machine learning system to optimize a location-based service and having a system for monitoring and protection of the ear of a user based on detection of characteristics of sound experience by the user. A system that uses a database of at least one of sound signature information and spoken word information collected from the ear canals of a population of individuals to feed a machine learning system to optimize a location-based service and having a system for signal separation and mixing of sounds arriving at the ear of a user. A system that uses a database of at least one of sound signature information and spoken word information collected from the ear canals of a population of individuals to feed a machine learning system to optimize a location-based service and having a system for management of sound pressure levels based on characteristics of sound arriving at the ear of a user. A system that uses a database of at least one of sound signature information and spoken word information collected from the ear canals of a population of individuals to feed a machine learning system to optimize a location-based service and having a system for understanding and managing a situational state of a user based on sound arriving at the ear of the user. A system that uses a database of at least one of sound signature information and spoken word information collected from the ear canals of a population of individuals to feed a machine learning system to optimize a location-based service and having a secure data storage cache for temporarily storing the sound signal arriving at the ear of a user of a hearing device.

The contents of the application may be combined to achieve a system as described herein. A system that uses a database of at least one of sound signature information and spoken word information collected from the ear canals of a population of individuals to feed a machine learning system to optimize an emergency response system. A system that uses a database of at least one of sound signature information and spoken word information collected from the ear canals of a population of individuals to feed a machine learning system to optimize an emergency response system and having a system for personalizing audio content management based on data collected at the ear of a user. A system that uses a database of at least one of sound signature information and spoken word information collected from the ear canals of a population of individuals to feed a machine learning system to optimize an emergency response system and having a system for collecting acoustic data. A system that uses a database of at least one of sound signature information and spoken word information collected from the ear canals of a population of individuals to feed a machine learning system to optimize an emergency response system and having acoustic detection and sound management. A system that uses a database of at least one of sound signature information and spoken word information collected from the ear canals of a population of individuals to feed a machine learning system to optimize an emergency response system and having a system for sound signature detection. A system that uses a database of at least one of sound signature information and spoken word information collected from the ear canals of a population of individuals to feed a machine learning system to optimize an emergency response system and having a system for voice authentication. A system that uses a database of at least one of sound signature information and spoken word information collected from the ear canals of a population of individuals to feed a machine learning system to optimize an emergency response system and having a system for ear-based physiological and biometric monitoring. A system that uses a database of at least one of sound signature information and spoken word information collected from the ear canals of a population of individuals to feed a machine learning system to optimize an emergency response system and having a system for analyzing and validating the quality of a sound sealing mechanism between an ear canal of a user and the ambient environment. A system that uses a database of at least one of sound signature information and spoken word information collected from the ear canals of a population of individuals to feed a machine learning system to optimize an emergency response system and having a system for enhancing a directional parameter of sound experienced by a user of a hearing device. A system that uses a database of at least one of sound signature information and spoken word information collected from the ear canals of a population of individuals to feed a machine learning system to optimize an emergency response system and having a system for monitoring and protection of the ear of a user based on detection of characteristics of sound experience by the user. A system that uses a database of at least one of sound signature information and spoken word information collected from the ear canals of a population of individuals to feed a machine learning system to optimize an emergency response system and having a system for signal separation and mixing of sounds arriving at the ear of a user. A system that uses a database of at least one of sound signature information and spoken word information collected from the ear canals of a population of individuals to feed a machine learning system to optimize an emergency response system and having a system for management of sound pressure levels based on characteristics of sound arriving at the ear of a user. A system that uses a database of at least one of sound signature information and spoken word information collected from the ear canals of a population of individuals to feed a machine learning system to optimize an emergency response system and having a system for understanding and managing a situational state of a user based on sound arriving at the ear of the user. A system that uses a database of at least one of sound signature information and spoken word information collected from the ear canals of a population of individuals to feed a machine learning system to optimize an emergency response system and having a secure data storage cache for temporarily storing the sound signal arriving at the ear of a user of a hearing device.

The contents of the application may be combined to achieve a system as described herein. A system for personalizing audio content management based on data collected at the ear of a user. A system for personalizing audio content management based on data collected at the ear of a user and having a system for collecting acoustic data. A system for personalizing audio content management based on data collected at the ear of a user and having acoustic detection and sound management. A system for personalizing audio content management based on data collected at the ear of a user and having a system for sound signature detection. A system for personalizing audio content management based on data collected at the ear of a user and having a system for voice authentication. A system for personalizing audio content management based on data collected at the ear of a user and having a system for ear-based physiological and biometric monitoring. A system for personalizing audio content management based on data collected at the ear of a user and having a system for analyzing and validating the quality of a sound sealing mechanism between an ear canal of a user and the ambient environment. A system for personalizing audio content management based on data collected at the ear of a user and having a system for enhancing a directional parameter of sound experienced by a user of a hearing device. A system for personalizing audio content management based on data collected at the ear of a user and having a system for monitoring and protection of the ear of a user based on detection of characteristics of sound experience by the user. A system for personalizing audio content management based on data collected at the ear of a user and having a system for signal separation and mixing of sounds arriving at the ear of a user. A system for personalizing audio content management based on data collected at the ear of a user and having a system for management of sound pressure levels based on characteristics of sound arriving at the ear of a user. A system for personalizing audio content management based on data collected at the ear of a user and having a system for understanding and managing a situational state of a user based on sound arriving at the ear of the user. A system for personalizing audio content management based on data collected at the ear of a user and having a secure data storage cache for temporarily storing the sound signal arriving at the ear of a user of a hearing device.

The contents of the application may be combined to achieve a system as described herein. A system for collecting acoustic data. A system for collecting acoustic data and having acoustic detection and sound management. A system for collecting acoustic data and having a system for sound signature detection. A system for collecting acoustic data and having a system for voice authentication. A system for collecting acoustic data and having a system for ear-based physiological and biometric monitoring. A system for collecting acoustic data and having a system for analyzing and validating the quality of a sound sealing mechanism between an ear canal of a user and the ambient environment. A system for collecting acoustic data and having a system for enhancing a directional parameter of sound experienced by a user of a hearing device. A system for collecting acoustic data and having a system for monitoring and protection of the ear of a user based on detection of characteristics of sound experience by the user. A system for collecting acoustic data and having a system for signal separation and mixing of sounds arriving at the ear of a user. A system for collecting acoustic data and having a system for management of sound pressure levels based on characteristics of sound arriving at the ear of a user. A system for collecting acoustic data and having a system for understanding and managing a situational state of a user based on sound arriving at the ear of the user. A system for collecting acoustic data and having a secure data storage cache for temporarily storing the sound signal arriving at the ear of a user of a hearing device.

The contents of the application may be combined to achieve a system as described herein. A system is disclosed herein having acoustic detection and sound management. A system is disclosed herein having acoustic detection and sound management and having a system for sound signature detection. A system is disclosed herein having acoustic detection and sound management and having a system for voice authentication. A system is disclosed herein having acoustic detection and sound management and having a system for ear-based physiological and biometric monitoring. A system is disclosed herein having acoustic detection and sound management and having a system for analyzing and validating the quality of a sound sealing mechanism between an ear canal of a user and the ambient environment. A system is disclosed herein having acoustic detection and sound management and having a system for enhancing a directional parameter of sound experienced by a user of a hearing device. A system is disclosed herein having acoustic detection and sound management and having a system for monitoring and protection of the ear of a user based on detection of characteristics of sound experience by the user. A system is disclosed herein having acoustic detection and sound management and having a system for signal separation and mixing of sounds arriving at the ear of a user. A system is disclosed herein having acoustic detection and sound management and having a system for management of sound pressure levels based on characteristics of sound arriving at the ear of a user. A system is disclosed herein having acoustic detection and sound management and having a system for understanding and managing a situational state of a user based on sound arriving at the ear of the user. A system is disclosed herein having acoustic detection and sound management and having a secure data storage cache for temporarily storing the sound signal arriving at the ear of a user of a hearing device.

The contents of the application may be combined to achieve a system as described herein. A system for sound signature detection. A system for sound signature detection and having a system for voice authentication. A system for sound signature detection and having a system for ear-based physiological and biometric monitoring. A system for sound signature detection and having a system for analyzing and validating the quality of a sound sealing mechanism between an ear canal of a user and the ambient environment. A system for sound signature detection and having a system for enhancing a directional parameter of sound experienced by a user of a hearing device. A system for sound signature detection and having a system for monitoring and protection of the ear of a user based on detection of characteristics of sound experience by the user. A system for sound signature detection and having a system for signal separation and mixing of sounds arriving at the ear of a user. A system for sound signature detection and having a system for management of sound pressure levels based on characteristics of sound arriving at the ear of a user. A system for sound signature detection and having a system for understanding and managing a situational state of a user based on sound arriving at the ear of the user. A system for sound signature detection and having a secure data storage cache for temporarily storing the sound signal arriving at the ear of a user of a hearing device.

The contents of the application may be combined to achieve a system as described herein. A system for voice authentication. A system for voice authentication and having a system for ear-based physiological and biometric monitoring. A system for voice authentication and having a system for analyzing and validating the quality of a sound sealing mechanism between an ear canal of a user and the ambient environment. A system for voice authentication and having a system for enhancing a directional parameter of sound experienced by a user of a hearing device. A system for voice authentication and having a system for monitoring and protection of the ear of a user based on detection of characteristics of sound experience by the user. A system for voice authentication and having a system for signal separation and mixing of sounds arriving at the ear of a user. A system for voice authentication and having a system for management of sound pressure levels based on characteristics of sound arriving at the ear of a user. A system for voice authentication and having a system for understanding and managing a situational state of a user based on sound arriving at the ear of the user. A system for voice authentication and having a secure data storage cache for temporarily storing the sound signal arriving at the ear of a user of a hearing device.

The contents of the application may be combined to achieve a system as described herein. A system for ear-based physiological and biometric monitoring. A system for ear-based physiological and biometric monitoring and having a system for analyzing and validating the quality of a sound sealing mechanism between an ear canal of a user and the ambient environment. A system for ear-based physiological and biometric monitoring and having a system for enhancing a directional parameter of sound experienced by a user of a hearing device. A system for ear-based physiological and biometric monitoring and having a system for monitoring and protection of the ear of a user based on detection of characteristics of sound experience by the user. A system for ear-based physiological and biometric monitoring and having a system for signal separation and mixing of sounds arriving at the ear of a user. A system for ear-based physiological and biometric monitoring and having a system for management of sound pressure levels based on characteristics of sound arriving at the ear of a user. A system for ear-based physiological and biometric monitoring and having a system for understanding and managing a situational state of a user based on sound arriving at the ear of the user. A system for ear-based physiological and biometric monitoring and having a secure data storage cache for temporarily storing the sound signal arriving at the ear of a user of a hearing device.

The contents of the application may be combined to achieve a system as described herein. A system for analyzing and validating the quality of a sound sealing mechanism between an ear canal of a user and the ambient environment. A system for analyzing and validating the quality of a sound sealing mechanism between an ear canal of a user and the ambient environment and having a system for enhancing a directional parameter of sound experienced by a user of a hearing device. A system for analyzing and validating the quality of a sound sealing mechanism between an ear canal of a user and the ambient environment and having a system for monitoring and protection of the ear of a user based on detection of characteristics of sound experience by the user. A system for analyzing and validating the quality of a sound sealing mechanism between an ear canal of a user and the ambient environment and having a system for signal separation and mixing of sounds arriving at the ear of a user. A system for analyzing and validating the quality of a sound sealing mechanism between an ear canal of a user and the ambient environment and having a system for management of sound pressure levels based on characteristics of sound arriving at the ear of a user. A system for analyzing and validating the quality of a sound sealing mechanism between an ear canal of a user and the ambient environment and having a system for understanding and managing a situational state of a user based on sound arriving at the ear of the user. A system for analyzing and validating the quality of a sound sealing mechanism between an ear canal of a user and the ambient environment and having a secure data storage cache for temporarily storing the sound signal arriving at the ear of a user of a hearing device.

The contents of the application may be combined to achieve a system as described herein. A system for enhancing a directional parameter of sound experienced by a user of a hearing device. A system for enhancing a directional parameter of sound experienced by a user of a hearing device and having a system for monitoring and protection of the ear of a user based on detection of characteristics of sound experience by the user. A system for enhancing a directional parameter of sound experienced by a user of a hearing device and having a system for signal separation and mixing of sounds arriving at the ear of a user. A system for enhancing a directional parameter of sound experienced by a user of a hearing device and having a system for management of sound pressure levels based on characteristics of sound arriving at the ear of a user. A system for enhancing a directional parameter of sound experienced by a user of a hearing device and having a system for understanding and managing a situational state of a user based on sound arriving at the ear of the user. A system for enhancing a directional parameter of sound experienced by a user of a hearing device and having a secure data storage cache for temporarily storing the sound signal arriving at the ear of a user of a hearing device.

A system for monitoring and protection of the ear of a user based on detection of characteristics of sound experience by the user. A system for monitoring and protection of the ear of a user based on detection of characteristics of sound experience by the user and having a system for signal separation and mixing of sounds arriving at the ear of a user. A system for monitoring and protection of the ear of a user based on detection of characteristics of sound experience by the user and having a system for management of sound pressure levels based on characteristics of sound arriving at the ear of a user. A system for monitoring and protection of the ear of a user based on detection of characteristics of sound experience by the user and having a system for understanding and managing a situational state of a user based on sound arriving at the ear of the user. A system for monitoring and protection of the ear of a user based on detection of characteristics of sound experience by the user and having a secure data storage cache for temporarily storing the sound signal arriving at the ear of a user of a hearing device.

A system for signal separation and mixing of sounds arriving at the ear of a user. A system for signal separation and mixing of sounds arriving at the ear of a user and having a system for management of sound pressure levels based on characteristics of sound arriving at the ear of a user. A system for signal separation and mixing of sounds arriving at the ear of a user and having a system for understanding and managing a situational state of a user based on sound arriving at the ear of the user. A system for signal separation and mixing of sounds arriving at the ear of a user and having a secure data storage cache for temporarily storing the sound signal arriving at the ear of a user of a hearing device.

The contents of the application may be combined to achieve a system as described herein. A system for management of sound pressure levels based on characteristics of sound arriving at the ear of a user. A system for management of sound pressure levels based on characteristics of sound arriving at the ear of a user and having a system for understanding and managing a situational state of a user based on sound arriving at the ear of the user. A system for management of sound pressure levels based on characteristics of sound arriving at the ear of a user and having a secure data storage cache for temporarily storing the sound signal arriving at the ear of a user of a hearing device.

The contents of the application may be combined to achieve a system as described herein. A system for understanding and managing a situational state of a user based on sound arriving at the ear of the user. A system for understanding and managing a situational state of a user based on sound arriving at the ear of the user and having a secure data storage cache for temporarily storing the sound signal arriving at the ear of a user of a hearing device.

The contents of the application may be combined to achieve a system as described herein. A system is disclosed herein having a secure data storage cache for temporarily storing the sound signal arriving at the ear of a user of a hearing device.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. As used herein, the term "module" may refer to computer program logic that is executed by a processor and which may be used to provide the specified functionality. A module can be implemented in hardware, firmware, and/or software being executed by a processor.

The computer executable code may be created using a structured programming language such as C, an object oriented programming language such as C++, a compiled programming language, such as Java, and/or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. While this disclosure contains many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present disclosure the scope of the inventions is reflected by the breadth of the claims below rather than narrowed by the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Figure 13:
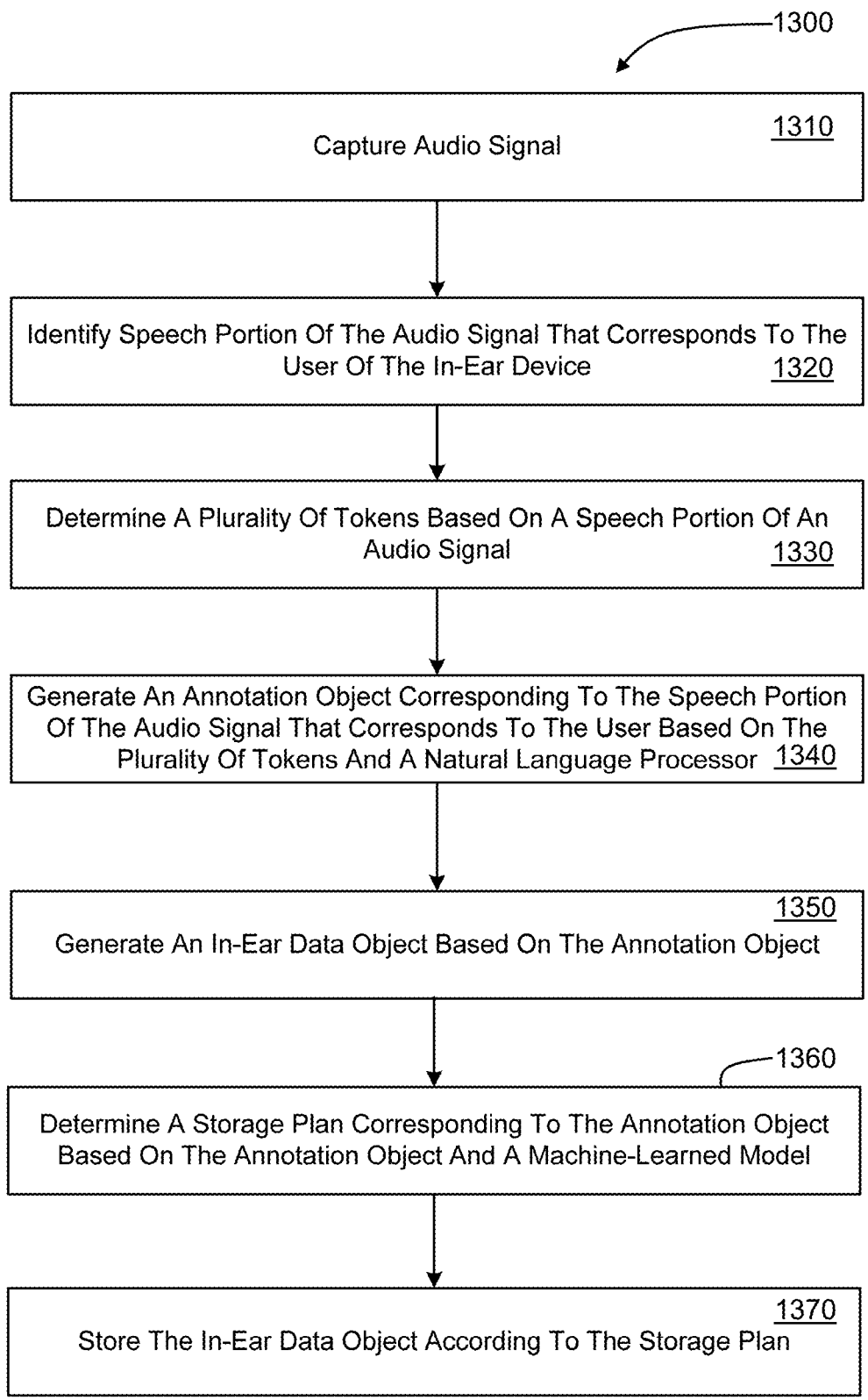
FIG. 13 illustrates a set of operations of a method for publishing in-ear data to an external device using a natural language processor.

FIG. 13 illustrates an example set of operations of a method 1300 for optimizing storage of speech data corresponding to an audio signal captured by an in-ear device of the speaker (i.e., the user of the in-ear device). In embodiments, the method 1300 is executed by a processing device of an in-ear devices of FIGS. 1A, 1B, 2A-2N, 3, and 4A. It is noted that one or more of the operations discussed herein may be performed either completely or in-part by a user device associated with the user of the in-ear device.

At 1310, the in-ear device captures an audio signal. The in-ear device may capture an audio signal via one or more microphones embedded in the in-ear device. The microphone(s) may capture a sound wave and may output an audio signal corresponding to the sound wave. The audio signal may contain speech (e.g., a speech portion of the audio signal) and/or sounds (e.g., a sound portion of the audio signal) captured in the sound wave.

At 1320, the in-ear device may identify a speech portion of the audio signal capturing speech spoken by the user. In embodiments, the in-ear device may implement one or more filters (e.g., high-pass filters, low pass filters, band-pass filters, and the like) to identify the speech portion of the audio signal. In embodiments, the in-ear device may transform audio frames of the audio signal to the frequency domain and may identify the speech portion of the audio signal based on the transformed audio frames. In embodiments, the in-ear device may determine whether the speaker is the user (i.e., the human wearing the in-ear device) or another individual. In these embodiments, the in-ear device may analyze composite audio signals received by the microphones or a directional microphone of the in-ear device to determine the direction from which the sound wave containing the speech was received. For example, if the sound wave is coming from inside the user (e.g., from the head/throat area of the user), the in-ear device may infer that the speaker is the user. In the case that the audio signal is coming from another direction, the in-ear device can infer that the speaker is someone other than the user. In embodiments, the in-ear device may be trained to recognize the speech of the user based on features of the user's voice, dialect, speech idiosyncrasies (e.g., user of prolonged "ums"). For example the audio signal can be broken into a spectrum plot, for example FFT spectrum of individual words, and compared to the spectrum accumulated by the user for that particular word to identify the user. For example, if the power spectral density (PSD) at a particular frequency of a word is within a standard deviation of at least 3 dB from the stored value, once the PSD plot (versus frequency) has been scaled, then the measured audio word is identified as the user. Scaling can take many forms, but basically the spoken word may be at different sound levels and to match a measured spoken word to a saved spectrum profile, the sound levels (e.g., dB) would need to be matched at one point (e.g., matching the levels at a frequency of 1 KHz) and then the other frequencies examined to see if the difference between the saved and measured spectrum (e.g., PSD) profile lie within the threshold (e.g., 0.1 to 10 dB standard Deviation). Additional methods can include averaging the PSD values for a narrowband FFT (e.g. 1024 frequencies) at select frequencies (e.g., reduced 64 frequencies with averaged PSD values of a bandwidth about those frequencies) then scaled. Note that values can be assigned to the comparison at center frequencies, for example a value of 1 for within SD and 0 without. So, for 64 frequencies the max score would be 64. A second threshold can be used to determine what level identifies a user, for example if the sum is >50 out of the 64.

At 1330, the in-ear device may determine a plurality of tokens based on the speech portion of the audio signal capturing the speech of the user. In embodiments, the in-ear device may analyze the speech portion of the audio signal capturing the speech spoken by the user to identify one or more tokens that correspond to the user's speech. The in-ear device may implement any suitable speech recognition process or processes when performing speech recognition on the speech portion of the audio signal. In embodiments, the in-ear device may detect a language of the speech portion. The language may be a known language of the user or may be detected based on a preliminary analysis of the speech portion of the audio signal and/or based on a setting of the user (e.g., a language setting of the user). In embodiments, the in-ear device may parse the speech portion of the audio signal to identify a sequence of phonemes. The in-ear device may determine potential utterances (e.g., words) based on the phonemes. In some implementations, the in-ear device generates various n-grams (unigrams, bi-grams, tri-grams, etc.) of sequential phonemes. The in-ear device may utilize one or more models (e.g., a Hidden Markov models) trained on a text corpus or "bag of words" to determine possible utterances based on the n-grams of phonemes. A model may output a most likely utterance or a list of most likely utterances given one or more n-grams of phonemes. In embodiments, the model may output tokens that represent the most likely utterance or utterances. In embodiments, the in-ear device may utilize the output tokens to generate a transcription of the speech portion of the audio signal based on a sequential processing of the speech portion of the audio signal. Additionally, or alternatively, the in-ear device may utilize the output tokens to generate a feature vector. A feature vector may contain the recognized tokens. The feature vector may contain additional data, such as a frequency of the speaker's voice, the magnitude (e.g., loudness) of the speaker's voice, the direction of travel of the audio signal, a best guess as to an identification of the speaker, contextual information relating to the speech (e.g., phone call v. in-person conversation, a time of day when the audio signal was captured, location data corresponding to where the audio signal was captured, the weather at the time the location was captured, an activity of the user at the time the audio signal was captured, etc.), and the like. The speech in-ear device may implement other processing techniques on the tokens.

At 1340, the in-ear device may generate an annotation object based on the plurality of tokens and a natural language processor. In embodiments, the in-ear device implements a natural language processor that is configured to perform natural language processing (NLP) on the recognized speech. In embodiments, the in-ear device analyzes the results speech recognition process to generate a data structure that represents an understanding or meaning of the recognized speech. The data structure that represents the understanding or meaning of the recognized speech may be referred to as an "annotation object." In some embodiments, an annotation object may include tokens and/or sequences of tokens, and relationships between the tokens and/or sequences of tokens. In embodiments, each token or sequence of tokens may be labeled and the label may be assigned a confidence score indicating a degree of confidence in the label assigned to the token or sequence of tokens. In embodiments, each relationship may be labeled and each label may by assigned a confidence score indicating a degree of confidence in the label of the relationship. In embodiments, an annotation object may be graph-like in structure, where the tokens or sequence of tokens may be represented as nodes and the relationships may be represented as edges connecting the nodes. Other suitable structures of an annotation object are also contemplated and within the scope of the disclosure. An annotation object may further include metadata relating to the annotation object. Examples of metadata in an annotation object may be a "best guess" as to an identification of the speaker and contextual information regarding the processed speech (e.g., phone call v. in-person conversation, a time of day when the audio signal was captured, location data corresponding to where the audio signal was captured, the weather at the time the location was captured, an activity of the user at the time the audio signal was captured, an identification of the speaker, etc.).

The in-ear device may implement one or more natural language processors to generate the annotation object. A natural language processor may implement machine-learning and/or other techniques to generate the annotation object. In embodiments, a natural language processor may parse the tokens resulting from the speech recognition and may tag tokens or sequences with parts of speech (e.g., noun, pronoun, verb, adjective, adverb, etc.). A natural language processor may utilize general tagging schemes or application-specific tagging schemes. A parts-of-speech tagger may employ rule sets to determine parts-of-speech tags or may use machine-learned models (e.g., neural networks) to determine the parts-of-speech tags. In embodiments, a natural language processor may employ semantic understanding techniques to apply labels to the tokens or sequence of tokens, which may or may not include parts-of-speech tags. Semantic understanding techniques may include entity recognition. Entity recognition may include comparing the token or sequence of tokens to an index (e.g., a knowledge graph) of known entities to determine whether a token or sequence of tokens corresponds to a known entity. In the case that the token or sequence of tokens corresponds to a known entity, the natural language processor may tag the token or sequence of tokens with an entity tag. Semantic understanding may further include labeling tokens or sequences of tokens and defining relationships between the tokens and/or sequences of tokens. In embodiments, a natural language processor may employ a machine-learned model (e.g., a neural network) to determine the labels and the relationships. For example, a neural network may receive a set of tokens and/or sequences of tokens (which may be tagged with parts-of-speech tags and/or entity tags) and may output labels for the tokens and/or sequences of tokens, as well as relationships between the tokens and/or sequences of tokens.

At 1350, the in-ear device may generate an in-ear data object based upon the annotation object.

At 1360, the in-ear device may determine a storage plan based on the annotation object. In embodiments, the in-ear device determines a storage plan for in-ear data relating to an event. A storage plan may define where the in-ear data relating to an event is to be stored. A storage plan may include one or more recommendations, where each recommendation defines a recommended storage location (or "location") at which the in-ear data is to be stored. In embodiments, in-ear data may be stored on the storage of the in-ear device, at a user device associated with the in-ear device, at a data publishing system associated with the in-ear device, a data analytics system, or other suitable systems (e.g., a dedicated cloud storage system). In an example, a determined storage plan relating to non-private in-ear data may cause the non-private data to be published to and stored at a data publishing system and/or analytics system. In another example, a determined storage plan relating to in-ear data corresponding to user instructions (e.g., an instruction to store a voice note) may cause the in-ear data to be stored on the in-ear device or at a user device associated with the user of the in-ear device.

In embodiments, the in-ear device employs machine learning to improve storage on the in-ear device. The in-ear device may be configured to determine a storage plan based on one or more annotation object and a machine-learned decision model. In this way, the in-ear device can determine whether in-ear data can be discarded, stored on the in-ear device, stored on a user device associated with the user, and/or transmitted to an external system. In embodiments, the in-ear device may be configured to determine the storage plan based on the features of a speech portion of the audio signal. In embodiments, the machine-learned decision model may output one or more locations at which in-ear data corresponding to the audio signal can be stored in response to the inputted features. For each device or system on which in-ear data may be stored, the machine-model may output a respective confidence score corresponding to the location that indicates a degree of confidence that the model has in the location as an appropriate storage location for the in-ear data. The in-ear device may utilize the outputted confidence scores to determine the storage plan. For example, the in-ear device may include any location having a confidence score greater than a threshold (e.g., ≥0.9) in the storage plan. In some implementations, the in-ear device can determine that an instance of in-ear data should be discarded if none of the confidence scores exceed a threshold. For example, if the audio signal captures random speech that is inconsequential (e.g., a random person speaking in the background noise), the in-ear device may determine that the in-ear data relating to the event is to be discarded.

In embodiments, the in-ear device may input a feature vector containing features of a speech portion of an audio signal into a machine-learned decision model that is trained to optimize storage. The features may be the tokens that are recognized from a speech portion of an audio signal, one or more sound signatures that are determined based on the speech portion of the audio signal, and/or data from an annotation object derived from the speech portion of the audio signal. In embodiments, the in-ear device may further input additional features, such as one or more biometric features derived from sensor data received from the sensors of the in-ear device, a geolocation of the user, and/or a time of day, into the machine-learned decision model. In embodiments, the machine-learned decision model may be a model trained using data of any number of individual users. In these embodiments, the recommendations output by the decision model are based on the data collected from the collection of individual users. In embodiments, the machine-learned model may be personalized for the user, where the decision model is initially trained using training data obtained from any number of users and is reinforced using feedback from the user. In these embodiments, the machine-learned decision model may learn preferences of the user based on feedback received therefrom. In response to receiving the features of a speech portion of the audio signal and/or any other additional features, the machine-learned model may output confidence scores relating to each potential storage location. The in-ear device may utilize the outputted confidence scores to determine the storage plan. For example, the in-ear device may include any location having a confidence score greater than a threshold (e.g., ≥0.9) in the storage plan.

In embodiments, the machine-learned decision model may be trained to identify personal, sensitive, or otherwise private data. In these embodiments, the machine-learned decision model may be trained to bias recommendations of private data towards storage on the in-ear device and/or the user device associated with the user, as opposed to external systems that utilize the data for purposes other than merely remote storage.

Figure 14:
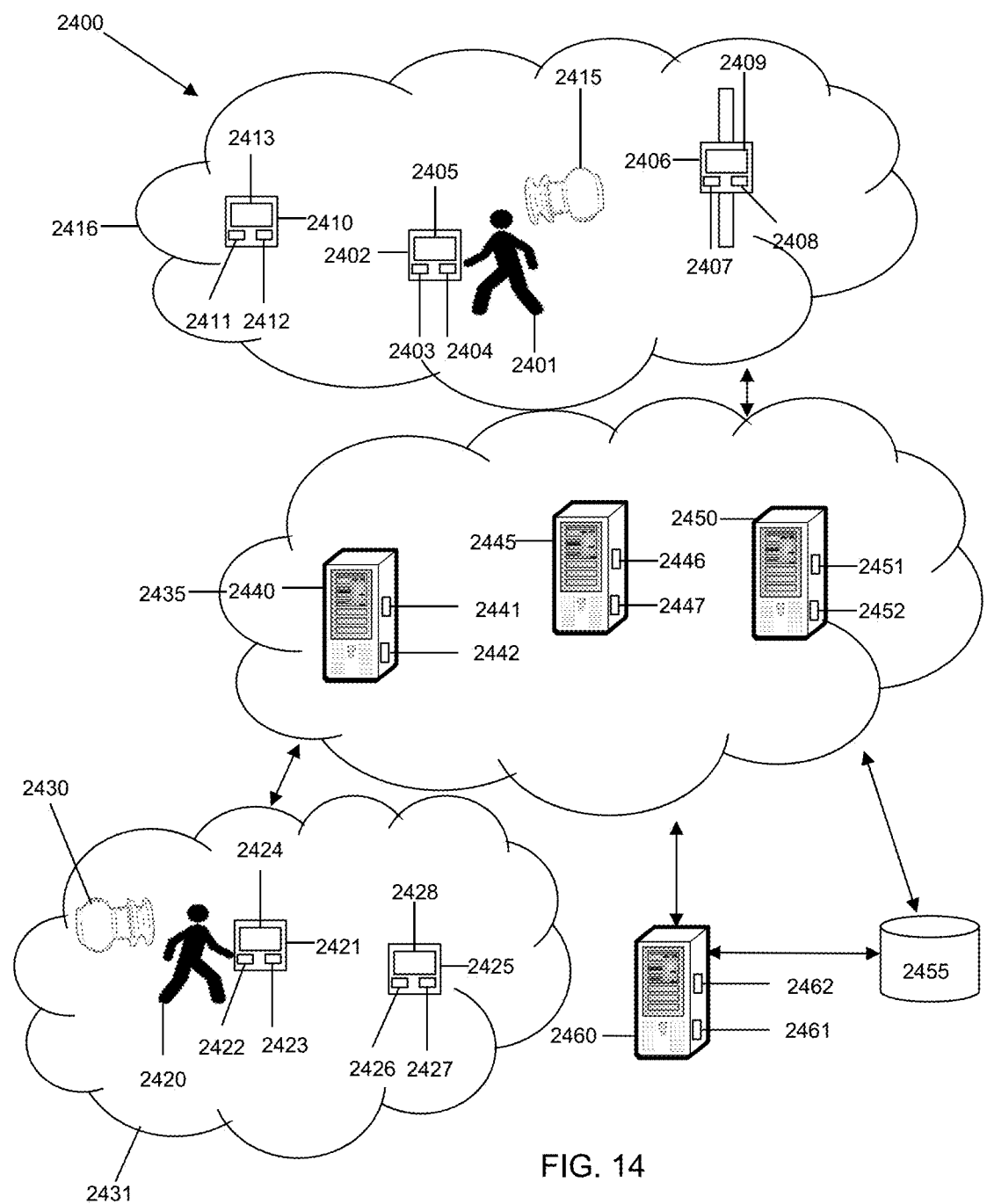
FIG. 14 is a schematic diagram of a system for utilizing earphones according to an embodiment of the present disclosure.

As shown in FIG. 14, a system 2400 and methods for utilizing eartips and/or earphone and in-ear devices are disclosed.

The system 2400 may be configured to support, but is not limited to supporting, data and content services, audio processing applications and services, audio output and/or input applications and services, applications and services for transmitting and receiving audio content, authentication applications and services, computing applications and services, cloud computing services, internet services, satellite services, telephone services, software as a service (SaaS) applications, platform-as-a-service (PaaS) applications, gaming applications and services, social media applications and services, productivity applications and services, voice-over-internet protocol (VoIP) applications and services, speech-to-text translation applications and services, interactive voice applications and services, mobile applications and services, and any other computing applications and services. The system may include a first user 2401, who may utilize a first user device 2402 to access data, content, and applications, or to perform a variety of other tasks and functions. As an example, the first user 2401 may utilize first user device 2402 to access an application (e.g. a browser or a mobile application) executing on the first user device 2402 that may be utilized to access web pages, data, and content associated with the system 2400. In certain embodiments, the first user 2401 may be any type of user that may potentially desire to listen to audio content, such as from, but not limited to, a music playlist accessible via the first user device 2402, a telephone call that the first user 2401 is participating in, audio content occurring in an environment in proximity to the first user 2401, any other type of audio content, or a combination thereof. For example, the first user 2401 may be an individual that may be participating in a telephone call with another user, such as second user 2420.

The first user device 2402 utilized by the first user 2401 may include a memory 2403 that includes instructions, and a processor 2404 that executes the instructions from the memory 2403 to perform the various operations that are performed by the first user device 2402. In certain embodiments, the processor 2404 may be hardware, software, or a combination thereof. The first user device 2402 may also include an interface 2405 (e.g. screen, monitor, graphical user interface, etc.) that may enable the first user 2401 to interact with various applications executing on the first user device 2402, to interact with various applications executing within the system 2400, and to interact with the system 2400 itself. In certain embodiments, the first user device 2402 may include any number of transducers, such as, but not limited to, microphones, speakers, any type of audio-based transducer, any type of transducer, or a combination thereof. In certain embodiments, the first user device 2402 may be a computer, a laptop, a tablet device, a phablet, a server, a mobile device, a smartphone, a smart watch, and/or any other type of computing device. Illustratively, the first user device 2402 is shown as a mobile device in FIG. 14. The first user device 2402 may also include a global positioning system (GPS), which may include a GPS receiver and any other necessary components for enabling GPS functionality, accelerometers, gyroscopes, sensors, and any other componentry suitable for a mobile device.

In addition to using first user device 2402, the first user 2401 may also utilize and/or have access to a second user device 2406 and a third user device 2410. As with first user device 2402, the first user 2401 may utilize the second and third user devices 2406, 2410 to transmit signals to access various online services and content. The second user device 2406 may include a memory 2407 that includes instructions, and a processor 2408 that executes the instructions from the memory 2407 to perform the various operations that are performed by the second user device 2406. In certain embodiments, the processor 2408 may be hardware, software, or a combination thereof. The second user device 2406 may also include an interface 2409 that may enable the first user 2401 to interact with various applications executing on the second user device 2406 and to interact with the system

2400. In certain embodiments, the second user device 2406 may include any number of transducers, such as, but not limited to, microphones, speakers, any type of audio-based transducer, any type of transducer, or a combination thereof. In certain embodiments, the second user device 2406 may be and/or may include a computer, any type of sensor, a laptop, a set-top-box, a tablet device, a phablet, a server, a mobile device, a smartphone, a smart watch, and/or any other type of computing device. Illustratively, the second user device 2402 is shown as a smart watch device in FIG. 14.

The third user device 2410 may include a memory 2411 that includes instructions, and a processor 2412 that executes the instructions from the memory 2411 to perform the various operations that are performed by the third user device 2410. In certain embodiments, the processor 2412 may be hardware, software, or a combination thereof. The third user device 2410 may also include an interface 2413 that may enable the first user 2401 to interact with various applications executing on the second user device 2406 and to interact with the system 2400. In certain embodiments, the third user device 2410 may include any number of transducers, such as, but not limited to, microphones, speakers, any type of audio-based transducer, any type of transducer, or a combination thereof. In certain embodiments, the third user device 2410 may be and/or may include a computer, any type of sensor, a laptop, a set-top-box, a tablet device, a phablet, a server, a mobile device, a smartphone, a smart watch, and/or any other type of computing device. Illustratively, the third user device 2410 is shown as a smart watch device in FIG. 14.

The first, second, and/or third user devices 2402, 2406, 2410 may belong to and/or form a communications network 2416. In certain embodiments, the communications network 2416 may be a local, mesh, or other network that facilitates communications among the first, second, and/or third user devices 2402, 2406, 2410 and/or any other devices, programs, and/or networks of system 2400 or outside system 2400. In certain embodiments, the communications network 2416 may be formed between the first, second, and third user devices 2402, 2406, 2410 through the use of any type of wireless or other protocol and/or technology. For example, the first, second, and third user devices 2402, 2406, 2410 may communicate with one another in the communications network 2416, such as by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2416 may be configured to communicatively link with and/or communicate with any other network of the system 2400 and/or outside the system 2400.

The system 2400 may also include an earphone device 2415, which the first user 2401 may utilize to hear and/or audition audio content, transmit audio content, receive audio content, experience any type of content, process audio content, adjust audio content, store audio content, perform any type of operation with respect to audio content, or a combination thereof. The earphone device 2415 may be an earpiece, a hearing aid, an ear monitor, an ear terminal, a behind-the-ear device, any type of acoustic device, or a combination thereof. The earphone device 2415 may include any type of component utilized for any type of earpiece. In certain embodiments, the earphone device 2415 may include any number of ambient sound microphones that may be configured to capture and/or measure ambient sounds and/or audio content occurring in an environment that the earphone device 2415 is present in and/or is proximate to. In certain embodiments, the ambient sound microphones may be placed at a location or locations on the earphone device 2415 that are conducive to capturing and measuring ambient sounds occurring in the environment. For example, the ambient sound microphones may be positioned in proximity to a distal end (e.g. the end of the earphone device 2415 that is not inserted into the first user's 2401 ear) of the earphone device 2415 such that the ambient sound microphones are in an optimal position to capture ambient or other sounds occurring in the environment. In certain embodiments, the earphone device 2415 may include any number of ear canal microphones, which may be configured to capture and/or measure sounds occurring in an ear canal of the first user 2401 or other user wearing the earphone device 2415. In certain embodiments, the ear canal microphones may be positioned in proximity to a proximal end (e.g. the end of the earphone device 2415 that is inserted into the first user's 2401 ear) of the earphone device 2415 such that sounds occurring in the ear canal of the first user 2401 may be captured more readily.

The earphone device 2415 may also include any number of transceivers, which may be configured transmit signals to and/or receive signals from any of the devices in the system 2400. In certain embodiments, a transceiver of the earphone device 2415 may facilitate wireless connections and/or transmissions between the earphone device 2415 and any device in the system 2400, such as, but not limited to, the first user device 2402, the second user device 2406, the third user device 2410, the fourth user device 2421, the fifth user device 2425, the earphone device 2430, the servers 2440, 2445, 2450, 2460, and the database 2455. The earphone device 2415 may also include any number of memories for storing content and/or instructions, processors that execute the instructions from the memories to perform the operations for the earphone device 2415, and/or any type integrated circuit for facilitating the operation of the earphone device 2415. In certain embodiments, the processors may comprise, hardware, software, or a combination of hardware and software. The earphone device 2415 may also include one or more ear canal receivers, which may be speakers for outputting sound into the ear canal of the first user 2401. The ear canal receivers may output sounds obtained via the ear canal microphones, ambient sound microphones, any of the devices in the system 2400, from a storage device of the earphone device 2415, or any combination thereof.

The ear canal receivers, ear canal microphones, transceivers, memories, processors, integrated circuits, and/or ear canal receivers may be affixed to an electronics package that includes a flexible electronics board. The earphone device 2415 may include an electronics packaging housing that may house the ambient sound microphones, ear canal microphones, ear canal receivers (i.e. speakers), electronics supporting the functionality of the microphones and/or receivers, transceivers for receiving and/or transmitting signals, power sources (e.g. batteries and the like), any circuitry facilitating the operation of the earphone device 2415, or any combination thereof. The electronics package including the flexible electronics board may be housed within the electronics packaging housing to form an electronics packaging unit. The earphone device 2415 may further include an earphone housing, which may include receptacles, openings, and/or keyed recesses for connecting the earphone housing to the electronics packaging housing and/or the electronics package. For example, nozzles of the electronics packaging housing may be inserted into one or more keyed recesses of the earphone housing so as to connect and secure the earphone housing to the electronics packaging housing. When the earphone housing is connected to the electronics packaging housing, the combination of the earphone housing and the electronics packaging housing may form the earphone device 2415. The earphone device 2415 may further include a cap for securing the electronics packaging housing, the earphone housing, and the electronics package together to form the earphone device 2415.

In certain embodiments, the earphone device 2415 may be configured to have any number of changeable tips, which may be utilized to facilitate the insertion of the earphone device 2415 into an ear aperture of an ear of the first user 2401, secure the earphone device 2415 within the ear canal of an ear of the first user 2401, and/or to isolate sound within the ear canal of the first user 2401. The tips may be foam tips, which may be affixed onto an end of the earphone housing of the earphone device 2415, such as onto a stent and/or attachment mechanism of the earphone housing. In certain embodiments, the tips may be any type of eartip as disclosed and described in the present disclosure. The eartips as disclosed in the present disclosure may be configured to facilitate distributed reduced contact force, sound isolation for sound in the ear canal of the first user 2401 (i.e. between the ambient environment and the ear canal environment within an ear of the first user 2401), mold into a variety of forms and/or positions, encapsulate volumes upon insertion into an ear aperture of the first user 2401, have a pressure adjusting design, facilitate notched stent retention (i.e. on a stent of the earphone housing), facilitate stent insertion into an ear canal of the first user 2401 via an ear aperture of the first user 2401, or any combination thereof. In certain embodiments, the eartip may be designed to provide sound isolation capability that is at least as effective as conventional foam and/or flange tips. Notably, the eartips may be manufactured and configured to be made in any desired size specifications and/or materials, and may be tailored to each individual user, such as first user 2401. In contrast to conventional foam or flange tips, an eartip according to the present disclosure may be adjusted for size without having to substitute the eartip with another eartip, may have an EPA NRR rating of NRR=18, may have a unique flatter high frequency attenuation profile so as to maintain audio quality, may have ease of manufacturability, and may be designed to distribute contact force and minimize radial force against a user's ear canal walls when positioned in a user's ear canal. Additionally, an eartip according to the present disclosure may be made of a non-porous material that is not closed cell foam or open cell foam.

In certain embodiments, the eartip may be designed so that the earphone device's 2415 retention force on the ear canal walls of the first user 2401 may be distributed over a larger area than traditional foam or flange tips allow, thereby reducing the pressure on the ear canal walls of the first user 2401. Unlike foam tips, which primarily provide a restoring radial force that exerts pressure against the ear canal walls of a user, the eartip is designed to move both radially and axially, which allows for more give and redistribution of contact over a larger area, and, thus, decreases the retention pressure. As a result, this allows for increased comfort for the user and allows the user to utilize the eartip for an extended period of time when compared to traditional foam and/or flange tips. In certain embodiments, the eartip utilized with the earphone device 2415 may be configured to encapsulate a volume of gas and/or liquid. In either case (i.e. gas or liquid), the bulk of sound isolation provided by the eartip is achieved through the reflection of ambient sound waves so that the encapsulated volume can be low mass. In certain embodiments, portions of the eartip may encapsulate a volume with the ability to release volume when pressed upon without having to incorporate complicated valves. The encapsulated volume may be achieved by the ear canal wall pressing radially and/or axially against the outer surfaces of the eartip, which may force the outer portion of the eartip to seal with the inner portion of the eartip. In certain embodiments, the inner portion of the eartip may be small than the outer diameter of the stent of the earphone housing upon which the eartip is placed so that upon insertion of the eartip on the stent, the inner portion stretches outward to meet the outer surface of the eartip, which further facilitates the sealing of the ear canal of the first user 2401.

In certain embodiments, the stent of the eartip, over which the eartip is placed, may be designed to have a smaller diameter front end and a larger diameter middle section to promote retention of the eartip on the stent itself. In certain embodiments, a portion of the eartip may have an inner core diameter that is smaller than the stent outer diameter so that the eartip provides radial compression upon the stent so as to enhance sealing and to add friction to prevent axial slippage within the ear canal of the first user 2401. In certain embodiments, an increased mid-section inner core diameter of the eartip may be utilized (i.e. larger than the smaller inner core diameter of the eartip), which may be configured to line up with the mid-section outer diameter of the stent of the earphone housing of the earphone device 2415. This may provide axial stability for the earphone device 2415, while simultaneously preventing axial slippage from the ear canal of the first user 2401. In certain embodiments, the eartip may have an insertion end that has a funnel shape, which aids in inserting the eartip onto the stent of the earphone housing of the earphone device 2415.

In certain embodiments, the eartip has a configuration that applies minimal force against the first user's 2401 ear canal. Additionally, the eartip can seal the first user's 2401 ear canal by providing at least 15 dB of attenuation across frequency. To facilitate manufacturability, the eartip may be molded inverted, thereby allowing inexpensive mass production. Lips of the eartip may then be folded to contact ledges to for the eartip that may be utilized by the first user 2401. Sealing and comfort depend upon an accurate fit within the first user's 2401 ear canal, and, as a result, eartips according to the present disclosure may be manufactured in several single sizes, and, because of the unique design of the eartips, a single eartip may be adjusted to fit multiple sizes, which minimizes manufacturing costs, while allowing for more flexibility, versatility, and for a greater number of sizes for the eartip. Notably, any of the features of any of the eartips described in the present disclosure may be combined and/or interchanged with any other eartips described in the present disclosure. Furthermore, the shape, size, features and/or functionality of any of the components of the earphone device and/or hearbud housing device described in the present disclosure may be modified for each particular user for the shape and size of each user's ear aperture and/or ear canal, or a combination thereof.

Notably, in experiments conducted using the eartip, the experiments have shown that the eartip allows for similar levels of sound isolation when compared to conventional foam and/or flange tips. For example, experiments have shown that the eartips provided in the present disclosure provided a NRR of 18 with a generally flat high frequency profile. A flat attenuation profile maintains an ambient environment's frequency profile when level reduced by the attenuation, which can be useful in maintaining the quality of ambient speech and music (or other audio content) during the level reduction process.

In further embodiments, the eartip may be configured to have an open configuration prior to insertion onto a stent of the earphone housing and/or the earphone device 2415 itself. By having an open configuration, the eartip may be mass produced using conventional molding techniques and/or by utilizing 3D commercial printers. The open configuration of the eartip also facilitates molding, and can be 3D printed, where the open configuration allows for resin removal. For example, resin removal may be achieved by utilizing commercial 3D printers that allow the use of lower durometer materials, such as Stratasys machines and the like. In certain embodiments, since the eartip has an open configuration, which is then sealed, any additional pressure can force encapsulated gas out of the eartip relieving the feedback pressure so as to keep the comfort level for the first user 2401 relatively stable.

In addition to the first user 2401, the system 2400 may include a second user 2420, who may utilize a fourth user device 2421 to access data, content, and applications, or to perform a variety of other tasks and functions. Much like the first user 2401, the second user 2420 may be may be any type of user that may potentially desire to listen to audio content, such as from, but not limited to, a storage device of the fourth user device 2421, a telephone call that the second user 2420 is participating in, audio content occurring in an environment in proximity to the second user 2420, any other type of audio content, or a combination thereof. For example, the second user 2420 may be an individual that may be listening to songs stored in a playlist that resides on the fourth user device 2421. Also, much like the first user 2401, the second user 2420 may utilize fourth user device 2421 to access an application (e.g. a browser or a mobile application) executing on the fourth user device 2421 that may be utilized to access web pages, data, and content associated with the system 2400. The fourth user device 2421 may include a memory 2422 that includes instructions, and a processor 2423 that executes the instructions from the memory 2422 to perform the various operations that are performed by the fourth user device 2421. In certain embodiments, the processor 2423 may be hardware, software, or a combination thereof. The fourth user device 2421 may also include an interface 2424 (e.g. a screen, a monitor, a graphical user interface, etc.) that may enable the second user 2420 to interact with various applications executing on the fourth user device 2421, to interact with various applications executing in the system 2400, and to interact with the system 2400. In certain embodiments, the fourth user device 2421 may include any number of transducers, such as, but not limited to, microphones, speakers, any type of audio-based transducer, any type of transducer, or a combination thereof. In certain embodiments, the fourth user device 2421 may be a computer, a laptop, a tablet device, a phablet, a server, a mobile device, a smartphone, a smart watch, and/or any other type of computing device. Illustratively, the fourth user device 2421 may be a computing device in FIG. 14. The fourth user device 2421 may also include any of the componentry described for first user device 2402, the second user device 2406, and/or the third user device 2410. In certain embodiments, the fourth user device 2421 may also include a global positioning system (GPS), which may include a GPS receiver and any other necessary components for enabling GPS functionality, accelerometers, gyroscopes, sensors, and any other componentry suitable for a computing device.

In addition to using fourth user device 2421, the second user 2420 may also utilize and/or have access to a fifth user device 2425. As with fourth user device 2421, the second user 2420 may utilize the fourth and fifth user devices 2421, 2425 to transmit signals to access various online services and content. The fifth user device 2425 may include a memory 2426 that includes instructions, and a processor 2427 that executes the instructions from the memory 2426 to perform the various operations that are performed by the fifth user device 2425. In certain embodiments, the processor 2427 may be hardware, software, or a combination thereof. The fifth user device 2425 may also include an interface 2428 that may enable the second user 2420 to interact with various applications executing on the fifth user device 2425 and to interact with the system 2400. In certain embodiments, the fifth user device 2425 may include any number of transducers, such as, but not limited to, microphones, speakers, any type of audio-based transducer, any type of transducer, or a combination thereof. In certain embodiments, the fifth user device 2425 may be and/or may include a computer, any type of sensor, a laptop, a set-top-box, a tablet device, a phablet, a server, a mobile device, a smartphone, a smart watch, and/or any other type of computing device. Illustratively, the fifth user device 2425 is shown as a tablet device in FIG. 14.

The fourth and fifth user devices 2421, 2425 may belong to and/or form a communications network 2431. In certain embodiments, the communications network 2431 may be a local, mesh, or other network that facilitates communications between the fourth and fifth user devices 2421, 2425, and/or any other devices, programs, and/or networks of system 2400 or outside system 2400. In certain embodiments, the communications network 2431 may be formed between the fourth and fifth user devices 2421, 2425 through the use of any type of wireless or other protocol and/or technology. For example, the fourth and fifth user devices 2421, 2425 may communicate with one another in the communications network 2416, such as by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2431 may be configured to communicatively link with and/or communicate with any other network of the system 2400 and/or outside the system 2400.

Much like first user 2401, the second user 2420 may have his or her own earphone device 2430. The earphone device 2430 may be utilized by the second user 2420 to hear and/or audition audio content, transmit audio content, receive audio content, experience any type of content, process audio content, adjust audio content, store audio content, perform any type of operation with respect to audio content, or a combination thereof. The earphone device 2430 may be an earpiece, a hearing aid, an ear monitor, an ear terminal, a behind-the-ear device, any type of acoustic device, or a combination thereof. The earphone device 2430 may include any type of component utilized for any type of earpiece, and may include any of the features, functionality and/or components described and/or usable with earphone device 2415. For example, earphone device 2430 may include any number of transceivers, ear canal microphones, ambient sound microphones, processors, memories, housings, eartips, foam tips, flanges, any other component, or any combination thereof.

In certain embodiments, the first, second, third, fourth, and/or fifth user devices 2402, 2406, 2410, 2421, 2425 and/or earphone devices 2415, 2430 may have any number of software applications and/or application services stored and/or accessible thereon. For example, the first and second user devices 2402, 2411 may include applications for processing audio content, applications for playing, editing, transmitting, and/or receiving audio content, streaming media applications, speech-to-text translation applications, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 2401, 2420 to readily interact with the software applications. The software applications and services may also be utilized by the first and second users 2401, 2420 to interact with any device in the system 2400, any network in the system 2400 (e.g. communications networks 2416, 2431, 2435), or any combination thereof. For example, the software applications executing on the first, second, third, fourth, and/or fifth user devices 2402, 2406, 2410, 2421, 2425 and/or earphone devices 2415, 2430 may be applications for receiving data, applications for storing data, applications for auditioning, editing, storing and/or processing audio content, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first, second, third, fourth, and/or fifth user devices 2402, 2406, 2410, 2421, 2425 and/or earphone devices 2415, 2430 may include associated telephone numbers, internet protocol addresses, device identities, or any other identifiers to uniquely identify the first, second, third, fourth, and/or fifth user devices 2402, 2406, 2410, 2421, 2425 and/or earphone devices 2415, 2430 and/or the first and second users 2401, 2420. In certain embodiments, location information corresponding to the first, second, third, fourth, and/or fifth user devices 2402, 2406, 2410, 2421, 2425 and/or earphone devices 2415, 2430 may be obtained based on the internet protocol addresses, by receiving a signal from the first, second, third, fourth, and/or fifth user devices 2402, 2406, 2410, 2421, 2425 and/or earphone devices 2415, 2430 or based on profile information corresponding to the first, second, third, fourth, and/or fifth user devices 2402, 2406, 2410, 2421, 2425 and/or earphone devices 2415, 2430.

The system 2400 may also include a communications network 2435. The communications network 2435 may be under the control of a service provider, the first and/or second users 2401, 2420, any other designated user, or a combination thereof. The communications network 2435 of the system 2400 may be configured to link each of the devices in the system 2400 to one another. For example, the communications network 2435 may be utilized by the first user device 2402 to connect with other devices within or outside communications network 2435. Additionally, the communications network 2435 may be configured to transmit, generate, and receive any information and data traversing the system 2400. In certain embodiments, the communications network 2435 may include any number of servers, databases, or other componentry. The communications network 2435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 2440, 2445, and 2450 are shown as being included within communications network 2435. In certain embodiments, the communications network 2435 may be part of a single autonomous system that is located in a particular geographic region, or be part of multiple autonomous systems that span several geographic regions.

Notably, the functionality of the system 2400 may be supported and executed by using any combination of the servers 2440, 2445, 2450, and 2460. The servers 2440, 2445, and 2450 may reside in communications network 2435, however, in certain embodiments, the servers 2440, 2445, 2450 may reside outside communications network 2435. The servers 2440, 2445, and 2450 may provide and serve as a server service that performs the various operations and functions provided by the system 2400. In certain embodiments, the server 2440 may include a memory 2441 that includes instructions, and a processor 2442 that executes the instructions from the memory 2441 to perform various operations that are performed by the server 2440. The processor 2442 may be hardware, software, or a combination thereof. Similarly, the server 2445 may include a memory 2446 that includes instructions, and a processor 2447 that executes the instructions from the memory 2446 to perform the various operations that are performed by the server 2445. Furthermore, the server 2450 may include a memory 2451 that includes instructions, and a processor 2452 that executes the instructions from the memory 2451 to perform the various operations that are performed by the server 2450. In certain embodiments, the servers 2440, 2445, 2450, and 2460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 2440, 2445, 2450 may be communicatively linked to the communications network 2435, the communications network 2416, the communications network 2431, any network, any device in the system 2400, any program in the system 2400, or any combination thereof.

The database 2455 of the system 2400 may be utilized to store and relay information that traverses the system 2400, cache content that traverses the system 2400, store data about each of the devices in the system 2400 and perform any other typical functions of a database. In certain embodiments, the database 2455 may be connected to or reside within the communications network 2435, the communications network 2416, the communications network 2431, any other network, or a combination thereof. In certain embodiments, the database 2455 may serve as a central repository for any information associated with any of the devices and information associated with the system 2400. Furthermore, the database 2455 may include a processor and memory or be connected to a processor and memory to perform the various operation associated with the database 2455. In certain embodiments, the database 2455 may be connected to the earphone devices 2415, 2430, the servers 2440, 2445, 2450, 2460, the first user device 2402, the second user device 2406, the third user device 2410, the fourth user device 2421, the fifth user device 2425, any devices in the system 2400, any other device, any network, or any combination thereof.

The database 2455 may also store information and metadata obtained from the system 2400, store metadata and other information associated with the first and second users 2401, 2420, store user profiles associated with the first and second users 2401, 2420, store device profiles associated with any device in the system 2400, store communications traversing the system 2400, store user preferences, store information associated with any device or signal in the system 2400, store information relating to patterns of usage relating to the first, second, third, fourth, and fifth user devices 2402, 2406, 2410, 2421, 2425, store audio content associated with the first, second, third, fourth, and fifth user devices 2402, 2406, 2410, 2421, 2425 and/or earphone devices 2415, 2430, store audio content and/or information associated with the audio content that is captured by the ambient sound microphones, store audio content and/or information associated with audio content that is captured by ear canal microphones, store any information obtained from any of the networks in the system 2400, store audio content and/or information associated with audio content that is outputted by ear canal receivers of the system 2400, store any information and/or signals transmitted and/or received by transceivers of the system 2400, store any device and/or capability specifications relating to the earphone devices 2415, 2430, store historical data associated with the first and second users 2401, 2415, store information relating to the size (e.g. depth, height, width, curvatures, etc.) and/or shape of the first and/or second user's 2401, 2420 ear canals and/or ears, store information identifying and or describing any eartip utilized with the earphone devices 2401, 2415, store device characteristics for any of the devices in the system 2400, store information relating to any devices associated with the first and second users 2401, 2420, store any information associated with the earphone devices 2415, 2430, store log on sequences and/or authentication information for accessing any of the devices of the system 2400, store information associated with the communications networks 2416, 2431, store any information generated and/or processed by the system 2400, store any of the information disclosed for any of the operations and functions disclosed for the system 2400 herewith, store any information traversing the system 2400, or any combination thereof. Furthermore, the database 2455 may be configured to process queries sent to it by any device in the system 2400.

The system 2400 may also include a software application, which may be configured to perform and support the operative functions of the system 2400, such as the operative functions of the first, second, third, fourth, and fifth user devices 2402, 2406, 2410, 2421, 2425 and/or the earphone devices 2415, 2430. In certain embodiments, the application may be a website, a mobile application, a software application, or a combination thereof, which may be made accessible to users utilizing one or more computing devices, such as the first, second, third, fourth, and fifth user devices 2402, 2406, 2410, 2421, 2425 and/or the earphone devices 2415, 2430. The application of the system 2400 may be accessible via an internet connection established with a browser program or other application executing on the first, second, third, fourth, and fifth user devices 2402, 2406, 2410, 2421, 2425 and/or the earphone devices 2415, 2430, a mobile application executing on the first, second, third, fourth, and fifth user devices 2402, 2406, 2410, 2421, 2425 and/or the earphone devices 2415, 2430, or through other suitable means. Additionally, the application may allow users and computing devices to create accounts with the application and sign-in to the created accounts with authenticating username and password log-in combinations. The application may include a custom graphical user interface that the first user 2401 or second user 2420 may interact with by utilizing a browser executing on the first, second, third, fourth, and fifth user devices 2402, 2406, 2410, 2421, 2425 and/or the earphone devices 2415, 2430. In certain embodiments, the software application may execute directly as an installed program on the first, second, third, fourth, and fifth user devices 2402, 2406, 2410, 2421, 2425 and/or the earphone devices 2415, 2430.

Computing System for Facilitating the Operation and Functionality of the System

Figure 15:
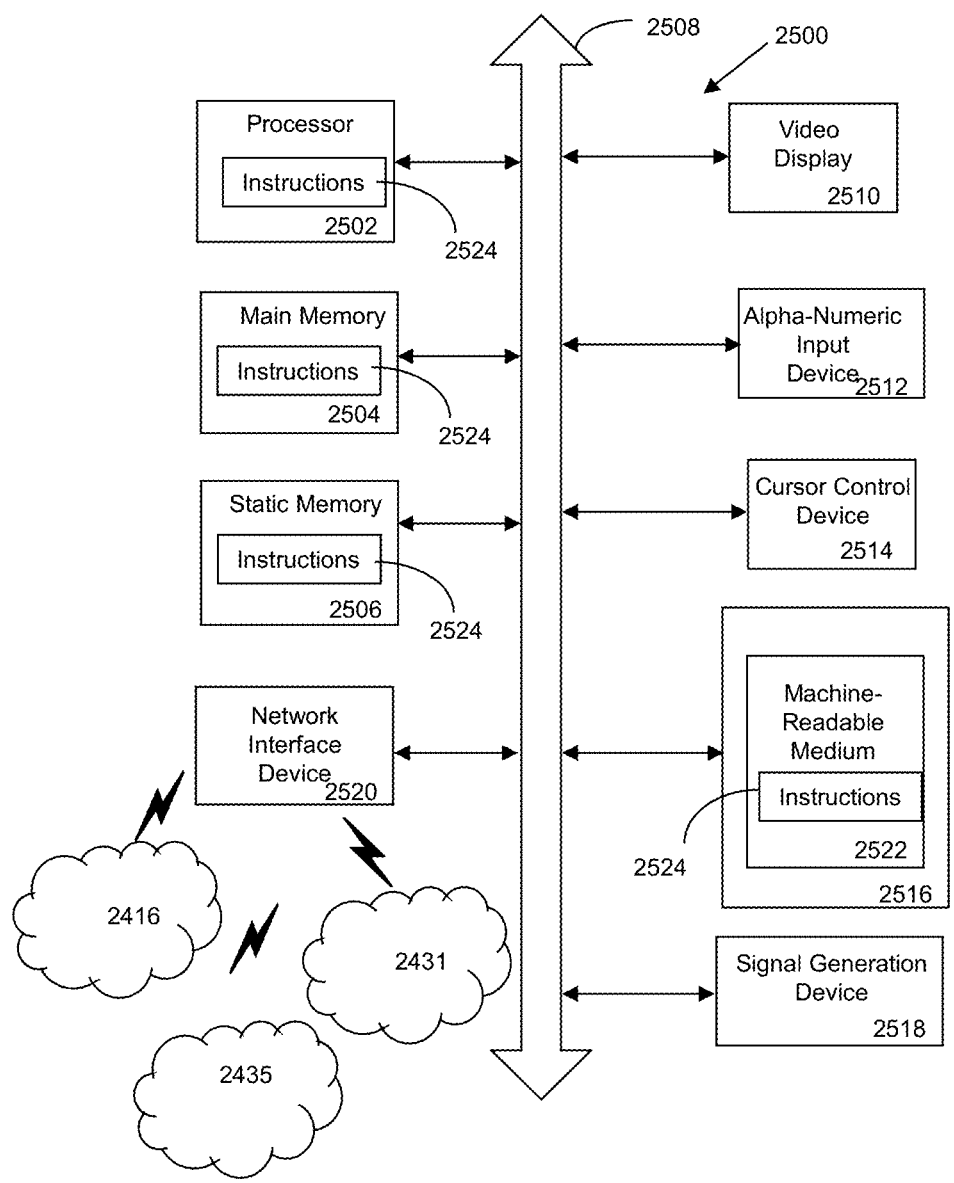
FIG. 15 is a schematic diagram of a machine in the form of a computer system which a set of instructions, when executed, may cause the machine to perform any one or more of the methodologies or operations of the systems and methods for utilizing an earphone according to embodiments of the present disclosure.

Referring now also to FIG. 15, at least a portion of the methodologies and techniques described with respect to the exemplary embodiments of the system 2400 can incorporate a machine, such as, but not limited to, computer system 2500, or other computing device within which a set of instructions, when executed, may cause the machine to perform any one or more of the methodologies or functions discussed above. The machine may be configured to facilitate various operations conducted by the system 2400. For example, the machine may be configured to, but is not limited to, assist the system 2400 by providing processing power to assist with processing loads experienced in the system 2400, by providing storage capacity for storing instructions or data traversing the system 2400, by providing functionality and/or programs for facilitating the operative functionality of the earphone devices 2415, 2430, and/or the first, second, third, fourth, and fifth user devices 2402, 2406, 2410, 2421, 2425 and/or the earphone devices 2415, 2430, by providing functionality and/or programs for facilitating operation of any of the components of the earphone devices 2415, 2430 (e.g. ear canal receivers, transceivers, ear canal microphones, ambient sound microphones, or by assisting with any other operations conducted by or within the system 2400.

In some embodiments, the machine may operate as a standalone device. In some embodiments, the machine may be connected (e.g., using communications network 2435, the communications network 2416, the communications network 2431, another network, or a combination thereof) to and assist with operations performed by other machines and systems, such as, but not limited to, the first user device 2402, the second user device 2411, the third user device 2410, the fourth user device 2421, the fifth user device 2425, the earphone device 2415, the earphone device 2430, the server 2440, the server 2450, the database 2455, the server 2460, or any combination thereof. The machine may be connected with any component in the system 2400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU, or both), a main memory 2504 and a static memory 2506, which communicate with each other via a bus 2508. The computer system 2500 may further include a video display unit 2510, which may be, but is not limited to, a liquid crystal display (LCD), a flat panel, a solid state display, or a cathode ray tube (CRT). The computer system 2500 may include an input device 2512, such as, but not limited to, a keyboard, a cursor control device 2514, such as, but not limited to, a mouse, a disk drive unit 2516, a signal generation device 2518, such as, but not limited to, a speaker or remote control, and a network interface device 2520.

The disk drive unit 2516 may include a machine-readable medium 2522 on which is stored one or more sets of instructions 2524, such as, but not limited to, software embodying any one or more of the methodologies or functions described herein, including those methods illustrated above. The instructions 2524 may also reside, completely or at least partially, within the main memory 2504, the static memory 2506, or within the processor 2502, or a combination thereof, during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2522 containing instructions 2524 so that a device connected to the communications network 2435, the communications network 2416, the communications network 2431, another network, or a combination thereof, can send or receive voice, video or data, and communicate over the communications network 2435, the communications network 2416, the communications network 2431, another network, or a combination thereof, using the instructions. The instructions 2524 may further be transmitted or received over the communications network 2435, another network, or a combination thereof, via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

What is claimed is:

1. A method of storing audio and matched biometric data remotely comprising:
    receiving an ambient audio signal from an ambient microphone of an in-ear device;
    receiving an internal audio signal from an ear canal microphone of the in-ear device;
    receiving non motion biometric data from a biometric sensor in the in-ear device;
    receiving a motion based biometric data from a second biometric sensor in the in-ear device;
    extracting a set of features from the ambient audio signal that correspond to a user of the in-ear device;
    generating a feature vector from the set of features whose usage frequency occurs below a threshold level;
    receiving location data of the in-ear device associated with at least one feature in the feature vector;
    generating a biometric data set associated with the features in the feature vector by time matching the motion based and non-motion based biometric data associated with each feature in the feature vector and storing the time matched biometric data into the biometric data set;
    combining the feature vector, the location data, and the biometric dataset into a final data set; and
    sending the final data set to an external system via a network for storage, where the external system is not in the in-ear device.

2. The method of claim 1, wherein the step of sending the final data set is triggered by a voice command by the user.

3. The method of claim 1, wherein the step of sending the final data set is triggered when the non motion biometric data is outside a threshold range about an accepted normal value of the biometric data.

4. The method of claim 1, wherein the step of sending the final data set is triggered by a nodding motion by the user as detected by analysis of the biometric data set.

5. The method of claim 1, wherein the step of sending the final data set is triggered by the location data falling outside a range of a set location.

6. The method of claim 1, wherein the step of sending the final data set is triggered by heartrate data in the biometric data set indicating an elevated heartrate of the user.

7. The method of claim 1, wherein the external system is a communication device.

8. The method of claim 1, wherein the external system is a data analytics system that utilizes the final data set to train a machine-learned model.

\* \* \* \* \*